United States Patent
Herrera et al.

(10) Patent No.: US 7,849,045 B2
(45) Date of Patent: Dec. 7, 2010

(54) SYSTEM AND METHOD FOR BUILDING A RULEBASE USING A STATEFUL OR STATELESS RULEBASE BUILDER IN A CLIENT-SERVER ENVIRONMENT

(75) Inventors: Peter J. Herrera, San Jose, CA (US); Ronald Cass, Cleveland Heights, OH (US); Kirk D. Wilson, Sugar Hill, NH (US); It-Beng Tan, Redwood City, CA (US)

(73) Assignee: Computer Associates Think, Inc., Islandia, NY (US)

( * ) Notice: Subject to any disclaimer, the term of this patent is extended or adjusted under 35 U.S.C. 154(b) by 302 days.

(21) Appl. No.: 12/098,893

(22) Filed: Apr. 7, 2008

(65) Prior Publication Data

US 2009/0089239 A1    Apr. 2, 2009

Related U.S. Application Data

(62) Division of application No. 10/418,702, filed on Apr. 18, 2003, now Pat. No. 7,356,522.

(60) Provisional application No. 60/373,823, filed on Apr. 19, 2002.

(51) Int. Cl.
*G06F 17/00* (2006.01)
(52) U.S. Cl. .......................... 706/59; 706/47
(58) Field of Classification Search ............ 706/45–47, 706/59–61; 705/2, 665, 667; 715/221
See application file for complete search history.

(56) References Cited

U.S. PATENT DOCUMENTS

| | | | | |
|---|---|---|---|---|
| 4,885,705 | A * | 12/1989 | Choi ........................ | 702/184 |
| 5,121,496 | A * | 6/1992 | Harper ........................ | 1/1 |
| 5,367,619 | A * | 11/1994 | Dipaolo et al. ............... | 715/221 |
| 2002/0046047 | A1* | 4/2002 | Budd ............................ | 705/1 |
| 2002/0049691 | A1* | 4/2002 | Majoor ........................ | 706/47 |
| 2010/0094871 | A1* | 4/2010 | Ruggieri et al. ............. | 707/737 |

* cited by examiner

*Primary Examiner*—David R Vincent
(74) *Attorney, Agent, or Firm*—Pillsbury Winthrop Shaw Pittman LLP

(57) ABSTRACT

A method for building a rulebase includes receiving a plurality of rulebase components. The method also includes merging the rulebase components to create a consolidated rulebase.

5 Claims, 12 Drawing Sheets

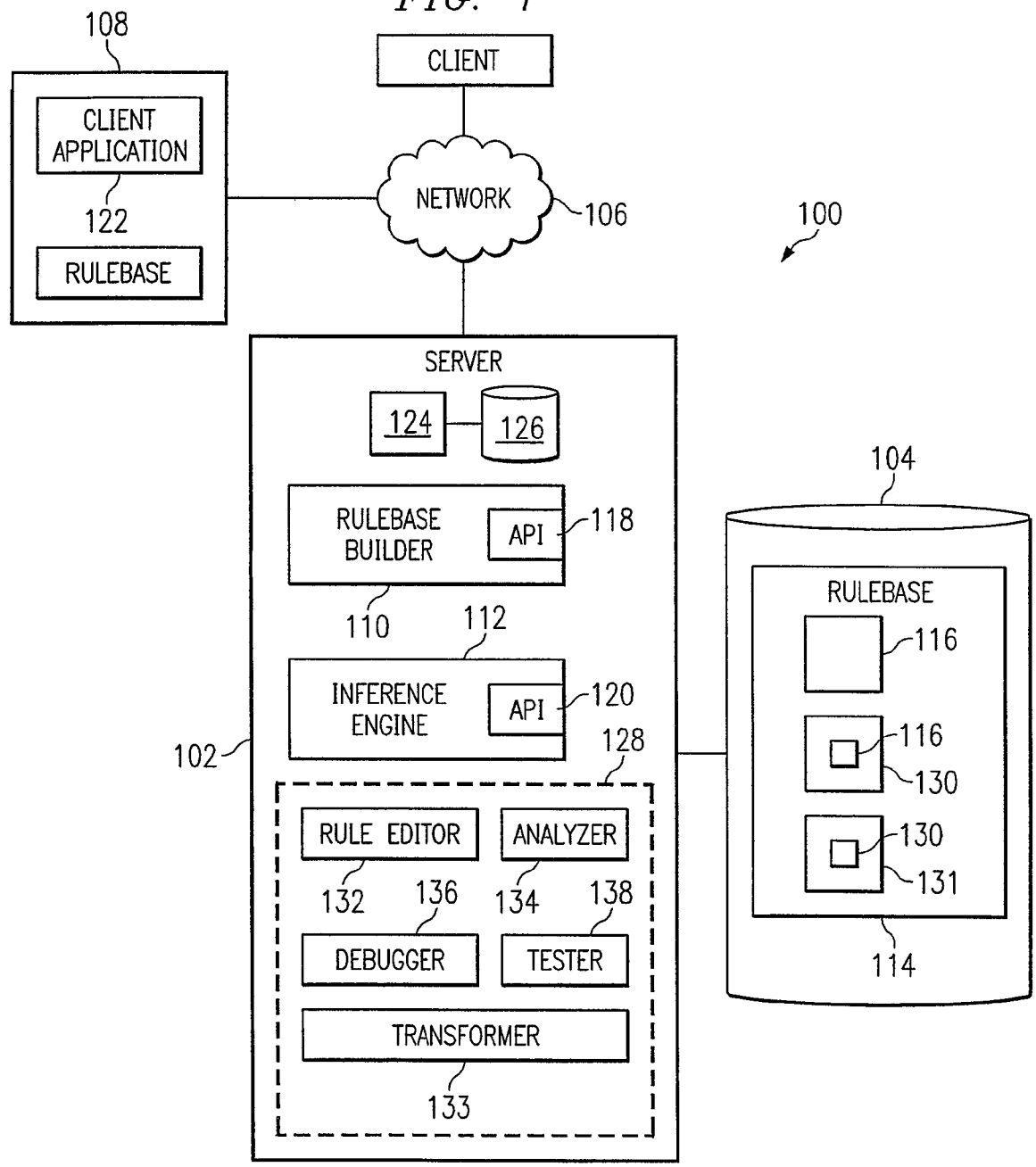

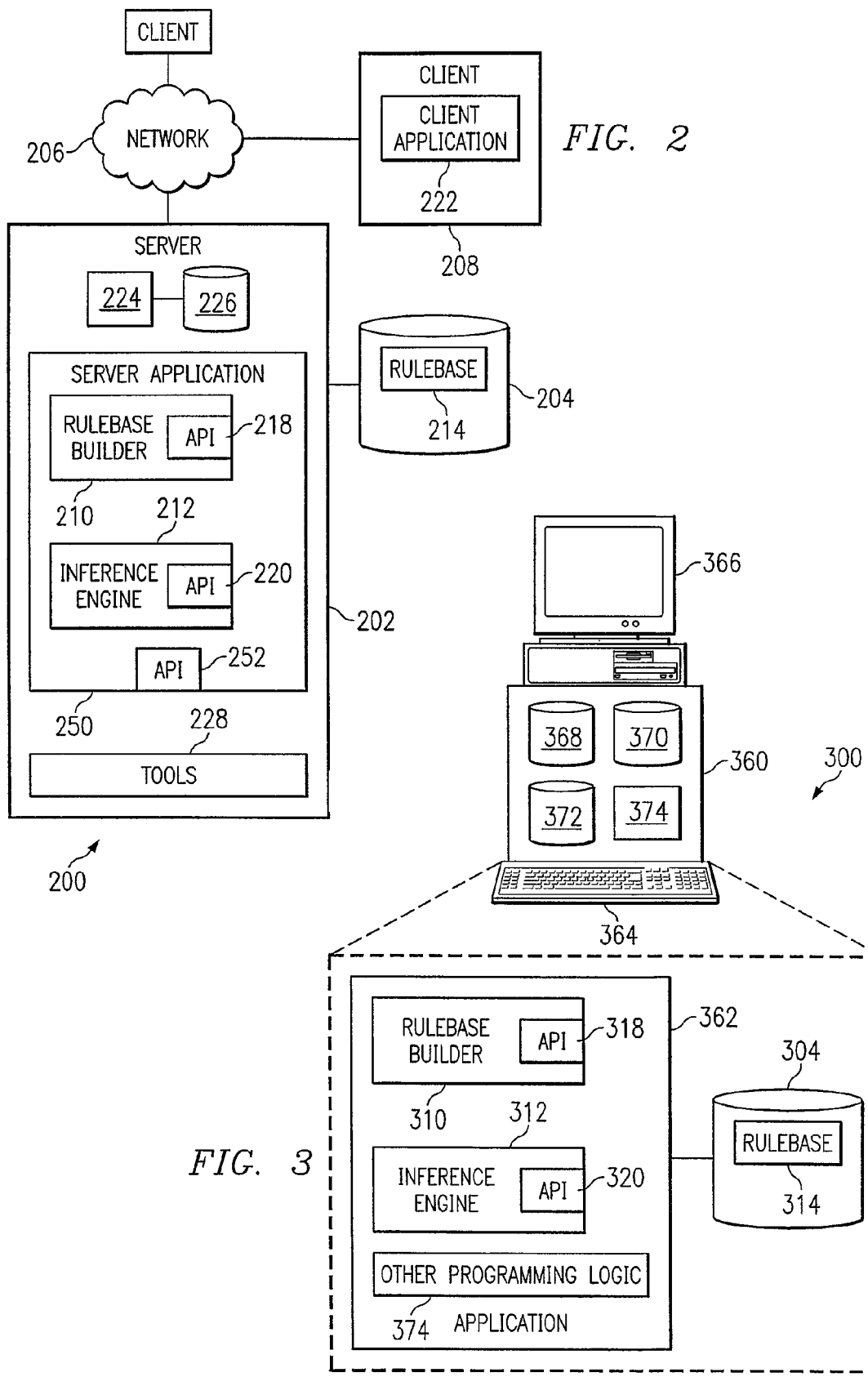

| FUNCTION CALLS | | |
|---|---|---|
| 654a | STATEFUL ENGINE | constructor(int traceMask, IMessageHandler msgHandler, java.io.InputStream bytesin) CREATE INFERENCE ENGINE OBJECT WITH BINARY RULEBASE DEFINED USING BYTE INPUT STREAM |
| 654b | STATEFUL ENGINE | constructor(int traceMask, IMessageHandler msgHandler, java.io.String url) CREATE INFERENCE ENGINE OBJECT WITH BINARY RULEBASE IDENTIFIED BY URL |
| 654c | STATEFUL ENGINE | constructor(int traceMask, IMessageHandler msgHandler, Stateful Engine baseInstance) CREATE INFERENCE ENGINE OBJECT FROM ANOTHER INFERENCE ENGINE OBJECT |
| 670 | java.lang.String | beginExplanation(java.lang.String className, java.lang.String instanceName, java.lang.String fieldName) BEGIN AN ANALYSIS OF CAUSAL RELATIONSHIPS BETWEEN FIELDS AND RULES |
| 680 | VOID | confirmTMValue(java.lang.String className, java.lang.String instanceName, java.lang.String fieldName) CONFIRM THE RETRACTABLE VALUE OF THE SPECIFIED FIELD AS THE FIELD'S NON-RETRACTABLE VALUE |
| 662 | VOID | createDynamicInstance(java.lang.String className, java.lang.String instanceName) CREATE A DYNAMIC INSTANCE OF A CLASS |
| 676b | VOID | disableTracking() DISABLE TRACKING OF RULE/FIELD INTERACTIONS |
| 676a | VOID | enableTracking() ENABLE TRACKING OF RULE/FIELD INTERACTIONS |
| 674 | java.lang.String | explainFieldResolution(java.lang.String fieldPath) DETERMINE THE RULE WHOSE FIRING RESOLVED A FIELD (IDENTIFIED BY PATHNAME) |
| 672 | java.lang.String[] | explainRuleFiring(java.lang.String rulePath) DETERMINE THE FIELD DEPENDENCIES FOR A FIRED RULE (IDENTIFIED BY PATHNAME) |
| 668 | VOID | genRuleSnapshotDocument(java.lang.String title, java.io.Writer xmlOut) GENERATE A RULE SNAPSHOT XML DOCUMENT FOR THE CURRENT DOMAIN'S AGENDA AND DIRECT THE RESULTS TO A SPECIFIED XML OUTPUT STREAM |

FROM FIG. 6C-1

652

| | | |
|---|---|---|
| 666a | VOID | genValuesDocument(java.lang.String title, java.io.Writer xmlOut)<br>GENERATE A VALUES XML DOCUMENT FOR THE CURRENT DOMAIN'S FIELDS |
| 666c | FieldValueDescriptor[] | getAllFieldValues()<br>FETCH THE VALUES OF ALL PRECONDITIONS AND POSTCONDITIONS |
| 666b | java.langString | getFieldValue(java.lang.String className, java.lang.String instanceName, java.lang.String fieldName)<br>FETCH THE VALUE OF THE SPECIFIED FIELD |
| 664 | int | infer()<br>INITIATE INFERENCING OVER THE RULES IN THE CURRENT DOMAIN'S AGENDA |
| 658b | VOID | loadValuesDocument(java.io.Reader xmlIn)<br>LOAD PRECONDITION VALUES FOR THE CURRENT DOMAIN'S FIELDS FROM A VALUES XML DOCUMENT |
| 656b | VOID | popDomain()<br>POP THE CURRENT RULESET DOMAIN, RESTORING THE PREVIOUS DOMAIN (IF ANY) AS THE CURRENT DOMAIN |
| 660 | VOID | postConditionalRuleset(java.lang.String ruleset)<br>POST ADDITIONAL RULES TO THE AGENDA FOR THE CURRENT DOMAIN |
| 656a | VOID | pushDomain(java.lang.String domain)<br>PUSH A RULESET DOMAIN, MAKING IT THE CURRENT DOMAIN |
| 684a | VOID | registerChangeHandler(IChangeHandler handler)<br>REGISTER A ChangeHandler WITH THE ENGINE |
| 684b | VOID | registerInitHandler(IInitHandler handler)<br>REGISTER AN InitializationHandler WITH THE ENGINE |
| 686 | VOID | reset()<br>RESET THE CURRENT ENGINE INSTANCE |
| 682 | VOID | retractTMValue(java.lang.String className, java.lang.String instanceName, java.lang.String fieldName)<br>RETRACT THE SPECIFIED FIELD BACK TO ITS LAST NON-RETRACTABLE VALUE |
| 658a | VOID | setFieldValue(java.lang.String className, java.lang.String instanceName, java.lang.String fieldName, java.lang.String fieldValue)<br>SET THE VALUE OF THE SPECIFIED FIELD |
| 678 | VOID | setTMValue(java.lang.String className, java.lang.String instanceName, java.lang.String fieldName, java.lang.String fieldValue)<br>SET THE VALUE OF THE SPECIFIED FIELD TO A RETRACTABLE VALUE |

FIG. 9B

```
RULE "Sample DTRule"
    EVALGetAge()
    THEN
        CASE<21.5:
            DO
                EVAL Fact2
                THEN
                    CASE=true:DO Fact4=false END
                    OTHERWISE: DO Fact4=true END
                END
            END
        CASE>=41..<=55.5:
            DO
                EVAL Fact3
                THEN
                    CASE=false: DO Fact4=true END
                    OTHERWISE: DO Fact4=false END
                END
            END
        CASE>32..<41: DO END
        CASE unknown: DO Fact4=true END
        OTHERWISE: DO Fact4=false END
    END
```

- 952: RULE "Sample DTRule" / EVALGetAge() 956 / THEN
- 954a: CASE<21.5 block (958, 962, 964a, 964b)
- 954b: CASE>=41..<=55.5 block (966)
- 954c: CASE>32..<41
- 954d: CASE unknown
- 954e: OTHERWISE (960)
- 950 (whole figure)

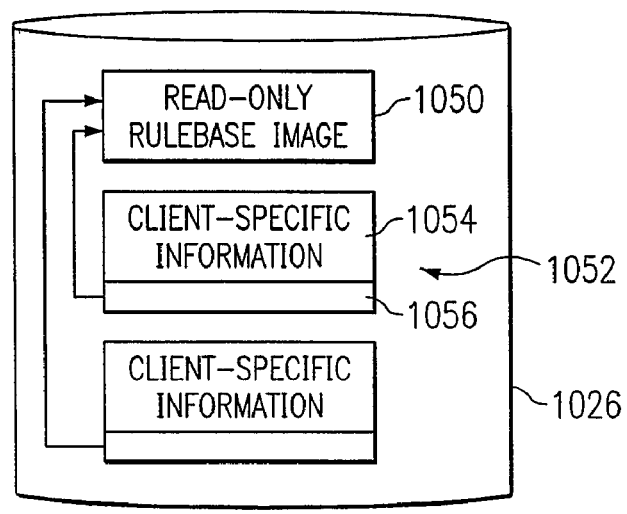

```
Domain 1  /1156
  Ruleset 1 /1154
    Rule 1      1158a          1158b
      If Father.Age>65 AND Mother.Age>65  ⎫
        THEN RetireCouple()                ⎬ 1152
      END                                  ⎭
```

FIG. 11B
*1150b*

```
Domain 1 /1156
  Class Person /1160
    Field Name ~1162
    Instance Father ~1158a
```

FIG. 11C
*1150c*

```
Domain 1 /1156
  Class Person /1160
    Field Age ~1164
    Instance Mother ~1158b
```

FIG. 11D
*1150d*

```
Domain 1 /1156
  Class Person /1160
    Field Name /1162
    Field Age ~1164
    Instances Father, Mother ~1158
  Ruleset 1 /1154
    Rule 1
      If Father.Age>65 AND Mother.Age>65  ⎫
        THEN RetireCouple()                ⎬ 1152
      END                                  ⎭
```

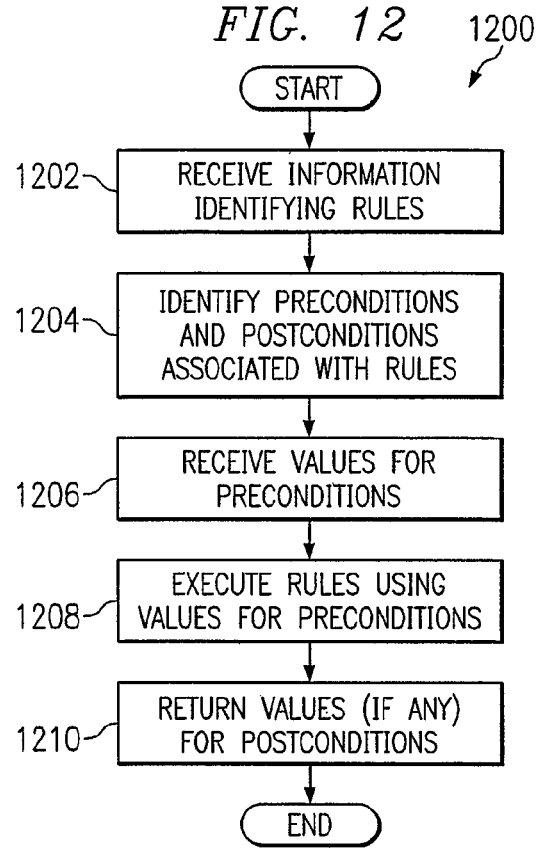
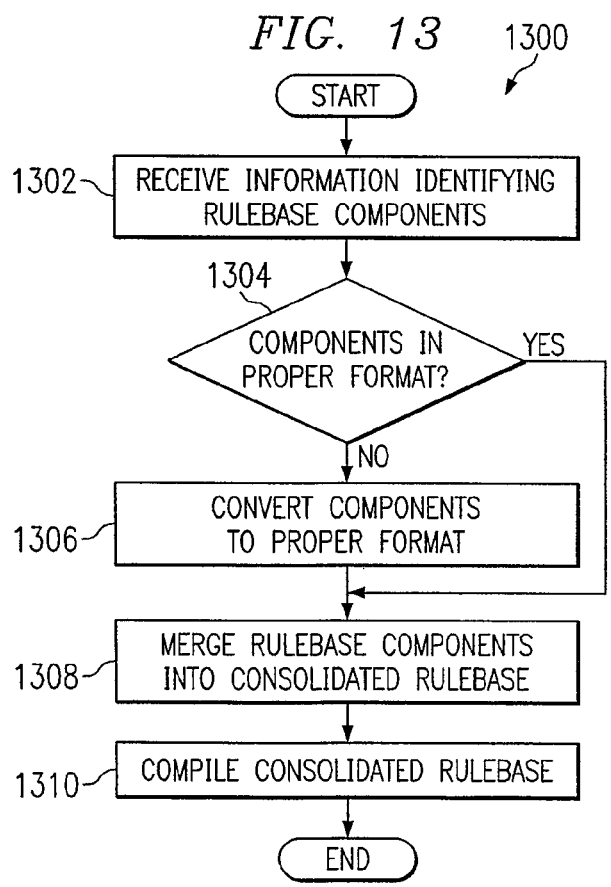

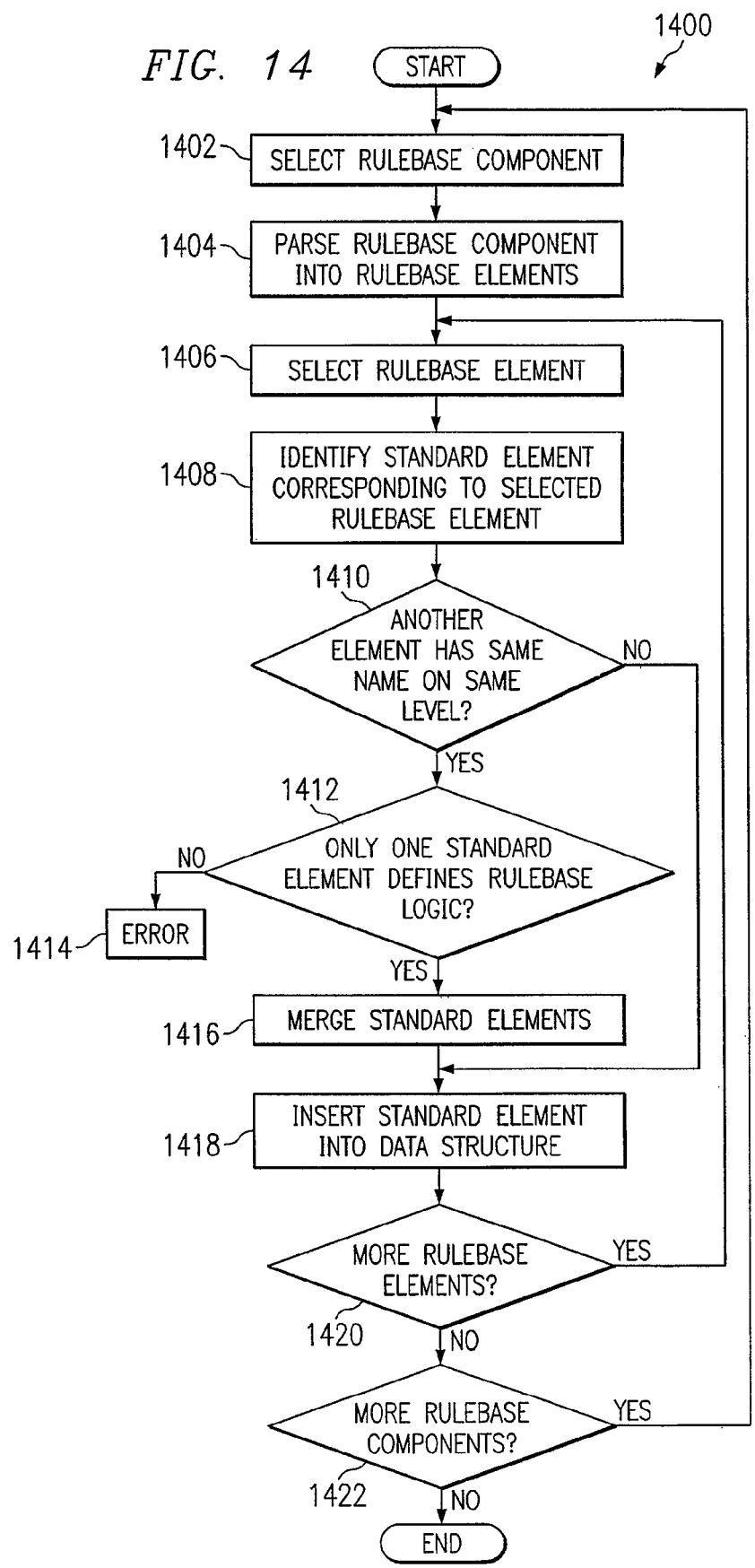

SYSTEM AND METHOD FOR BUILDING A RULEBASE USING A STATEFUL OR STATELESS RULEBASE BUILDER IN A CLIENT-SERVER ENVIRONMENT

RELATED APPLICATIONS

This application is a divisional application of U.S. patent application Ser. No. 10/418,702, filed Apr. 18, 2003 now U.S. Pat. No. 7,356,522, which claims priority to U.S. Provisional Application No. 60/373,823 filed Apr. 19, 2002, and entitled "System and Method for Providing Inferencing Services", which is incorporated by reference herein. This application is related to U.S. Pat. No. 7,191,163 filed Apr. 18, 2003 by Peter Herrera, et, al, and entitled "System and Method for Providing Inferencing Services".

TECHNICAL FIELD

This disclosure relates generally to the field of expert systems, and more particularly to a system and method for building a rulebase.

BACKGROUND

Expert systems are often used to solve problems in particular fields, such as in the medical or legal fields. For example, an expert system could receive information identifying the symptoms of a patient, analyze the symptoms, and identify possible diagnoses for the patient. A typical expert system includes a rulebase, or a set of rules, that embody the logic used by the expert system. A typical expert system also includes an inference engine. The inference engine typically executes the rules to analyze a set of inputs, such as the symptoms suffered by a patient. When executing the rules, the inference engine typically attempts to assign values to a set of output values. The output values represent the conclusions of the inference engine.

SUMMARY

The present disclosure provides a system and method for building a rulebase. In particular, a rulebase builder may be used in conjunction with one or more flexible interfaces, such as Application Program Interfaces (APIs). A user or application may invoke the rulebase builder to create rulebases embodying logic to be used during inferencing, such as a rulebase defined using eXtensible Markup Language (XML).

In one embodiment, a method for building a rulebase includes receiving a plurality of rulebase components. The method also includes merging the rulebase components to create a consolidated rulebase.

In another embodiment, an object-oriented programming language for building rulebases includes a class element identifying one or more fields and one or more methods. The object-oriented programming language also includes a constraint element identifying a condition placed on a value of at least one field. The constraint element also identifies a violation action to be performed when the condition is violated. The object-oriented programming language further includes a rule element identifying a rule associated with at least one of the fields. At least one of the fields may be associated with a number datatype. The number datatype is operable to represent both integer and floating point values. A corresponding precision identifies a number of decimal places associated with the number datatype.

BRIEF DESCRIPTION OF THE DRAWINGS

For a more complete understanding of this disclosure, reference is now made to the following descriptions, taken in conjunction with the accompanying drawings, in which:

FIG. 1 is an exemplary block diagram illustrating an example system for providing inferencing services according to one embodiment of this disclosure;

FIG. 2 is an exemplary block diagram illustrating another example system for providing inferencing services according to one embodiment of this disclosure;

FIG. 3 is an exemplary block diagram illustrating yet another example system for providing inferencing services according to one embodiment of this disclosure;

FIGS. 6A through 6C are exemplary block diagrams illustrating example inference engines according to one embodiment of this disclosure;

FIGS. 9A and 9B are exemplary block diagrams illustrating example types of rules according to one embodiment of this disclosure;

FIG. 10 is an exemplary block diagram illustrating an example memory arrangement for sharing a rulebase according to one embodiment of this disclosure;

FIGS. 11A through 11D are exemplary block diagrams illustrating example rulebase components being merged into a consolidated rulebase according to one embodiment of this disclosure;

FIG. 12 is an exemplary flow diagram illustrating an example method for providing inferencing services according to one embodiment of this disclosure;

FIG. 13 is an exemplary flow diagram illustrating an example method for rulebase building according to one embodiment of this disclosure; and FIG. 14 is an exemplary flow diagram illustrating an example method for merging rulebase components according to one embodiment of this disclosure.

DETAILED DESCRIPTION OF EXAMPLE EMBODIMENTS

Figure 4:
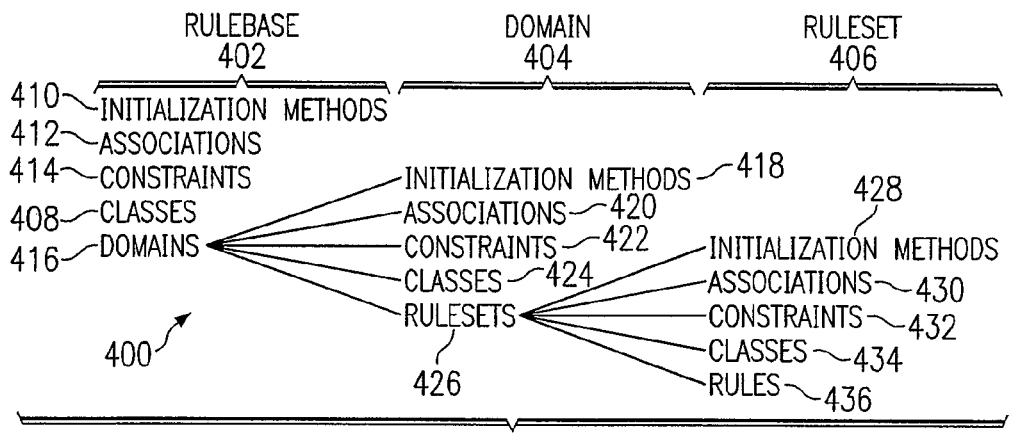
FIG. 4 is an exemplary block diagram illustrating an example rulebase architecture according to one embodiment of this disclosure.

FIG. 1 is an exemplary block diagram illustrating an example system 100 for providing inferencing services according to one embodiment of this disclosure. In the illustrated embodiment, system 100 includes a server 102, a database 104, a network 106, and one or more clients 108.

In one aspect of operation, server 102 may include a rulebase builder 110 and an inference engine 112. Rulebase builder 110 supports the creation and modification of one or more rulebases 114. A rulebase 114 includes rules 116 that embody logic used by inference engine 112 to perform inferencing operations. For example, a rulebase 114 may define how to analyze a patient's symptoms and identify possible diagnoses for the patient. Inference engine 112 may perform inferencing operations in system 100. For example, inference engine 112 could receive one or more input values, analyze the input values using a rulebase 114, and generate one or more output values. The output values could then be used for a variety of purposes, such as by making the patient's diagnosis available to a user.

In the illustrated embodiment, server 102 is coupled to network 106. In this document, the term "couple" refers to any direct or indirect communication between two or more components, whether or not those components are in physical contact with one another. Also, the term "communication" may refer to communication between physically separate components or between components within a single physical unit. Server 102 performs one or more functions related to the creation and use of a rulebase 114 in system 100. For example, server 102 could create, modify, and delete rulebases 114. Server 102 could also use rulebases 114 to perform inferencing operations. Server 102 may include any hardware, software, firmware, or combination thereof operable to perform rulebase building and inferencing functions.

Database 104 is coupled to server 102. Database 104 stores and facilitates retrieval of information used by server 102. For example, database 104 may store one or more rulebases 114 created by rulebase builder 110 and used by inferencing engine 112. Database 104 could include any hardware, software, firmware, or combination thereof operable to store and facilitate retrieval of information. Also, database 104 may use any of a variety of data structures, arrangements, and compilations to store and facilitate retrieval of information.

Network 106 is coupled to server 102 and clients 108. Network 106 facilitates communication between components of system 100. Network 106 may, for example, communicate Internet Protocol (IP) packets, frame relay frames, Asynchronous Transfer Mode (ATM) cells, or other suitable information between network addresses. Network 106 may include one or more local area networks (LANs), metropolitan area networks (MANs), wide area networks (WANs), all or a portion of a global network such as the Internet, or any other communication system or systems at one or more locations.

Clients 108 are coupled to network 106. Client 108 may perform any of a variety of functions in system 100. For example, a client 108 could include a client application 122 that can invoke the functionality of rulebase builder 110 and inference engine 112 in server 102. As a particular example, client application 122 could cause inference engine 112 to perform inferencing operations using a rulebase 114 identified by client application 122. Client 108 could also represent a terminal through which a programmer or other user may create, modify, or delete various rulebases 114 using rulebase builder 110. Client 108 may include any hardware, software, firmware, or combination thereof operable to communicate with server 102.

In the illustrated example, server 102 includes a processor 124 and a memory 126. Processor 124 executes instructions and manipulates data to perform the operations of server 102. Although FIG. 1 illustrates a single processor 124 in server 102, multiple processors 124 may be used according to particular needs. Memory 126 stores and facilitates retrieval of information used by processor 124 to perform the functions of server 102. Memory 126 may, for example, store instructions to be performed by processor 124 and data used by processor 124. Memory 126 may include any hardware, software, firmware, or combination thereof operable to store and facilitate retrieval of information.

In the illustrated embodiment, server 102 includes rulebase builder 110, inference engine 112, and tools 128. In a particular embodiment, when rulebase builder 110 or inference engine 112 is invoked by a client application 122, server 102 creates a rulebase builder instance or an inference engine instance. The instance instantiated by server 102 may then be used to provide service to the client application 122. If a second client application 122 attempts to invoke rulebase builder 110 or inference engine 112, a separate instance may be created for the second client application 122. Similarly, if the first client application 122 uses multiple threads and invokes rulebase builder 110 or inference engine 112 on each thread, separate instances can be instantiated for each thread. This allows server 102 to provide rulebase building and inferencing functionality to multiple clients 108 and on multiple threads at the same time. In other embodiments, server 102 need not create instances for each client application 122 or thread. In addition, in the following description, rulebase builder 110 and inference engine 112 may be described as performing particular functions. This description includes situations where the particular functions are performed by rulebase builder instances or inference engine instances.

Figure 9A:
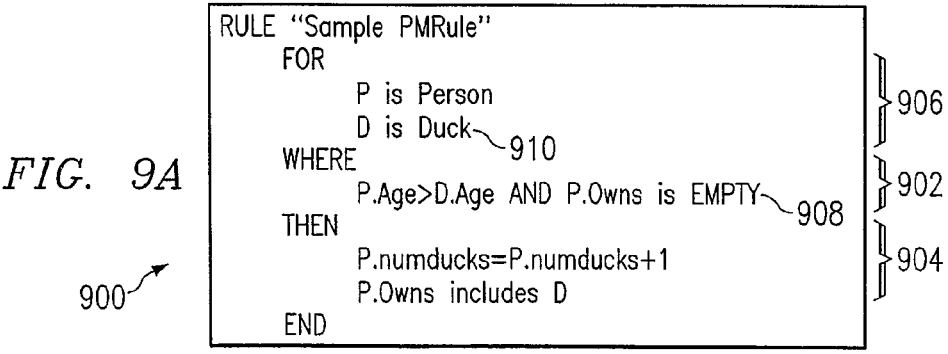

Rulebase builder 110 facilitates the creation, modification, and deletion of rulebases 114 in system 100. A rulebase 114 defines one or more rules 116 used by inference engine 112 to perform inferencing functions in system 100. For example, a rulebase 114 could define data objects that store information and logic objects that specify methods and rules that act on the information in the data objects. As a particular example, data objects could store patient symptoms, while logic objects analyze the symptoms and attempt to compute a diagnosis. Example rules are shown in FIGS. 9A and 9B, which are described below.

Rulebase 114 may include any number of rules 116 defined using any format. In one embodiment, a rulebase 114 contains rules 116 defined using eXtensible Markup Language (XML). In a particular embodiment, a rulebase 114 contains rules 116 defined using the Rule Definition Language (RDL), which is described below. Also, a rulebase 114 may be segmented into multiple sections or portions. For example, a rulebase 114 could be divided into different sections, where one section defines the data objects and another section defines the logic objects that operate on the data objects. As another example, a rulebase 114 may be formed from multiple rulesets 130, where each ruleset 130 contains one or more rules 116 that are associated with a common issue. The rulebase 114 could further be formed from multiple domains 130, which may include multiple rulesets 130. An example rulebase architecture is shown in FIG. 4, which is described below.

Rulebase builder 110 supports the creation of a rulebase 114 in system 100 by merging various rulebase components into a consolidated rulebase 114. For example, rulebase builder 110 may combine a set of rules 116, rulesets 130, and rulebases 114 into a single rulebase 114. Rulebase builder 110 could also parse the resulting consolidated rulebase 114 to help ensure completeness and consistency between the rules 116. As a particular example, different development teams may separately create different rules 116, rulebases 114, or rulesets 130, and rulebase builder 110 could merge the various components into a single rulebase 114. As another example, one development team could create a set of data objects, while another development team could create a set of logic objects that process the data objects. Rulebase builder 110 could then merge the data and logic objects into a rulebase 114.

The various rulebase components being merged into a consolidated rulebase 114 could exist in several forms. For example, a rulebase 114 being merged could exist as an uncompiled, source rulebase 114 or a compiled, binary rulebase 114. The use of binary rulebases 114 could allow third party vendors to create binary rulebases 114 that can be marketed and sold to customers. Because the rulebases 114 are in binary form, the actual contents of the rulebases 114 may be protected to a greater degree. A customer obtaining the binary rulebase 114 could simply merge it with other rulebases 114. The customer need not have access to the actual rules 116 forming the binary rulebase 114.

Rulebase builder 110 also converts various rulebase components into a standard format. For example, rulebases 114 in system 100 could have a default or standard format, such as the Rule Definition Language in XML. If client application 122 requests that rulebase builder 110 create a consolidated rulebase 114 using a component having a different format, rulebase builder 110 could convert and reformat the component into the standard format. Rulebase builder 110 could then generate the consolidated rulebase 114 using the reformatted component. This may allow users to write rulebases 114 in formats other than the standard format used by rulebase builder 110 and inference engine 112.

Rulebase builder 110 further compiles source rulebases 114 to create binary rulebases 114. As an example, rulebase builder 110 could compile a source rulebase 114 defined in an XML document that conforms to the Rule Definition Language. As a result of the compilation, rulebase builder 110 creates a binary version of the rulebase 114, which inference engine 112 may use to perform inferencing operations. Compiling a rulebase 114 could help to increase the operational efficiency of inference engine 112, and it could also help to protect the privacy of and increase the security surrounding the rulebase 114. A description of how information may be merged into a consolidated rulebase 114 defined by the Rule Definition Language is described below.

Figure 5A:
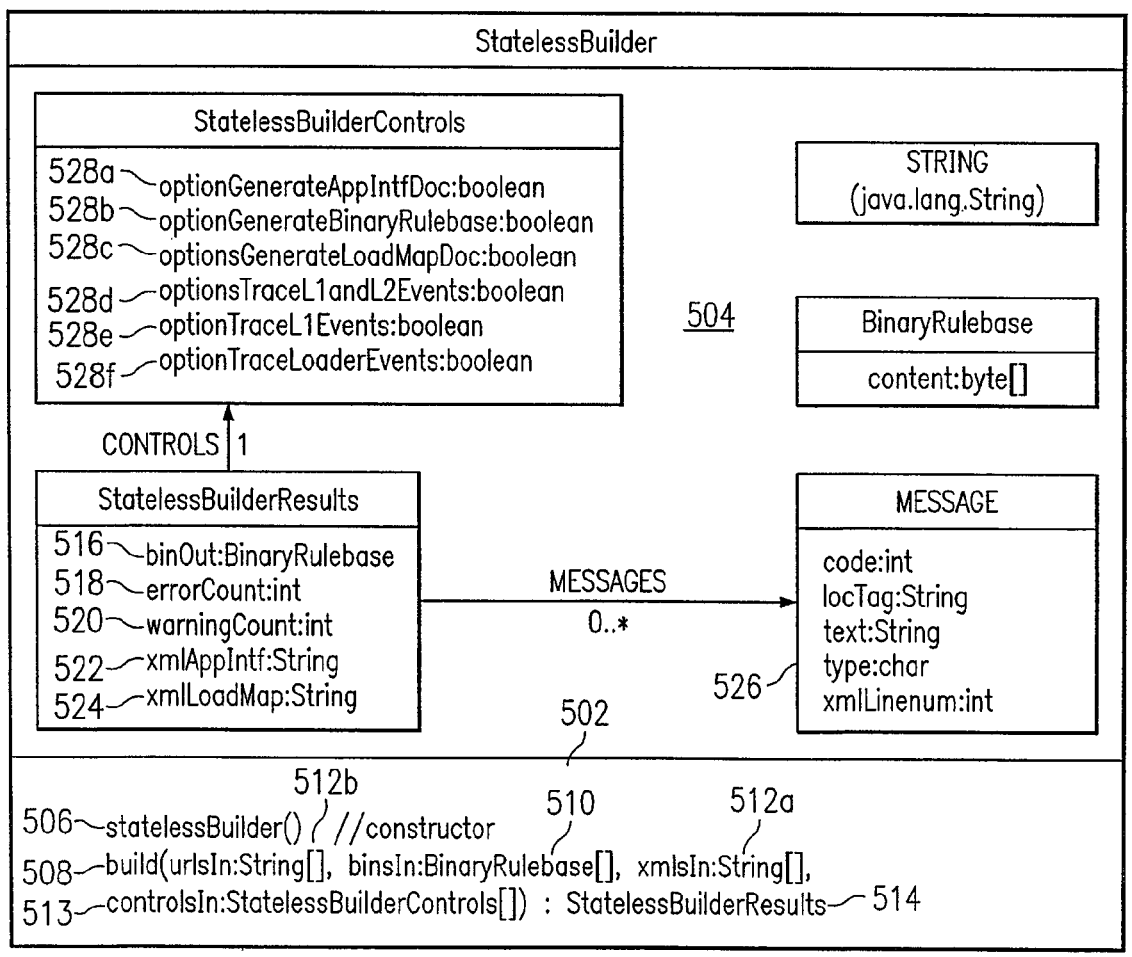
FIGS. 5A and 5B are exemplary block diagrams illustrating example rulebase builders according to one embodiment of this disclosure.
Figure 5B:
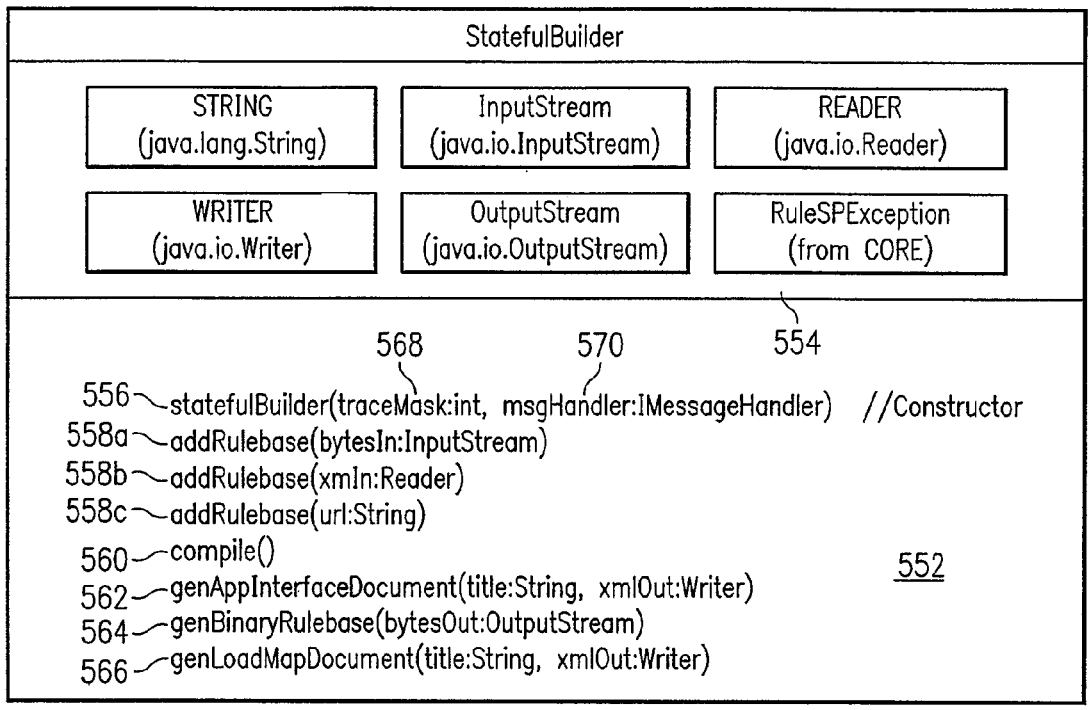

Rulebase builder 110 could include any hardware, software, firmware, or combination thereof operable to create and maintain rulebases 114. For example, rulebase builder 110 could include one or more software routines executed by processor 124. Example embodiments of rulebase builders are shown in FIGS. 5A and 5B, which are described below.

Inference engine 112 implements the inferencing functionality of server 102. For example, inference engine 112 may access one or more rulebases 114 and identify rules 116 to be used. Inference engine 112 may also receive input values from client application 122 and execute the rules 116 using the inputs. In this document, the term "execute" refers at a minimum to inference engine 112 examining at least a portion of a rule 116 to determine whether an action in the rule 116 should be performed. Inference engine 112 may then return the results of the inferencing operations to client application 122.

In one embodiment, the rules 116 used by inference engine 112 contain or otherwise refer to attributes or fields. Fields with known or defined values may be referred to as "known fields" that exist in a "known state," while fields with unknown or undefined values may be referred to as "unknown fields" that exist in an "unknown state." During inferencing, inference engine 112 uses rules 116 to try to assign known values to unknown fields.

In one aspect of operation, inference engine 112 may examine the rules 116 in rulebase 114 and fire, fail, or pend the rules 116. Inference engine 112 "fires" a rule 116 when it examines a premise in the rule 116, finds that the premise is true, and performs an action specified in the rule 116. Inference engine 112 "fails" a rule 116 when it examines the premise in the rule 116, finds that the premise is false, and refuses to perform the action specified in the rule 116. Inference engine 112 "pends" a rule 116 when it examines the premise in the rule 116 and determines that the premise cannot be resolved as either true or false. This may occur when the premise involves a field that has an unknown value. Inference engine 112 may later attempt to fire or fail the pending rule 116 after the field is assigned a known value.

Inference engine 112 may use one or multiple strategies to execute the rules 116 in a rulebase 114. In one embodiment, inference engine 112 supports forward-chaining and backward-chaining of rules 116 in rulebase 114. In general, forward-chaining involves inference engine 112 attempting to maximize the number of unknown fields in the rulebase 114 that are placed in a known state. In forward-chaining, inference engine 112 fires a rule 116 and determines which fields are resolved to a known state as a result of the firing. Inference engine 112 then revisits any pending rules 116 and determines if those pending rules 116 can now be fired or failed. Inference engine 112 continues this process until inference engine 112 cannot fire or fail any more rules 116 or execute any pending rules 116.

Backward-chaining generally involves inference engine 112 attempting to resolve a primary goal, such as determining whether certain preconditions warrant a particular outcome or resolve an identified field. Inference engine 112 initially visits rules 116 that could potentially resolve the identified goal. If a rule 116 pends because of an unknown field, inference engine 112 adds the unknown field to a list of secondary goals. Inference engine 112 then visits rules 116 that could potentially resolve any of the primary or secondary goals. Inference engine 112 continues this process until the primary goal is resolved or there are no more rules 116 that can be executed.

In performing the inferencing operations, inference engine 112 executes rules 116 in a rulebase 114. In one embodiment, the order in which the rules 116 are executed depends, at least in part, on a priority associated with the rules 116. As described above, rules 116 may reside within rulesets 130, and the rulesets 130 may reside within domains 131. When a client application 122 identifies a domain 131 to be used during inferencing, inference engine 112 loads the unconditional rulesets 130 contained in that domain 131 into memory 126. Inference engine 112 then ensures that the rules 116 contained in the domain 131 are ordered according to their priority. After that, inference engine 112 executes the rules 116 in order of their priority.

In one embodiment, inference engine 112 enforces monotonic reasoning when performing inferencing operations. Monotonic reasoning assumes that, once the inference engine 112 has fired or failed a rule due to a field value, the field's value should not be altered during subsequent inferencing; otherwise, inferencing integrity may be compromised—because results may reflect the actions of conflicting rules. Inference engine 112 may detect when a field's value is tested by a rule premise. If that field's value subsequently changes, the inference engine may treat this as a monotonic reasoning violation and warn the user of this violation.

Fields may be referred to as a "first-valued field" because the field's value may not change after being assigned an initial value. Other fields may be called "final-valued fields," which have values that may change many times. The use of final-valued fields may be useful, for example, when counters are needed in a rulebase 114. As a particular example, a rulebase 114 could include a group of rulesets 130, and each ruleset 130 could determine whether a taxpayer is allowed to claim a certain tax exemption. The rulebase 114 could also include a counter that keeps track of the number of exemptions the taxpayer is allowed to claim. As inference engine 112 executes each ruleset 130, the counter could be incremented if the taxpayer qualifies for an exemption. In this example, the useful value of the counter is not known until all of the rulesets 130 have been executed, and inference engine 112 could increment the counter many times.

The distinction between first-valued fields and final-valued fields may affect the order is which rules 116 are executed during inferencing. For example, a large number of rules 116 could change the value of a final-valued field. Inference engine 112 may be unable to fire or fail a rule 116 that uses the final-valued field in the premise until all of the rules 116 that could change the value of the final-valued field have been executed. Returning to the tax example, inference engine 112 could be forced to pend any rules 116 that calculate the taxes owed by the taxpayer until all rulesets 130 dealing with the number of exemptions are executed.

Inference engine 112 could also support the use of supplemental rules 116, rulebases 114, and rulesets 130. A supplemental rulebase 114 represents a rulebase that can be used in addition to a primary rulebase 114 during inferencing. For example, an insurance company could have a primary rulebase 114 established by its corporate headquarters, and each branch office could have a supplemental rulebase 114 defining local policies. To use a supplemental rulebase 114, inference engine 112 could receive and load the primary rulebase 114 into memory 126. Rules within primary rulebase 114 could then load domains from supplemental rulebases and sub-inference over the rules in those domains. In one embodiment, communication between a primary rulebase 114 and a supplemental rulebase 114 may occur via the supplemental rulebase's pre-conditions and post-conditions. In a particular embodiment, a supplemental rulebase 114 may not directly reference any objects in the primary rulebase 114, which may help to insulate the primary rulebase 114 against possible "rogue" supplemental rulebases 114. A supplemental rulebase 114 could also be associated with a different inference engine instance than is the primary rulebase 114. In this example, the primary rulebase 114 could act as an "application" driving the supplemental rulebase 114. From the perspective of the supplemental rulebase 114, the primary rulebase 114 may be indistinguishable from an application. A primary rulebase 114 could load one or multiple supplemental rulebases 114, and each supplemental rulebase 114 could then load one or multiple additional supplemental rulebases 114.

Inference engine 112 could also support serialized inferencing and sub-inferencing. In serialized inferencing, inference engine 112 performs inferencing operations using a first domain 131 and produces a set of output values. Inference engine 112 then uses those output values as input values for a second domain 131, and inference engine 112 performs inferencing operations using the second domain 131. This may be useful, for example, when the first domain 131 calculates the number of exemptions a taxpayer is entitled to receive, and the second domain 131 calculates the taxes owed by the taxpayer based on the number of exemptions. In sub-inferencing, inference engine 112 performs inferencing operations using a first domain 131, and one of the rules 116 in the first domain 131 may invoke inferencing using a second domain 131. When that rule 116 is fired, inference engine 112 loads the second domain 131 and performs inferencing operations using the second domain 131. Once inference engine 112 completes inferencing using the second domain 131, inference engine 112 may return to using the first domain 131. The execution of the rules 116 in the second domain 131 may unpend rules 116 in the first domain, which inference engine 112 executes upon returning to the first domain 131.

Figure 6B:
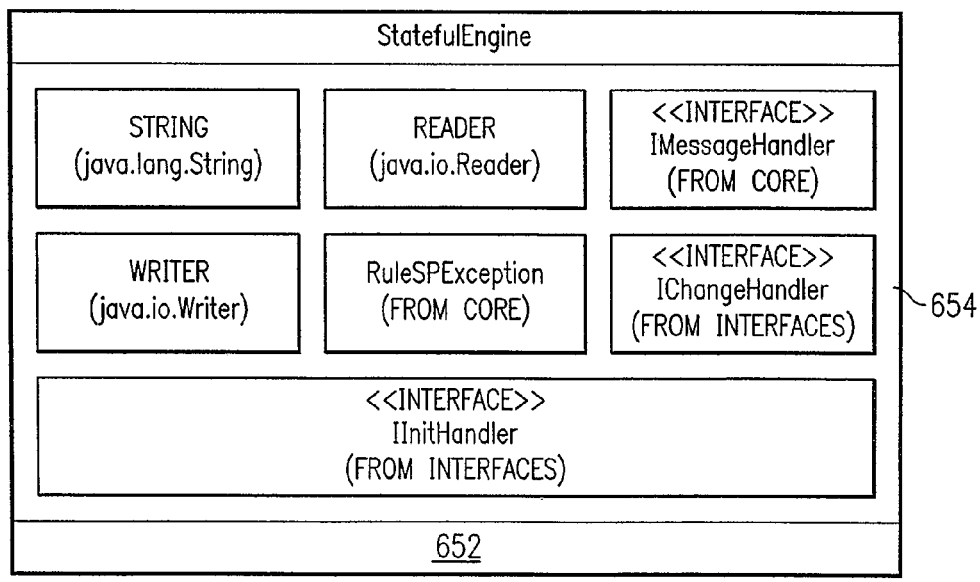
Figure 6A:
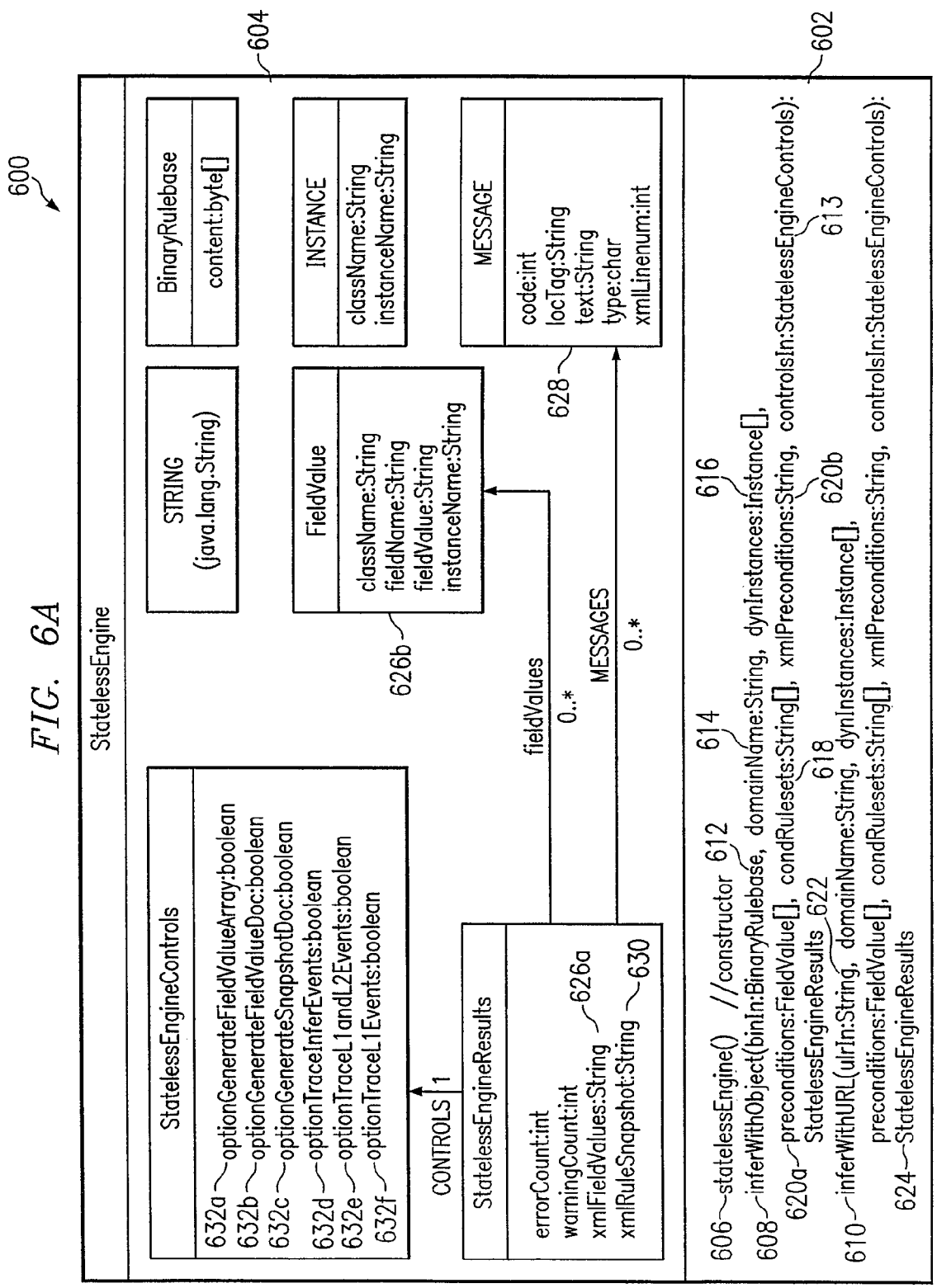

Inference engine 112 could include any hardware, software, firmware, or combination thereof operable to perform one or more inferencing operations. Inference engine 112 could, for example, include one or more software routines executed by processor 124. Example embodiments of inference engine 112 are shown in FIGS. 6A through 6C, which are described below.

To facilitate communication between client application 122 and rulebase builder 110, rulebase builder 110 may include or otherwise be associated with an Application Program Interface (API) 118. Similarly, inference engine 112 may include or otherwise be associated with an API 120. APIs 118, 120 may allow client application 122 to invoke the functions of rulebase builder 110 and inference engine 112. For example, client application 122 could instruct rulebase builder 110 to merge two rulebases 114 by supplying the identity of the rulebases 114 to rulebase builder 110 through API 118. In a similar manner, client application 122 could invoke the inference function of inference engine 112 by supplying the identity of a rulebase 114 and the input values to inference engine 112 through API 120.

In a particular embodiment, rulebase builder 110 could be associated with a stateless API 118, a stateful API 118, or both. Similarly, inference engine 112 could be associated with a stateless API 120, a stateful API 120, or both. Stateful APIs 118, 120 may retain session-oriented state information involving client applications 122 that communicate with server 102. The state information may, for example, represent the current status of a session occurring between server 102 and the client 108 on which client application 122 is operating. Stateless APIs 118, 120 may not retain session-oriented state information involving client applications 122 that communicate with server 102.

The stateless APIs 118, 120 could be used to invoke rulebase builder 110 or inference engine 112 as a remote service over network 106. The stateful APIs 118, 120 may allow server 102 to provide additional functionality to a client application 122 accessing server 102. For example, the use of stateful APIs 118, 120 allows server 102 to provide "callbacks." During a callback, rulebase builder 110 or inference engine 112 requests additional information from or supplies information to a client application 122 during rulebase building or inferencing. This could allow, for example, server 102 to notify client application 122 when changes to field values occur.

The callbacks could also allow server 102 to define methods which server 102 may invoke to initialize precondition values or other values. For example, server 102 could request that client application 122 provide a known value for a particular field, which may occur during "last chance processing." During inferencing, inference engine 112 may be unable to complete inferencing because a field has an unknown value that cannot be resolved. When that occurs, inference engine 112 could ask client application 122 to provide a value for the unknown field. If client application 122 provides the value, inference engine 112 may be able to continue or complete the inferencing operations. In another embodiment, rulebase 114 could provide a last chance value for use during last chance processing. In this embodiment, inference engine 112 uses the last chance value for a field when inference engine 112 is unable to resolve the field's value during inferencing. A combination of these approaches could also be used, such as when inference engine 112 requests a first value from client application 122 and uses a second value from rulebase 114 when client application 122 fails to provide the first value.

Tools 128 assist in the development and maintenance of rulebases 114 in system 100. For example, rule editors 132 assist users in creating rules 116. A rule editor 132 could allow a user to create and edit rules 116. As a particular example, rule editor 132 could allow a user to create XML documents that contain rules 116, edit existing XML documents that contain rules 116, and delete XML documents that contain rules 116.

Tools 128 may also include one or more transformers 133. Transformer 133 converts a rule 116 from one format into a different format. For example, transformer 133 could receive a rule 116 defined using natural language and convert the rule 116 into XML format. This may allow a user to enter rules 116 using simpler notations or grammar. In one embodiment, transformer 133 could include an Infix-to-XML Java-coded utility application. Other transformers 133, such as graphical editors or drop-down mechanisms, may be used.

Tools 128 may further include one or more analyzers 134. Analyzer 134 examines a binary or source rulebase 114 and identifies relationships between data objects and rules 116. For example, a user may identify a specific data object, and an analyzer 134 may identify any rule 116 that reads a value from the data object or writes a value to the data object.

Tools 128 may also include one or more debuggers 136. Debugger 136 monitors the execution of rules 116 during inferencing. For example, a debugger 136 could identify the input values supplied to inference engine 112, the rules 116 fired during inferencing, the order in which the rules 116 are fired, and the reason why each rule 116 was fired. This information may then be used to analyze the inferencing operations that occurred. This may be useful when a rulebase 114 is not providing appropriate results, and the user wants to identify why the rulebase 114 failed to operate as expected.

In addition, tools 128 may include one or more testers 138. Tester 138 assists a user in ensuring that a rulebase 114, a ruleset 130, or a set of rules 116 work as intended. For example, a tester 138 could receive information identifying a rulebase 114, a set of input values, and a set of expected output values. Tester 138 then invokes inference engine 112 using the identified rulebase 114 and the input values, receives the computed output values from inference engine 112, and determines whether the computed output values match the expected output values. In a particular embodiment, tester 138 could access a library that contains multiple sets of input values and corresponding output values to test the identified rulebase 114.

Each tool 128 could include any hardware, software, firmware, or combination thereof operable to perform one or more functions in system 100. Also, each tool 128 could invoke functions in rulebase builder 110 or inference engine 112 using the APIs 118, 120.

In one embodiment, rulebase 114 can define its own data objects, and rulebase 114 can be developed and used independently of the application that relies on the logic embedded in rulebase 114. For example, a specialized client application 122 can be developed by one group of users, while another group of users develops a rulebase 114 to be used by client application 122. As a particular example, a rulebase 114 or a domain 131 in rulebase 114 could define preconditions, or input values, and postconditions, or output values. The users developing the rulebase 114 could identify the preconditions and the postconditions, and the users developing client application 122 could then simply ensure that client application 122 is designed to communicate the appropriate preconditions to inference engine 112 and receive the appropriate postconditions from inference engine 112. Also, because rulebase 114 can define its own data objects apart from the client application 122 that invokes inferencing using rulebase 114, multiple client applications 122 can share rulebase 114. These client applications 122 can invoke inferencing using the same rulebase 114, even if the inferencing for one client application 122 overlaps partially or completely with the inferencing for another client application 122.

Although FIG. 1 illustrates an example system 100 for providing inferencing services, various changes may be made to system 100. For example, FIG. 1 illustrates one example functional division of server 102. Various components of server 102 may be combined or omitted, and additional components may be added according to particular needs. As particular examples, rulebase builder 110 or inference engine 112 could be omitted from server 102, or rulebase builder 110 and inference engine 112 could reside on separate platforms. Also, database 104 could store any other information as needed in system 100, and database 104 and memory 126 could reside at any location or locations accessible by server 102. Further, server 102 could support other or additional tools 128, and rulebases 114 can reside in locations other than database 104. In addition, inference engine 112 could support either forward-chaining or backward-chaining of rules 116, and other interfaces to rulebase builder 110 and inference engine 112 could be used in system 100.

FIG. 2 is an exemplary block diagram illustrating another example system 200 for providing inferencing services according to one embodiment of this disclosure. In the illustrated embodiment, system 200 includes a server 202, a database 204, a network 206, and one or more clients 208.

Server 202, database 204, network 206, and client 208 may be the same as or similar to server 102, database 104, network 106, and client 108 of FIG. 1. In this embodiment, a rulebase builder 210 and an inference engine 212 form a portion of a server application 250. Server application 250 represents an application that can be invoked by client applications 222 over network 206. Server application 250 could, for example, represent an expert application, such as an application associated with the medical or legal field.

In one aspect of operation, server application 250 could receive a request from a client application 222 to build a rulebase 214 or perform inferencing operations. Server application 250 could create an instance of rulebase builder 210 or inference engine 212 and allow the instance to perform suitable operations.

In the illustrated embodiment, server application 250 includes a server API 252. Server API 252 allows client applications 222 to invoke the functions of server application 250. For example, a client application 222 could invoke a function of server application 250 that creates a rulebase builder instance, and client application 222 could identify multiple source rulebases 214. Server application 250 could pass the information received through server API 252 to the rulebase builder instance and allow the rulebase builder instance to merge and compile the identified rulebases 214. Server API 252 could represent a statefull interface, stateless interface, or other interface or combination of interfaces.

In a particular embodiment, server application 250 represents a Java application, a J2EE servlet, an Enterprise Java Beans (EJB) application, a JavaServer Pages (JSP) application, or other suitable application. In this embodiment, APIs 218, 220 may include a stateful interface that can be invoked as a local service by server application 250. In addition, server application 250 can be invoked through API 252 as a remote service by client application 222.

Although FIG. 2 illustrates an example system 200 for providing inferencing services, various changes may be made to system 200. For example, while FIG. 2 illustrates one example functional division of server 202, various components of server 202 may be combined or omitted, and additional components may be added according to particular needs. As a particular example, rulebase engine 210 or inference engine 212 could be omitted from server 202.

FIG. 3 is an exemplary block diagram illustrating yet another example system 300 for providing inferencing services according to one embodiment of this disclosure. In the illustrated embodiment, system 300 includes a host computer 360 executing an application 362.

In the illustrated embodiment, host 360 may execute with any of the well-known MS-DOS, PC-DOS, OS-2, MAC-OS, WINDOWS, UNIX, LINUX, or other appropriate operating systems. Host 360 could represent a desktop computer, a laptop computer, a server computer, or other suitable computing or communicating device. Host 360 may include an input device 364, an output device 366, a random access memory (RAM) 368, a read-only memory (ROM) 370, a CD-ROM, hard drive, or other magnetic or optical storage device 372, and one or more processors 374. Input device 364 may, for example, include a keyboard, mouse, graphics tablet, touch screen, pressure-sensitive pad, joystick, light pen, microphone, or other suitable input device. Output device 366 may, for example, include a video display, a printer, a disk drive, a plotter, a speaker, or other suitable output device.

Items within the dashed lines in FIG. 3 represent exemplary functional operation and data organization of the associated components of system 300. In the illustrated embodiment, host 360 includes application 362 and database 304. Database 304 may be the same as or similar to database 104 and database 204 of FIGS. 1 and 2.

Application 362 may represent an expert application or other application that uses rulebase building and inferencing functionality. In the illustrated example, application 362 includes a rulebase builder 310, an inference engine 312, and other programming logic 374. Rulebase builder 310 may be the same as or similar to rulebase builder 110 and rulebase builder 210 of FIGS. 1 and 2. Also, inference engine 312 may be the same as or similar to inference engine 112 and inference engine 212 of FIGS. 1 and 2. In addition, rulebase builder 310 and inference engine 312 may, but need not, include APIs 318 and 320.

Additional programming logic 374 may represent logic in application 362 that invokes rulebase builder 310 and inference engine 312. For example, logic 374 could implement a medical expert program that receives patient symptoms from a user and passes the symptoms to inference engine 312. After inference engine 312 performs the inferencing, logic 374 could make the diagnosis available to the user. Any other suitable functions may be performed by logic 374 in application 362.

In a particular embodiment, application 362 may represent a Java application. Also, APIs 318, 320 may include a stateful interface that can be invoked as a local service in application 362.

Although FIG. 3 illustrates an example system 300 for providing inferencing services, various changes may be made to system 300. For example, while FIG. 3 illustrates one example functional division of host 360, various components of host 360 may be combined or omitted, and additional components may be added according to particular needs. As a particular example, rulebase builder 310 or inference engine 312 could be omitted from host 360. Also, although FIG. 3 illustrates host 360 as a desktop computer, other computing or communicating devices could be used. In addition, while FIGS. 1-3 illustrate various example operating environments, rulebase builders 110, 210, 310 and inference engines 112, 212, 312 could be used in any other suitable environment.

FIG. 4 is an exemplary block diagram illustrating an example rulebase architecture 400 according to one embodiment of this disclosure. In this embodiment, rulebase architecture 400 includes rulebase-level elements 402, domain-level elements 404, and ruleset-level elements 406. Although rulebase architecture 400 may be described with respect to system 100 of FIG. 1, rulebase architecture 400 could be used with other systems, and other rulebase architectures can be used by system 100.

In FIG. 4, rulebase-level elements 402 include classes 408, initialization methods 410, associations 412, constraints 414, and domains 416. Classes 408 define data objects that store information and method objects that may process the information in the data objects. For example, a class 408 could define a Person object that includes fields for the name of a person, the age of the person, and the name (if any) of the person's spouse. As another example, a class 408 could define a Retirement method that analyzes an instance of a Person, compares the person's age to a value of 65, and sets a flag identifying whether or not the person has reached retirement age based on the comparison.

Initialization methods 410 define how server 102 initializes fields in various objects. For example, an initialization method 410 may initialize any integer fields in a set of data objects to a value of zero and initialize any string fields to a NULL value. An initialization method 410 could also set constant values, such as by setting a maximum age field to a value of 120.

Associations 412 define relationships between fields. For example, a Person instance may be the spouse of another Person instance, and an association may represent a one-to-one relationship between the Person instances. As another example, a Person instance may own multiple Duck instances, and an association may represent a one-to-many relationship between the Person and Duck instances. In one embodiment, the related fields are in the same level of architecture 400, such as in two classes 408. In a particular embodiment, an association is defined by two roles. Each role specifies a class and an instance reference field owned by that class. An instance reference field in one object points to or otherwise identifies another object. For example, an Ownership association may define one role for an Owns field of the Person class and another role for an IsOwnedBy field of the Duck class.

Constraints 414 define conditions that should be true regarding values assigned to fields. Constraints 414 also define the actions that occur if the conditions are violated. For example, a constraint 414 may specify that a field storing a person's age should have a value between 0 and 120. If an instance of Person is assigned an age of 800, the constraint 414 associated with the age field is violated, and the actions defined by that constraint 414 may be executed. The action may include inference engine 112 halting inferencing, using a substitute value, or using stateful interface 120 to request a correct value from client application 122.

Domains 416 separate rules into different groups referred to as domains. In each domain 416, a rulebase can include initialization methods 418, associations 420, constraints 422, classes 424, and rulesets 426. Initialization methods 418, associations 420, constraints 422, and classes 424 may be the same as or similar to initialization methods 410, associations 412, constraints 414, and classes 408. These domain-level elements 404 may have a different scope than the rulebase-level elements 402. For example, while associations 412 may define relationships between two classes residing at the rulebase level, associations 420 may define relationships between classes residing at the domain level. In certain embodiments, pre- and post-conditions may be defined at the main level.

Rulesets 426 further separate rules into different groups called rulesets. In each ruleset 426, a rulebase can include initialization methods 428, associations 430, constraints 432, classes 434, and rules 436. These ruleset-level elements 406 may have a different scope than the corresponding rulebase-level elements 402 and the domain-level elements 404. For example, associations 430 may define relationships between classes residing at the ruleset level.

Rules 436 define the logic used to analyze input values and generate output values. Rules 436 can process information in data objects, such as objects created using classes 408, 424, 434. Rules 436 can also use methods defined in method objects to assign values to fields in the data objects. In one embodiment, rules 436 include decision tree rules and pattern matching rules. An example pattern matching rule is shown in FIG. 9A, which is described below. An example decision tree rule is shown in FIG. 9B, which is also described below.

Although FIG. 4 illustrates one example of a rulebase architecture 400, various changes may be made to rulebase architecture 400. For example, additional elements could be added to various levels of architecture 400, and current elements could be omitted according to particular needs.

FIGS. 5A and 5B are exemplary block diagrams illustrating example rulebase builders according to one embodiment of this disclosure. In particular, FIG. 5A illustrates a stateless rulebase builder 500, and FIG. 5B illustrates a stateful rulebase builder 550. Although FIGS. 5A and 5B may be described with respect to system 100 of FIG. 1, rulebase builders 500, 550 could be used with other systems.

In FIG. 5A, stateless rulebase builder 500 allows applications to invoke various function calls 502, and the function calls 502 use various data structures 504 as inputs and outputs. In the illustrated embodiment, function calls 502 include a constructor function 506 and a build function 508. Constructor function 506 creates an instance of rulebase builder 500 for use by an application requesting rulebase building services. For example, a client application 122 may invoke constructor function 506 over network 106. Server 102 executes constructor function 506 and instantiates an instance of rulebase builder 500, creating a rulebase builder instance. Additional function calls from client application 122 are then directed to that rulebase builder instance. If multiple client applications 122 request rulebase building services, server 102 may execute constructor function 506 to create multiple instances of rulebase builder 500.

Build function 508 causes a rulebase builder instance to merge various inputs, such as rulebases, rules, and rulesets, into a consolidated rulebase. Build function 508 may accept binary rulebases 510, strings 512a-512b, and a control object 513 as inputs. Input strings 512a represent XML strings, which include uncompiled or source rules, rulebases, and rulesets. Input strings 512b represent Uniform Resource Locators (URLs), which identify remote locations of compiled or uncompiled rules, rulebases, and rulesets. Before building a consolidated rulebase, the rulebase builder instance may access the remote location identified by a URL and retrieve any rules, rulebases, or rulesets at that location.

Server 102 uses values 528 contained in control object 513 to identify different functions that the rulebase builder instance should perform when executing the build function 508. For example, value 528a instructs the rulebase builder instance whether to generate an application interface document 522. Value 528b instructs the rulebase builder instance whether to generate a binary rulebase 516. Value 528c instructs the rulebase builder instance whether to generate a load map 524. Values 528d-528f instruct the rulebase builder instance whether to trace various types of events, which may be described in messages 526. In this example, the events may be divided into high-level or L1 events, low-level or L2 events, and loader events. Other divisions of events could also be used.

When the build function 508 is invoked, the rulebase builder instance may attempt to combine the input rules, rulebases, and rulesets and generates output results 514. Output results 514 may include a consolidated binary rulebase 516. Rulebase 516 represents the rulebase formed when the inputs are merged into a consolidated rulebase and compiled. Output results 514 may also include an error count 518 and a warning count 520. Error count 518 identifies the number of errors identified when creating the consolidated rulebase 516, and warning count 520 identifies the number of warnings generated.

Output results 514 may further include an application interface document 522 and a load map 524. Application interface document 522 describes the input values used by rulebase 516 and the output values produced by rulebase 516. The application interface document 522 may be useful when the binary rulebase 516 will be used in conjunction with an application being developed. The application interface document 522 could describe the inputs and outputs associated with the rulebase 516, and the developers creating the application can ensure that the application sends the appropriate inputs to the rulebase 516 and expects the appropriate outputs from the rulebase 516.

Load map 524 identifies the various objects in rulebase 516. Load map 524 also identifies relationships between an object in rulebase 516 and any rules in rulebase 516 affecting that object. For example, the load map 524 may, for a given object, identify any rules that read a value from the object or that write a value to the object. Load map 524 could be further processed, such as by another component in system 100, to generate rulebase reports. A rulebase report could identify the rules in a rulebase 516, the interactions between the rules, or other suitable information.

Output results 514 could also include a set of zero or more messages 526. Messages 526 could include the error and warning messages produced during the creation of consolidated rulebase 516. Messages 526 could also include trace messages, such as messages used to identify different events that occur during the creation or compilation of the consolidated rulebase 516.

In one aspect of operation, the contents of output results 514 could vary depending on values 528. For example, if value 528a has a value of false, the output results 514 will not include an application interface document 522. Similarly, if value 528c has a value of true, the output results 514 will include a load map 524. If value 528b has a value of false, the output results 514 will not include a binary rulebase. This may be useful, for example, when an application interface document 522 or load map 524 is needed for an existing binary rulebase.

In FIG. 5B, stateful rulebase builder 550 allows applications to invoke various function calls 552 that use data structures 554 as inputs and outputs. In the illustrated embodiment, function calls 552 include a constructor function 556. Constructor function 556 creates an instance of rulebase builder 550 for use by an application requesting rulebase building services. Constructor function 556 includes two input values, a tracemask 568 and a message handler 570. The value provided for tracemask 568 determines the level of detail of trace messages provided to client application 122. The level of detail may identify whether trace messages are provided and, if so, in what circumstances a trace message should be provided. As described below, message handler 570 identifies a handler used to communicate information between client application 122 and a rulebase builder instance. The message handler 570 may, for example, allow rulebase builder 550 to perform callback operations and request information from client application 122.

Add rulebase functions 558a-558c identify different rulebases, rules, and rulesets to be merged into a consolidated rulebase. Add rulebase function 558a accepts a binary rulebase, rule, or ruleset to be used when generating a consolidated rulebase. Add rulebase function 558b accepts a source or uncompiled rulebase, rule, or ruleset to be used when generating a consolidated rulebase. Add rulebase function 558c accepts a URL identifying a remote location of a rulebase, rule, or ruleset to be used when generating a consolidated rulebase. As each rulebase, rule, or ruleset is added using the add rulebase functions 558a-558c, it is merged with previously-added rulebases, rules, and rulesets. Compile function 560 compiles the merged rulebase to create a binary rulebase.

Generate application interface document function 562 generates an application interface document. Generate binary rulebase function 564 provides a binary rulebase to client application 122 through an output stream, and client application 122 can store the output stream into a buffer or other memory. Generate load map function 566 generates a load map for a rulebase.

Because stateful rulebase builder 550 maintains session information, the various function calls 552 supported by rulebase builder 550 can be individually invoked by client application 122. For example, the user using client application 122 may want an application interface document for an existing binary rulebase. Client application 122 could supply the binary rulebase to builder 550 using one of the add rulebase functions 558a. Client application 122 could then generate an application interface document by invoking function 562. If the user later decides to generate a load map, client application 122 can invoke function 566 to generate the load map using the same rulebase builder instance.

Although FIGS. 5A and 5B illustrate example rulebase builders 500, 550, various changes may be made to rulebase builders 500, 550. For example, various function calls 502, 552 could be omitted from builders 500, 550 according to particular needs. Also, additional function calls 502, 552 could be added to builders 500, 550. In addition, while FIGS. 5A and 5B illustrate example data structures 504, 554 used with the function calls 502, 552, other or additional data structures could be used.

FIGS. 6A through 6C are exemplary block diagrams illustrating example inference engines according to one embodiment of this disclosure. In particular, FIG. 6A illustrates a stateless inference engine 600, and FIGS. 6B and 6C illustrate a stateful inference engine 650. Although FIGS. 6A through 6C may be described with respect to system 100 of FIG. 1, inference engine 600, 650 could be used with other systems.

In FIG. 6A, stateless inference engine 600 allows applications to invoke function calls 602 that use data structures 604 as inputs and outputs. In the illustrated embodiment, function calls 602 include a constructor function 606, which creates an instance of inference engine 600 for use by an application. Function calls 602 also include two inference functions 608, 610.

Inference function 608 invokes inferencing by engine 600 using a rulebase 612 and a control object 613 provided to engine 600 as an input. Rulebase 612 may include multiple domains, as shown by domains 416 in FIG. 4. As a result, inference function 608 also receives a domain name 614 as input, where the domain name 614 identifies which domain 416 to use during inferencing. Inference function 608 further receives an identification of any dynamic instances 616 to be created and used during inferencing. Inference function 608 also receives any conditional rulesets 618, which represent additional rules to be used along with the domain identified by domain name 614. In addition, inference function 608 may receive precondition values 620a-620b as input. The precondition values 620 are assigned to the appropriate fields in the identified rulebase 612 and used during inferencing. The precondition values 620 may take the form of a precondition value document 620a or a precondition value array 620b.

Control object 613 defines values 632a-632f used by server 102 to control the operations performed by the inference engine instance. Value 632a instructs the inference engine instance to generate a field value array 626b, while value 632b instructs the inference engine instance to generate a field value document 626a. Value 632c instructs the inference engine instance to generate a rule snapshot 630. Values 632d-632f instruct the inference engine instance to trace various types of events, which may be described in messages 628. In this example, the events may be divided into L1 events, L2 events, and inference events. Other divisions of events could also be used.

Inference function 610 receives many of the same inputs as inference function 608. While inference function 608 receives a binary rulebase 612, inference function 610 receives a URL input 622 identifying the location of the rulebase to be used during inferencing.

Both inference functions 608, 610 return output results 624. Output results 624 may include a set of zero or more field values 626a-626b. Field values 626 represent the values assigned to postconditions by inference engine 600 during inferencing. Depending on values 632a and 632b, field values 626 may take the form of a field value document 626a or a field value array 626b. Output results 624 may also include a set of zero or more messages 628. Messages 628 could include error messages, warning messages, and trace messages produced during the inferencing operations.

Output results 624 may further include a rule snapshot 630. Rule snapshot 630 provides information about the current status of a rule at a particular point in time. The rule snapshot 630 could identify the rule, any ruleset associated with the rule, the priority of the rule, a rule type associated with the rule, the status of the rule, and any fields in the rule that cause the rule to pend.

In FIGS. 6B and 6C, stateful inference engine 650 allows applications to invoke various function calls 652 that use data structures 654 as inputs and outputs. In the illustrated embodiment, constructor functions 654a-654c create an instance of inference engine 650. In particular, function 654a creates an inference engine instance that uses a binary rulebase defined using an input stream, and function 654b creates an inference engine instance that uses a binary rulebase defined using a URL. As explained below, multiple inference engine instances may use the same rulebase, and function 654c creates one inference engine instance based on another inference engine instance that is using the same rulebase.

Domain functions 656a-656b control which domain 416 is used during inferencing. Domain function 656a identifies a domain 416 to be used during inferencing, and domain function 656b removes a domain 416 so it is no longer used during inferencing. Input functions 658a-658b supply values for preconditions to inference engine 650. In particular, function 658a provides a value for a specific precondition, while function 658b provides values for a set of preconditions associated with the current domain 416. A conditional ruleset function 660 supplies additional rulesets to inference engine 650 for use with the current domain 416. A dynamic instances function 662 creates dynamic instances to be used during inferencing. An infer function 664 begins the inferencing process using the rules contained in the current domain 416. Output functions 666 supply values for postconditions computed by inference engine 650. In particular, function 666a creates an output value document containing the values for a set of postconditions, function 666b provides the value of a specific postcondition, and function 666c provides the values of all preconditions and postconditions. Snapshot function 668 generates and outputs a rule snapshot for the current domain.

Because stateful inference engine 650 maintains session information, additional functions may be offered by inference engine 650. For example, inference engine 650 may provide explanatory services, which are used to determine how values get assigned to certain fields during inferencing. Begin explanation function 670 receives the identity of a field as input and identifies the rule that assigned a final value to that field. Explain rule firing function 672 uses the rule identified by the begin explanation function 670 and determines what caused that rule to fire. This may include identifying any fields that caused the rule to fire and the values of those fields. Explain field resolution function 674 uses a field identified by the explain rule firing function 672 and determines how a value was assigned to that field. These functions 670-674 allow client application 122 to trace how and why values were assigned to fields during inferencing. These functions 670-674 may require that server 102 monitor and archive the various steps performed during inferencing. Because this monitoring may impose additional processing requirements during inferencing, tracking functions 676a-676b allow client application 122 to specify when server 102 should monitor the steps performed during inferencing. This allows client application 122 to control when this additional processing is needed.

The use of stateful inference engine 650 may also allow server 102 to provide truth maintenance ("TM") functions to client application 122. During inferencing, assigning a known value to a field can trigger a cascade of consequences. For example, if a rule was previously pended because the field had no known value, assigning a value to that field may cause inference engine 650 to unpend and then fire the rule. The fired rule may, in turn, resolve other fields which, in turn, causes inference engine 650 to unpend and fire additional rules. Truth maintenance refers to a facility that allows a client application 122 to retract or reverse the assignment of a value to a field, thereby retracting the consequences of that assignment. This means that the truth maintenance functionality may be useful for "what-if" type reasoning. As a particular example, in a loan-approval application, a borrower may want to experiment with several different variables, such as the loan amount, the loan term, and the interest rate. In these situations, there may not be an "answer" so much as a collection of hypothetical scenarios, and the answer might be known only after experimenting with alternative scenarios.

To support truth maintenance, set TM value function 678 indicates that a particular field may be assigned a retractable value. A retractable value represents a value assigned during an assignment that can be negated. Client application 122 may assign multiple values to the selected field. Confirm TM value function 680 sets the current value of a particular field as that field's non-retractable value. A non-retractable value represents a value assigned during an assignment that cannot be negated. Retract TM value function 682 retracts the field back to its last non-retractable value. In operation, client application 122 could assign five retractable values to the field. Client application 122 could then assign a non-retractable value to the field, followed by seven more retractable values. In this example, the last seven values assigned to the field could be retracted, but the first five could not. The presence of the non-retractable value prevents inference engine 650 from retracting any values assigned before the non-retractable value was assigned. Returning to the loan example, the selected field could represent the loan amount that a borrower wants to receive. During some experimentation, the field may be assigned multiple retractable values. Eventually, the user may identify a maximum amount that the borrower is allowed to receive. That maximum amount could be assigned as a non-retractable value. Additional experimentation could be done that assigns additional retractable values to the field. Any of these additional values could be accepted as the loan amount, or the values can be retracted to the last maximum loan amount identified as a non-retractable value.

In addition to these functions, handler functions 684a-684b register various communication handlers with an inference engine instance. As described below, the handler functions allow the inference engine instance to communicate with client application 122 during inferencing. A reset function 686 resets an inference engine instance to an initial state. This may include, for example, inference engine 650 resetting all field values to the unknown state, deleting all dynamic instances, popping all domains, and running any rulebase-level initialization methods 410.

Although FIGS. 6A through 6C illustrate example inference engines 600, 650, various changes may be made to inference engines 600, 650. For example, various function calls 602, 652 could be omitted from inference engines 600, 650 according to particular needs. Also, additional function calls 602, 652 could be added to inference engines 600, 650. In addition, while FIGS. 6A through 6C illustrate example data structures 604, 654 used with the function calls 602, 652, other or additional data structures could be used.

Figure 7:
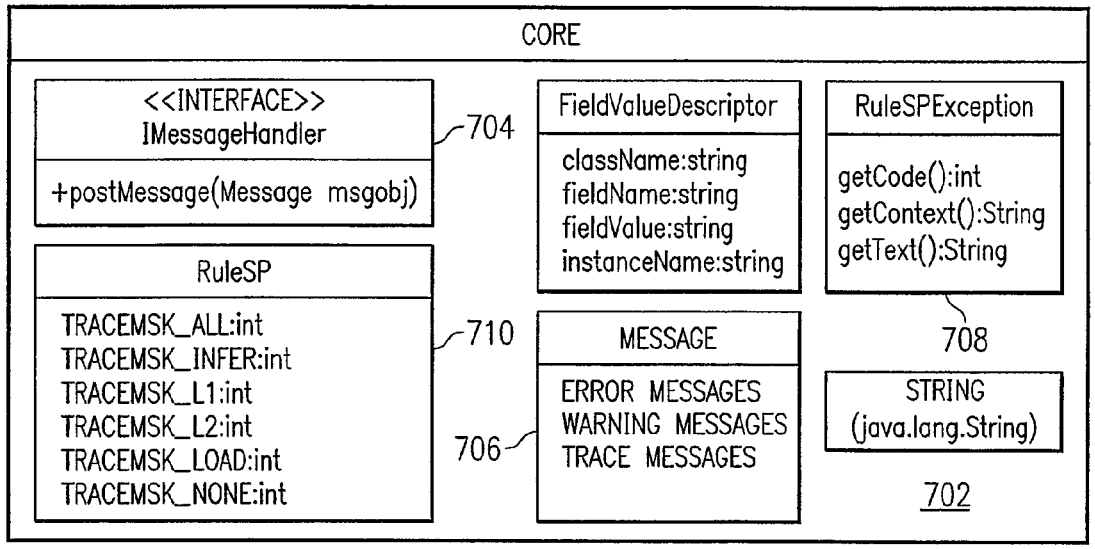
FIG. 7 is an exemplary block diagram illustrating an example core application according to one embodiment of this disclosure.

FIG. 7 is an exemplary block diagram illustrating an example core object 700 according to one embodiment of this disclosure. Core objects 700 represent objects shared by both rulebase builders 500, 550 and inference engines 600, 650. Although FIG. 7 may be described with respect to system 200 of FIG. 2, core object 700 could be used with other systems.

In FIG. 7, core object 700 uses various data structures 702 to communicate with rulebase builders 500, 550 and inference engines 600, 650. Data structures 702 include a message handler 704. Message handler 704 represents a handler used to communicate with client application 222. For example, message handler 704 can be used to intercept messages 706 from a rulebase builder 500, 550 or an inference engine 600, 650. This may allow message handler 704 to capture error, warning, trace, or other messages 706 generated by rulebase builder 500, 550 or inference engine 600, 650. Data structures 702 also include exceptions 708. Exceptions 708 identify errors detected during rulebase building or inferencing.

Data structures 702 may further includes tracemasks 710. Tracemasks 710 indicate how to trace the execution of different functions by server 102. The integer values provided for tracemasks 710 determines the level of detail of the trace messages provided to client application 222. The level of detail may identify whether trace messages are provided and, if so, in what circumstances a trace message should be provided. For example, a value of zero could cause server 202 to provide no trace messages, a value of one could cause server 202 to provide broader trace messages, and higher values could cause server 202 to provide more specific trace messages. In this example, the events are divided into inference events, L1 events, L2 events, and loader events. Other divisions of events could also be used.

Although FIG. 7 illustrates one example of a core object 700, various changes may be made to core object 700. For example, any other or additional data structures 702 could be used.

Figure 8:
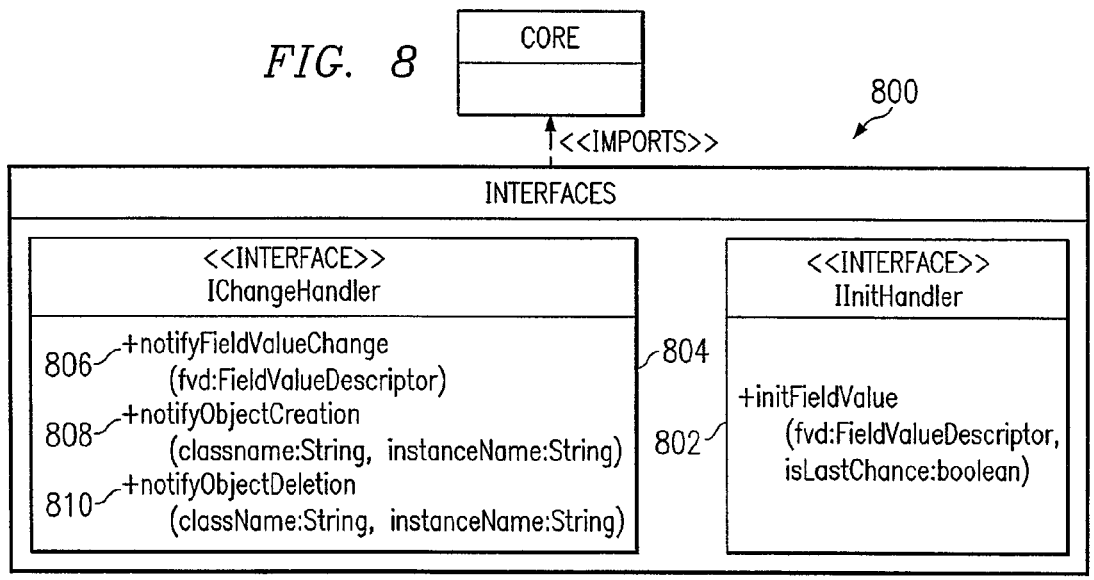
FIG. 8 is an exemplary block diagram illustrating example interfaces according to one embodiment of this disclosure.

FIG. 8 is an exemplary block diagram illustrating example interfaces 800 according to one embodiment of this disclosure. In this embodiment, interfaces 800 include an initialization handler 802 and a change handler 804. Although FIG. 8 may be described with respect to system 100 of FIG. 1, interfaces 800 could be used with other systems.

Initialization handler 802 allows a client application 122 to initialize a field value. For example, inference engine 650 may attempt to execute a rule during inferencing, but that rule may involve an unknown field. Inference engine 650 could pend the rule and see if the unknown field is resolved later. Instead of or in addition to pending the rule, inference engine 650 could invoke initialization handler 802 and ask client application 122 whether client application 122 wants to provide a value for the unknown field. If client application 122 provides a value, inference engine 650 could use the value and continuing inferencing.

The use of initialization handler 802 may be useful when a large number of preconditions exist for a rulebase. For example, a rulebase could have 1,000 preconditions. Without the use of initialization handler 802, client application 122 would provide input values for all 1,000 preconditions before inferencing begins. With the use of initialization handler 802, client application 122 could provide input values for some of the preconditions, and inference engine 650 could attempt to complete inferencing using those values. If inference engine 650 is unable to complete inferencing and needs values for more of the preconditions, client application 122 can use initialization handler 802 to provide input values for the necessary preconditions.

Change handler 804 allows server 102 to inform client application 122 when inference engine 650 modifies various data objects. For example, function 806 informs client 122 when a field value is changed. Function 808 notifies client application 122 when an object is created, and function 810 notifies client application 122 when an object is deleted.

The use of change handler 804 may be useful when a large number of postconditions are being calculated by inference engine 650 during inferencing. For example, a rulebase could have 1,000 postconditions. Without the use of change handler 804, client application 122 may need to wait until inference engine 650 completes inferencing before receiving a set of 1,000 output values from inference engine 650. With the use of change handler 804, client application 122 could be notified whenever one of the postconditions is assigned a value. In this way, client application 122 learns when each individual postcondition is assigned a value, even when inferencing has not been completed.

Although FIG. 8 illustrates example interfaces 800, various changes may be made to interfaces 800. For example, any other or additional communication handlers could be used. Also, each handler 802, 804 could support any other or additional functions.

FIGS. 9A and 9B are exemplary block diagrams illustrating example types of rules according to one embodiment of this disclosure. In particular, FIG. 9A illustrates a pattern matching rule 900, and FIG. 9B illustrates a decision tree rule 950. Other or additional types of rules may also be used. In addition, while FIGS. 9A and 9B may be described with respect to system 100 of FIG. 1, rules 900, 950 could be used with other systems.

In FIG. 9A, pattern matching rule 900 includes a premise 902, an action 904, and a bind section 906. Premise 902 represents a condition that determines whether or not the action 904 should be executed. Premise 902 may, for example, include one or more expressions 908. Server 102 may examine the expression 908 in premise 902 and determine if the expression 908 is true or false. Using the results, server 102 may then fire rule 900 by executing action 904 if the expression 908 is true, fail rule 900 if the expression 908 is false, or pend rule 900 if a value for the expression 908 cannot be determined.

Action 904 represents one or more actions that are to be performed by server 102 if the premise 902 of rule 900 is true. Action 904 may, for example, indicate that server 102 should assign a particular value to a field. Action 904 could also cause server 102 to execute a function or invoke sub-inferencing over a different rulebase domain.

Bind section 906 identifies the data objects to be monitored by server 102. Because rule 900 is a pattern matching rule, it can be applied to an entire collection of instances or objects that satisfy premise 902. Bind section 906 includes one or more bind variables 910. Inference engine 112 associates a bind variable 910 with one or more candidate instances of the bind class. Inference engine 112 then applies the bind variable 910 against the premise 904 to determine if any of the candidate instances satisfy the premise 902. In this way, inference engine 112 determines whether the candidate instances deserve further attention. If any of the candidate instances satisfy the premise 902, server 102 executes the action 904 using those candidate instances.

In the illustrated example, a bind variable 910 of P is associated with the Person class, while another bind variable 910 if D is associated with the Duck class. Rule 900 operates to associate a Person object representing a person with a Duck object representing a duck when the person is older than the duck and the person owns no other ducks. Server 102 binds the Person objects to the P variable 910 and the Duck objects to the D variable 910. Using the bind variables 910, server 102 examines existing Person and Duck objects and determines if any satisfy premise 902. If any satisfy the premise 902, server 102 applies the action 904 of rule 900 to each of those data objects. The action 904 increments the number of ducks owned by the person and associates the person with the duck.

In a particular embodiment, server 102 keeps pattern matching rules 900 in a ready state and does not fail or pend pattern matching rules 900. In another particular embodiment, a pattern matching rule 900 may act as a single-fire rule. In this embodiment, inference engine 112 waits until a threshold number of objects are bound to bind variables 910. Once the threshold number is met, inference engine 112 executes the pattern matching rule 900 once using those objects. The executed pattern matching rule 900 may then be ignored by inference engine 112.

Because a rulebase could include a large number of objects, server 102 may use one or more algorithms to increase the efficiency of processing pattern matching rules 900. For example, server 102 could use a Rete algorithm. Using a Rete algorithm, server 102 detects when an object is created, modified, or deleted. Server 102 then executes any pattern matching rule 900 having a premise 902 that uses a field affected by the creation, modification, or deletion. Server 102 may examine the premise 902 of any pattern matching rule 900 located and, if the premise 902 is satisfied, execute the action 904.

In one embodiment, when applying the action 904 of a first pattern matching rule 900, server 102 could create, modify, or delete objects. Those objects could be affected by the same pattern matching rule 900 or another pattern matching rule 900. As a result, the action 904 could lead to the binding of the new objects to one or more rules 900.

In FIG. 9B, decision tree rule 950 includes an evaluation statement 952, or subtree, followed by two or more treenodes 954a-954e. Each subtree may be named such that it may easily be associated with a rule. Evaluation statement 952 evaluates and determines a value of an expression 956. Based on the calculated value of the expression 956, one of the treenodes 954 is executed.

Each treenode 954 includes either a case statement 958 or an otherwise statement 960, followed by an action to be performed. Case statement 958 identifies a potential value or range of potential values for the expression 956. If the value of the expression 956 matches the value or falls within the range of values of the case statement 958, the treenode 954 associated with the case statement 958 is executed. The otherwise statement 960 identifies a treenode 954 that is executed if no other treenode 954 can be executed.

The action to be performed in a treenode 954 can further include additional subtrees. For example, treenode 954a includes another evaluation statement 962 and two treenodes 964a-964b. In this way, rule 950 can be divided into hierarchical layers of subtrees, and server 102 may traverse through the subtrees to arrive at the appropriate action to be performed.

In the illustrated example, expression 956 calculates an age, and one of the treenodes 954 is selected based on the calculated age. If the calculated age has a known value, treenodes 954a, 954b, or 954c could be selected depending on the value. If the calculated age is unknown, such as when the value depends on a field with an unknown value, treenode 954d is selected. If the calculated age is known but falls outside of the ranges of the case statement in treenodes 954a-954c, treenode 960 may be selected.

In a particular embodiment, server 102 may use a just-in-time memory allocation scheme for decision tree rules 950. In a just-in-time allocation scheme, server 102 loads only a portion of a decision tree rule 950 into memory, such as memory 126. The portion of rule 950 that is loaded allows server 102 to identify the treenode 954 to be traversed. After server 102 identifies the treenode 954 to be traversed, server 102 loads the contents of that treenode 954 into memory. If the loaded treenode 954 includes additional subtrees 964, server 102 loads only the portion of rule 950 that allows server 102 to select the next subtree 964 to be traversed. After the next subtree 964 is selected, server 102 loads the contents of that subtree 964 into memory. This process continues until server 102 fires or fails rule 950, at which point server 102 may release the memory used by rule 950. The use of a just-in-time allocation scheme may reduce the amount of memory used by a decision tree rule 950. Because a decision tree rule 950 may contain hundreds or thousands of embedded subtrees, the use of a just-in-time allocation scheme may help to decrease the memory requirements for processing the decision tree rule 950.

In one embodiment, server 102 may be forced to pend a decision tree rule 950. For example, server 102 may select treenode 954b during inferencing, but the field Fact3 may have an unknown value. In this example, server 102 would pend rule 950 because server 102 is unable to complete execution of rule 950. In a particular embodiment, server 102 performs a pinpoint restart to unpend and complete execution of rule 950. When rule 950 pends, server 102 may take a snapshot of rule 950. The snapshot identifies the context of rule 950, such as values for fields used in rule 950 and the precise location of the statement that caused rule 950 to pend. In the above example, the snapshot could identify the location of evaluation statement 966 because that is the statement that caused rule 950 to pend. When the field that caused rule 950 to pend is assigned a known value, server 102 may unpend rule 950 and begin executing rule 950 at the location stored in the snapshot. This may allow server 102 to more efficiently pend and unpend decision tree rules 950, which may contain a large number of subtrees.

Although FIGS. 9A and 9B illustrate example rules 900, 950, various changes may be made to rules 900, 950. For example, rule 900 could include any number of bind variables 910, and rule 950 could include any number of subtrees. Also, other or additional types of rules may be used.

FIG. 10 is an exemplary block diagram illustrating an example memory arrangement for sharing a rulebase according to one embodiment of this disclosure. In particular, FIG. 10 illustrates a memory 1026 for use in server 102 of FIG. 1, where multiple client applications 122 use the same rulebase 114 during inferencing. In this embodiment, memory 1026 includes a read-only image 1050 of rulebase 114 and one or more client-specific information blocks 1052. While FIG. 10 may be described with respect to system 100 of FIG. 1, memory 1026 could be used with other systems.

Read-only image 1050 represents a copy of the rules 116 in a rulebase 114. Server 102 may create read-only image 1050 by loading rulebase 114 into memory 1026 from database 104 or other location. Because rulebase 114 can define its own data objects that are used by server 102, rulebase 114 may not be tied to any particular application. As a result, rulebase 114 can be used by multiple clients applications 122 at the same time. In a particular embodiment, read-only image 1050 contains a copy of rulebase 114 without any client-specific information.

The client-specific information, such as actual precondition values and postcondition values, may be stored in client-specific information blocks 1052. Client-specific information blocks 1052 include client-specific information 1054 and a pointer 1056. The client-specific information 1054 represents precondition values, postcondition values, snapshots of pending rules 116, and any other information that is specific to a client application 122. Pointer 1056 points to the read-only image 1050 that is associated with the client-specific information 1054.

In one aspect of operation, when a client application 122 requests inferencing using a rulebase 114, server 102 may determine whether a read-only image 1050 of that rulebase 114 already exists in memory 1026. If not, server 102 may load rulebase 114 into memory 1026 as read-only image 1050. Inference engine 112 may then perform inferencing operations using the read-only image 1050. If a client application 122 requests inferencing using a rulebase 114 that already has been loaded into memory 1026 as a read-only image 1050, inference engine 112 may perform inferencing operations using the read-only image 1050 previously created. During inferencing, any values to be stored for a particular client application 122 are placed in the client-specific information 1054 of a client-specific information block 1052. In this way, server 102 can use the same rulebase 114 to perform inferencing operations for multiple client applications 122, even when the inferencing involves different input values and the rules 116 are executed in a different order.

In one embodiment, the use of memory 1026 as described above may be limited. For example, in a particular embodiment, supplemental rules 116, rulebases 114, and rulesets 130 may not be shared between multiple inference engine instances. In this embodiment, an image of the supplemental rules 116, rulebases 114, and rulesets 130 may not be used by multiple inference engine instances.

Although FIG. 10 illustrates one example of a memory 1026 arranged for sharing a rulebase 114 between multiple client applications 122, various changes may be made to memory 1026. For example, each client-specific information block 1052 could be stored in a separate memory structure. Also, other memory arrangements that do or do not allow client applications 122 to share a rulebase 114 may be used.

FIGS. 11A through 11D are exemplary block diagrams illustrating example rulebase components being merged into a consolidated rulebase according to one embodiment of this disclosure. In particular, FIGS. 11A through 11C represent rulebase components 1150a-1150c, and FIG. 11D represents a consolidated rulebase component 1150d. While FIGS. 11A through 11D may be described with respect to system 100 of FIG. 1, the rulebase components 1150 could be used with other systems.

In FIG. 11A, component 1150a represents a rule 1152. The rule 1152 is contained in a ruleset 1154, which forms part of a domain 1156. Rule 1152 refers to two instances 1158 of a Person class named Father and Mother.

In FIG. 11B, component 1150b represents a partial declaration of the Person class 1160, which is contained in domain 1156. The class 1160 includes a declaration of a field 1162 called Name. Component 1150b also includes a declaration of the Father instance 1158a.

In FIG. 11C, component 1150c represents another partial declaration of the Person class 1160 contained in domain 1156. The class 1160 also includes a declaration of a field 1164 called Age. Component 1150c also includes a declaration of the Mother instance 1158b.

Rulebase builder 110 may merge components 1150a-1150c by performing activities in stages. In one embodiment, during a first stage, rulebase builder 110 examines components 1150a-1150c to collect classes that define data objects and logic objects. During this stage, rulebase builder 110 may create one or more internal data structures identifying all of the classes defined by the components 1150. In a second stage, rulebase builder 110 parses the internal data structures from stage one to help ensure completeness and consistency between the class declarations. For example, if a class defines a rule that operates on an instance named Brother, rulebase builder 110 may ensure that the instance named Brother is created by a component 1150. During a third stage, rulebase builder 110 may compile the parsed data structures to produce a binary rulebase 114.

During the first stage, the components 1150 examined by rulebase builder 110 could each define a portion of a class. In the illustrated example, components 1150b and 1150c define different portions of the Person class 1160. As a result, during the first stage of the merge process, rulebase builder 110 keeps track of the class declarations encountered as each component 1150 is analyzed. If two components 1150 define portions of a single class, rulebase builder 110 combines those declarations into a single class declaration. This may be seen in FIG. 11D, which illustrates a complete declaration of the Person class 1160 in rulebase 1150d.

Assuming that rulebase builder 110 examines component 1150b and then component 1150c, rulebase builder 110 would access component 1150b and determine that component 1150b contains a declaration of class 1160. Rulebase builder 110 would examine the internal data structure that contains all previously encountered declarations, determine that the class 1160 had not been declared by a previously examined component 1150, and add class 1160 and field 1162 to the internal data structure. Rulebase builder 110 would continue on to component 1150c and locate another declaration of class 1160. Rulebase builder 110 may examine its internal data structure, determine that class 1160 has been declared in a previously examined component 1150, and add field 1164 to the class 1160 in the data structure. This produces the overall declaration of class 1160 shown in FIG. 11D, which includes a single declaration of class 1160 having fields 1162, 1164. In a similar manner, rulebase builder 110 may locate each declaration of an instance 1158 encountered in components 1150 and form a single declaration as shown in FIG. 11D.

As described above with respect to FIG. 4, a rulebase 114 may define classes at multiple levels of the rulebase 114 (rulebase-level, domain-level, or ruleset-level). Also, classes with the same name can exist at different levels in the rulebase 114. Because of that, the internal data structure created during stage one of the merge process specifies the scope of the class. For example, in FIG. 11D, class 1160 is shown to exist in domain 1156. If another Person class is declared in ruleset 1154, the resulting rulebase 1150d would contain another class definition appearing as part of ruleset 1154. If yet another Person class is declared at the rulebase level, the resulting rulebase 1150d would contain yet another class definition appearing as part of rulebase 1150d, outside of domain 1156.

During the first stage, rulebase builder 110 may detect class declarations that involve the same fields. In some cases, the declarations may match one another, such as when multiple components 1150 declare that the Person class 1160 includes a Name field 1162. In other cases, the declarations may conflict with each other, and rulebase builder 110 may be unable to resolve the conflict. For example, component 1150c could define the Age field 1164 as a number, while another component 1150 defines the Age field 1164 as a string. These declarations conflict with one another, and rulebase builder 110 could generate an error message. In yet other cases, the declarations may conflict with each other but be resolvable by rulebase builder 110. As an example, component 1150c could define the Age field 1164 as a number, while another component 1150 defines the Age field 1164 as a number limited to a value between 0 and 120. Rulebase builder 110 could resolve this conflict by using the more limited declaration, which in this example would be the declaration with the constraint.

In one embodiment, rulebase builder 110 uses no defined order when visiting components 1150 during the first stage of the merge process. As a result, rulebase builder 110 could process a rule 1152 that uses an instance 1158 of a class 1160 before the structure of that class 1160 is defined. In a particular embodiment, the internal data structure used by rulebase builder 110 helps to reduce or eliminate the use of forward declarations during the rulebase merging process.

After creating the consolidated rulebase 1150d, rulebase builder 110 parses rulebase 1150d. For example, rulebase builder 110 analyzes rule 1152 to determine whether Father and Mother are instances that have been declared. Rulebase builder 110 also determines whether the class associated with the Father and Mother instances include an Age field. Rulebase builder 110 further determines whether the datatype associated with the Age field is appropriate for the operation performed in rule 1152. In this example, the value of Age is being compared to a value of 65, so rulebase builder 110 determines whether Age has been declared as a number datatype. In addition, rulebase builder 110 examines the merge results and determines whether each method that was declared also has an associated implementation. In this example, a method may be declared in one rulebase component 1150, and the developer of that component 1150 assumed the developer of another component 1150 could provide the method implementation. If neither developer defined how the method was to be implemented, rulebase builder 110 may generate an error message. Rulebase builder 110 may take other or additional steps to parse the consolidated rulebase 1150*d*.

During the third stage, rulebase builder 110 compiles the parsed rulebase 1150*d*. In one embodiment, the rulebase 1150*d* is defined by a format that disallows expressions from having any side effects. A "side effect" occurs when the values of a field change when inference engine 112 is evaluating an expression. For example, in FIG. 9B, inference engine 112 evaluates expression 956 by calling a function called GetAge. In this embodiment, inference engine 112 is not allowed to modify the values of any fields when executing the GetAge function. To help reduce or eliminate the presence of side effects in rulebase 1150*d*, rulebase builder 110 identifies whether a method returns a value. If the method returns a value, that method may not include any steps that change the value of a field (except for local variables used in the method). Also, the method that returns a value may not invoke a second method that changes the value of a field (except for local variables used in the second method). In another embodiment, rulebase builder 110 may allow expressions in a rulebase to have side effects.

During the rulebase building process, rulebase builder 110 could also generate tables associated with the use of final-valued fields. As described above, a first-valued field is a field that should be assigned a value only once, while a final-valued field is a field that may be assigned multiple values over time. During inferencing, the useful value of the final-valued field is typically not known until all of the rules that could change the value of the final-valued field have been fired or failed. During the rulebase building process, rulebase builder 110 could generate a table for a final-valued field. The table could identify rules that might change the value of the final-valued field and rules that use the final value of the final-valued field. In this way, inference engine 112 could use the table to fire or fail all of the rules that might change the value of the final-valued field. Once all of those rules have been executed, inference engine 112 could fire or fail the rules that use the final value of the final-valued field. In a particular embodiment, decision tree rules can use final-valued fields, and pattern-matching rules cannot. In this embodiment, the table constructed during rulebase building would identify only the decision tree rules that are associated with the final-valued field.

FIG. 12 is an exemplary flow diagram illustrating an example method 1200 for providing inferencing services according to one embodiment of this disclosure. Although method 1200 may be described with respect to system 100 of FIG. 1, other systems may be used.

Server 102 receives information identifying one or more rules 116 at step 1202. This may include, for example, API 120 receiving a binary rulebase 114 having one or more domains 131 and API 120 receiving a domain 131 selection. This may also include API 120 receiving the location of a binary rulebase 114. The information may come from any suitable source, such as a client application 122 attempting to invoke the inferencing services of inference engine 112.

Server 102 identifies any preconditions and any postconditions associated with the identified rules 116 at step 1204. This may include, for example, inference engine 112 using information contained in a domain 131 to identify any preconditions and postconditions associated with that domain 131.

Server 102 receives values for the identified preconditions at step 1206. This may include, for example, API 120 receiving values for the preconditions from the client application 122 invoking inference engine 112. Inference engine 112 could receive the precondition values individually from client application 122, as a group in an XML document, through an initialization handler, or in other suitable ways.

Server 102 executes the rules 116 using the precondition values at step 1208. This may include, for example, inference engine 112 firing, failing, and pending various rules 116 to try resolve postcondition fields from an unknown state to a known state. This may also include inference engine 112 revisiting pending rules 116 after field values have changed to determine if the changes allow inference engine 112 to fire or fail any of the pending rules 116. This may further include inference engine 112 performing forward-chaining or backward-chaining of rules 116.

Server 102 returns the values of any postconditions at step 1210. This may include, for example, inference engine 112 communicating values for the identified postconditions to client application 122. Inference engine 112 could communicate the postcondition values individually to client application 122, as a group in an XML document, through a change handler, or in other suitable ways. Inference engine 112 may have been successful in determining values for all postconditions, some of the postconditions, or none of the postconditions.

Although FIG. 12 illustrates one example of a method 1200 for providing inferencing services, various changes may be made to method 1200. For example, inference engine 112 could receive values for any preconditions and postconditions before receiving the actual rules 116. Also, inference engine 112 could produce additional information during inferencing, such as a rule snapshot. In addition, some of the steps in FIG. 12 may overlap. As an example, inference engine 112 may use a change handler to communicate the postcondition values to client application 122. In this case, the postcondition values may be sent to client application 122 before inferencing has completed.

FIG. 13 is an exemplary flow diagram illustrating an example method 1300 for rulebase building according to one embodiment of this disclosure. Although method 1300 may be described with respect to system 100 of FIG. 1, other systems may be used.

Server 102 receives information identifying one or more rulebase components at step 1302. This may include, for example, rulebase builder 110 receiving a source or binary rule 116, ruleset 130, or rulebase 114. This may also include rulebase builder 110 receiving the location of a source or binary rule 116, ruleset 130, or rulebase 114. The information may come from any suitable source, such as a client application 122 attempting to invoke the rulebase building services of rulebase builder 110.

Server 102 determines whether the received rulebase components have the proper format at step 1304. This may include, for example, server 102 determining whether the received rulebase components are contained in XML documents. This may also include server 102 determining whether the received rulebase components follow the format defined in the Rule Definition Language. If not, server 102 converts and reformats the received rulebase components into the proper format at step 1306. This may include, for example, server 102 converting the rulebase components into an XML document and reformatting the rulebase components to follow the Rule Definition Language.

Server 102 merges the rulebase components into a consolidated rulebase 114 at step 1308. This may include, for example, server 102 identifying a declaration of a class or other data object in a rulebase component. This may also include server 102 looking in an internal data structure to determine if a previously examined rulebase component included another declaration of the same class or other data object. If not, server 102 adds the declaration to the internal data structure. Otherwise, server 102 inserts elements from the current declaration into the previous declaration contained in the internal data structure. When server 102 finishes generating the internal data structure, server 102 may generate a consolidated rulebase 114 that contains the elements in the internal data structure.

Server 102 compiles the consolidated rulebase 114 at step 1310. This may include, for example, server 102 parsing the consolidated rulebase 114 into various structures, each structure corresponding to an XML element defined in the Rule Definition Language. This may also include server 102 identifying links between the various elements of the structures to create interconnections between the structures. This may further include server 102 creating a binary version of the consolidated rulebase 114.

Although FIG. 13 illustrates one example of a method 1300 for rulebase building, various changes may be made to method 1300. For example, rulebase builder 110 could only receive rulebase components that have the proper format, and rulebase builder 110 need not convert the rulebase components. Also, rulebase builder 110 could produce additional information, such as load maps and application interface documents.

FIG. 14 is an exemplary flow diagram illustrating an example method 1400 for merging rulebase components according to one embodiment of this disclosure. Although method 1400 may be described with respect to system 100 of FIG. 1, other systems may be used.

Server 102 selects a rulebase component at step 1402. This may include, for example, rulebase builder 110 selecting one of one or more rulebase components 1150 supplied by a client application 122. Server 102 parses the selected rulebase component into one or more rulebase elements at step 1404. This may include, for example, rulebase builder 110 dividing a rulebase component 1150 into various declarations, such as class declarations.

Server 102 selects a rulebase element at step 1406. This may include, for example, rulebase builder 110 selecting the rulebase element that appears first in the selected rulebase component 1150. Server 102 creates a standard element that corresponds to the selected rulebase element at step 1408. This may include, for example, rulebase builder 110 creating an internal object that corresponds to the rulebase element, such as an XML rulebase element.

After server 102 creates the corresponding standard element, server 102 determines whether a previously encountered standard element has the same name and resides at the same rulebase level at step 1410. This may include, for example, rulebase builder 110 analyzing an internal data structure containing previously encountered standard elements. This may also include rulebase builder 110 determining whether a previously encountered standard element has the same name, resides on the same hierarchical rulebase level, and represents the same type of element as the selected standard element. If any of these conditions is not true, server 102 inserts the selected standard element into the internal data structure at step 1418. This may include, for example, rulebase builder 110 inserting the standard element into the appropriate location in the internal data structure based on the hierarchical level at which the standard element resides.

If all three of the conditions are met at step 1410, two separate standard elements define the same rulebase structure at the same rulebase level. Server 102 determines whether only one of the two standard elements defines rulebase logic at step 1412. Rulebase logic may include the definition of an expression used to determine whether a constraint is satisfied, an implementation for a declared method, and an implementation for a rule. If more than one of the standard elements defines rulebase logic for the same rulebase structure, server 102 generates an error at step 1414. This may include, for example, rulebase builder 110 generating an error message that is captured by a message handler and communicated to client application 122. If only one of the standard elements defines rulebase logic for the same rulebase structure, server 102 merges the standard elements at step 1416. This may include, for example, rulebase builder 110 inserting portions from the selected standard element into the standard element contained in the internal data structure.

Server 102 determines whether there are additional rulebase elements of the selected rulebase component to be processed at step 1420. If additional rulebase elements remain, server 102 returns to step 1406 and selects another rulebase element. Otherwise, server 102 determines whether there are additional rulebase components to be processed at step 1422. If additional rulebase components remain, server 102 returns to step 1402 and selects another rulebase component.

After the rulebase components have been processed, the internal data structure created by server 102 contains the standard elements that correspond to the various elements of those rulebase components. Server 102 may then take any other suitable action using the internal data structure. For example, server 102 could semantically analyze the internal data structures corresponding to logic and generate binary instructions for that logic.

Although FIG. 14 illustrates one example of a method 1400 for merging rulebase components, various changes may be made to method 1400. For example, rulebase builder 110 could receive one rulebase component at a time, so rulebase builder 110 need not select a rulebase component at step 1402. Also, rulebase builder 110 could create a standard element for all rulebase components before inserting any of the standard elements into the internal data structure. In addition, while rulebase builder 110 has been described as processing a single internal data structure, other types or number of data structures can be used. Further, rulebase builder 110 could directly compare rulebase XML elements with pre-existing standard elements, thereby avoiding creating redundant standard elements.

Rule Definition Language (RDL)

In one embodiment, rulebases are defined using a Rule Definition Language. The Rule Definition Language defines the structure and the contents of one or more XML documents that form the rulebase. In particular, the Rule Definition Language supports object definitions, such as the definition of classes, fields, methods, and static instances, as well as the definition of constraints and rules organized into domains.

Although the Rule Definition Language may be described below in reference to system 100 of FIG. 1, other systems may use the Rule Definition Language. Also, systems may use other languages to define rulebases.

1. Overview

In general, the Rule Definition Language allows a user to specify which objects in a rulebase 114, such as classes, instances, fields, domains, and rulesets, may be shared with a client application 122 as public objects. By default, other objects specified in rulebase 114 may remain private to that rulebase 114. For shared fields, the user may specify whether each field is accessible as a precondition or as a postcondition.

The Rule Definition Language supports two types of rules 116, pattern matching rules and decision tree rules. Both types of rules are used during forward-chaining, while decision tree rules are used during backward-chaining.

The Rule Definition Language supports a number of different datatypes, including Numbers, Booleans, Strings, Association instances, Sets, and Instance References. A Number represents a generic numeric datatype that does not distinguish between integers and floating-point values. The values may be of arbitrary size, and the precision of the Number may be specified using a precision flag. Values may also be rounded to the nearest neighboring value according to particular needs. In one embodiment, if two neighboring values are equidistant, inference engine 112 could always round to the nearest even neighbor or to the nearest odd neighbor. A Boolean represents a value of TRUE or FALSE. A String represents a sequence of Unicode characters and is not case sensitive.

An Association instance defines a relationship between rulebase instances. For example, a Person instance may be the spouse of another Person instance, or a Person instance may own a Duck instance. The Rule Definition Language could support any suitable type of association, such as one-to-one, one-to-many, many-to-one, and many-to-many associations. As a particular example, the Rule Definition Language could support Ownership (Owns and IsOwnedBy) associations, Managership (Manages and IsManagedBy) associations, Spousalship (IsSpouseOf) associations, and Siblingship (IsSiblingOf) associations. For example, a Duck instance's field may define an IsOwnedBy association with a Person instance, indicating that the Duck is owned by the identified Person.

An instance reference in one instance represents a reference to another instance. For example, a Duck class may define an instance reference to a Person, identifying the Person instance that owns a given Duck instance. In this example, the instance reference acts as a pointer to the other instance. As with the other datatypes, an instance reference may be in either a known or unknown state. If in a known state, the instance reference value may either reference an instance or be a null. The null value may be distinguished from an unknown value in that the unknown value represents an unknown relationship, while a null value indicates the known lack of a relationship.

A set represents an unordered collection of unique elements. The elements may be of any of the above datatypes. In a particular embodiment, all elements should be of the same datatype. The Rule Definition Language may or may not support sets of sets. The Rule Definition Language may also support other datatypes, such as lists, dates, and times.

The Rule Definition Language may classify decisions to be made by inference engine 112 into either rule premises or constraint expressions. This helps to restrict decision making to fewer, better-defined contexts. This also helps to encourage developers creating a rulebase 114 or a portion of a rulebase 114 to write cleaner, more atomic rules. This may further reduce or eliminate the use of IF-THEN rules in rulebase 114. The Rule Definition Language may also disallow expressions from having any side effects.

The Rule Definition Language may further limit the usage of pointers and dynamically-allocated objects. For example, the Rule Definition Language may limit the use of pointers to fields in an Association instance and in the bind variables used in pattern matching rules. This helps to facilitate analysis of the rules 116 in a rulebase 114 before inferencing begins and the pointers are used. In a particular embodiment, the analysis of the rulebase 114 may occur when rulebase builder 110 is building a rulebase 114, rather than by inference engine 112 before inferencing begins. In another embodiment, the use of pointers may not be limited or may be limited in other ways.

In addition, to allow third party vendors to add functionality and additional information to a rulebase 114, the third party vendors could add prefixes to the elements and fields they define and use in a rulebase 114. In certain embodiments, a prefix may be XML namespace prefix. Inference engine 112 could process any elements and fields that are defined in the Rule Definition Language and ignore any other elements and fields, such as elements and fields having a prefix.

The following description of the Rule Definition Language assumes that a rulebase 114 includes one or more XML documents. In the following description, the contents of the XAL documents are described using Backus-Naur Form (BNF) notation, and examples of rulebase logic use infix notation. This is for illustration only. Other notations used to describe the contents of XML documents and examples could be used. Also, in other embodiments, rulebases 114 could include other types of information and is not limited to XML documents.

2. Element Attributes

The Rule Definition Language supports the following attributes:

```
AbortMsg__Attrib
    ::= abort__msg="<StringVal>"      // No default
AppShared__Attrib
    ::= appshared="true"
    ::= appshared="false"             // Default
CaseSensitivity__Attrib
    ::= case__sens="true"
    ::= case__sens="false"            // Default
Collection__Attrib
    ::= coll__type="set"
    ::= coll__type="none"             // Default
DataType__Attrib // No default
    ::= type="number"
    ::= type="boolean"
    ::= type="string"
    ::= type="inst__ref"
Enabled__Attrib
    ::= enabled="true"                // Default
    ::= enabled="false"
Intrinsic__Attrib
    ::= intrinsic="true"
    ::= intrinsic="false"             // Default
LocTag__Attrib
    ::= loc__tag="<StringVal>"        // No default
Name__Attrib
    ::= name="<Identifier>"           // No default
ParamIOType__Attrib
    ::= iotype="in"                   // Default
    ::= iotype="out"
PMOptions__Attrib
    ::= options="<Options>"   // Default (least-recent, multi-fire)
Post__Attrib
    ::= post__type="conditional"
    ::= post__type="unconditional"    // Default
Precision__Attrib
    ::= precision="<IntegerVal>"      // Default: "0"
Priority__Attrib
    ::= priority="<IntegerVal>"       // Default: "0"
ResolutionType__Attrib
    ::= res__type="first__valued"     // Default
    ::= res__type="final__valued"
ResumeVal__Attrib
    ::= resume__val="<Value>"         // No default
Value__Attrib
    ::= value="<Value>"               // No default
```

Later sections refer to these attributes. In many cases, this list defines the actual values an attribute may have, such as TRUE and FALSE. In other cases, this list reflects symbolic values, in which case the symbolic values are bracketed (< >) and more fully explained below.

3. Root Element

This element is the root element of the XML document and defines the overall structure of a rulebase 114. It has a format of:

```
Rulebase_Element
    ::= ('rulebase' RB_Attribs+)
        RB_Section*
Rulebase_Attribs
    ::= Name_Attrib      // Required
    ::= LocTag_Attrib    // Optional
Rulebase_Section
    ::= InitMethodDef_Element
    ::= Assoc_Element
    ::= ConstraintSet_Element
    ::= ExternalLib_Element
    ::= Class_Element
    ::= Domain_Element
```

Name_Attrib specifies a name for the rulebase 114, such as an alphanumeric string. Inference engine 112 may use this name in error and trace messages. Rulebase_Section includes zero or more sub-elements, and these sub-elements define the objects exposed at a global scope within the rulebase 114. For example, InitMethodDef_Elements define rulebase-level initialization methods, Assoc_Elements define rulebase-level relationships between rulebase-level classes, and ConstraintSet_Elements define rulebase-level sets of methods for constraining value assignments to rulebase-level fields. ExternalLib_Elements define external libraries that could be invoked from the rulebase 114, and Class_Elements define rulebase-level classes of fields, methods, and static instances. Domain_Elements define rulebase-level domain resources.

All of these sub-elements may be optional since, as described above and below in more detail, the Rule Definition Language supports merging fragments of incomplete rulebases to form a complete rulebase 114. Also, as described below, each sub-element may specify a Name_Attrib. These names may be unique at the rulebase level but may be overridden at lower levels. If a rulebase 114 defines same-named objects at a given level, rulebase builder 110 may merge those objects into a single rulebase object during the merge process.

4. InitMethodDef_Element

This element defines a method for initializing objects in the rulebase 114 and has a format of:

```
InitMethodDef_Element
    ::= ('init_method' InitMethodDef_Attribs+)
        [InitMethodBody_Element]
InitMethodDef_Attribs
    ::= Name_Attrib      // Required
    ::= LocTag_Attrib    // Optional
```

InitMethodDef_Element defines method logic that initializes level-specific fields and external libraries. For example, this element may initialize various fields that are subsequently referenced by rules and constraints. Inference engine 112 invokes this method when first loading resources for the level. In one embodiment, inference engine 112 may invoke this method once. When there are multiple InitMethodDef_Elements at a given level, inference engine 112 may invoke the elements in any suitable order. The initialization methods defined in this element may accept no arguments and return no values. The methods may be free to invoke other methods and to access any and all objects within their scope level. In one embodiment, the methods may be unable to initiate inferencing or attempt to read fields in the unknown state. In this embodiment, upon detecting any of these operations, inference engine 112 may immediately abort inferencing with an error message.

This element may be specified at several different levels in a rulebase 114. For example, it can be specified at the rulebase level, the domain level, and the ruleset level. At a given level, there may be multiple specifications of this element, but each should have different names. Also, multiple sub-rulebases can contribute InitMethodDef_Elements at the same rulebase level.

In one embodiment, the initialization of fields is subject to field constraints. The method should be sensitive to these constraints and to the fields that such constraints rely on. For example, a field constraint may rely on a field MaximumAge, so the initialization method should help to ensure that this field has been initialized before setting any fields dependent on that constraint.

A sample rulebase 114 could define an InitMethodDef_Element at the rulebase level as follows:

```
<init_method name="RulebaseConstantsInitializer">
    <method_body>
        <![CDATA[
        constants.max_age = 120
        constant.adult_age = 21
        constant.ValidSymptoms = set("symptom1", "symptom2",
                                     "symptom3")
        ]]>
    </method_body>
<init_method>
```

This method initializes various constant fields that are later used by rules and constraints.

5. Assoc_Element

This element defines a relationship between fields and has a format of:

```
Assoc_Element
    ::= ('assoc' Assoc_Attribs+)
        FieldRef_Element      // AssocRole1
        FieldRef_Element      // AssocRole2
Assoc_Attribs
    ::= Name_Attrib           // Assoc name - Required
    ::= LocTag_Attrib         // Optional
FieldRef_Element
    ::= ('field_ref' FieldRef_Attribs+)
        IdentifierSpec        // Class for Field
FieldRef_Attribs
    ::= Name_Attrib           // Field name - Required
    ::= LocTag_Attrib         // Optional
```

This element may be specified at several different levels in a rulebase 114. For example, it can be specified at the rulebase level, the domain level, and the ruleset level. In one embodiment, the association has a name reflecting its significance. For example, an Ownership association might define how a person owns ducks, a Managership association might define how a person manages other persons, and a Spousalship association might define spousal relationships between persons.

The Assoc_Element specifies its member fields as FieldRef_Elements. Each of these sub-elements specifies a field name and a class owning or inheriting that field. Within its respective class, each of these fields may be declared with the instance-reference datatype (see the DataTypeInstRef_Element described below). The specified fields may be for the same class or different classes. For example, a user may define an association between the IsOwnedBy field of a Duck class and the Owns field of a Person class. As another example, a user may define an association between the IsManagedBy field of a Person class and the Manages field of a Person class. A user can further specify the same field for both association roles, such as where the IsSpouseOf field of a Person class plays both association roles.

In one embodiment, the association's multiplicity (one-to-one, one-to-many, many-to-one, many-to-many) may vary according to whether or not the specified fields are sets. For example, if the Owns field of the Person class is a set but the IsOwnedBy field of the Duck class is not a set, the association is one-to-many relationship between Persons and Ducks.

The Assoc_Element element may associate super-classes of objects. For example, it may associate Persons with Birds, and the inference engine 112 may polymorphically interpret the relationship as between a Person and any kind of Bird (Duck, Vulture, etc.).

In a particular embodiment, the Assoc_Element specifies fields whose classes are at the same rulebase level (global, domain, ruleset) as itself. In this embodiment, a domain-level association may only reference fields for domain-level classes, but not fields for global-level classes.

A sample rulebase 114 could define two Assoc_Elements at the rulebase level as follows:

```
<assoc name="Ownership">
    <field_ref name="Owns">
        <identifier name="Person"/>
    </field_ref>
    <field_ref name="IsOwnedBy">
        <identifier name="Duck"/>
    </field_ref>
</assoc>
<assoc name="Siblingship">
    <field_ref name="IsSiblingOf">
        <identifier name="Person"/>
    </field_ref>
    <field_ref name="IsSiblingOf">
        <identifier name="Person"/>
    </field_ref>
</assoc>
```

In addition, rulebase 114 could define Association fields. These fields may be useful for maintaining information that is specific to the association but not to the individual members of the association. For example, a Spousalship association might have a DateOfMarriage field. To use association fields, inference engine 112 may maintain instances of associations, and other instances can access the association instances. For example, a Person instance may need to determine her/his marriage date. This could occur with an intrinsic method, such as:

```
marriage_date = @getAssocValue(Father.spouse,
    spousalship.marriage_date)
    @setAssocValue(Father..spouse, Spousalship.marriage_date,
    20010708)
``` where the first argument specifies an instance involved in the association, and the second argument indicates the relevant association field.

In another embodiment, the associations could be treated as "lending" their fields to participating instances. For example, the Person class could inherit a marriage_date field by virtue of the fact that Person is a role class in the Spousalship association. In that case, the above examples might be recoded as:

```
marriage_date = Father.marriage_date
Father.marriage_date = 20010708
```

Under this approach, field names of the association instance may overlap with the field names of the Person class (and its ascendant classes). Likewise, the Person class (and its ascendant classes) may be unable to define two fields playing Spousalship roles for different association instances. Further, if Person plays a class role in multiple different associations, the associations may need to employ different field names. Optional special prefixes could be used for Association fields to circumvent some of these issues, such as by:

```
marriage_date = Father.Spousalship:marriage_date
Father.Spousalship:marriage_date = 20010708
```

6. ConstraintSet_Element

This element specifies a collection of constraint definitions and has a format of:

```
ConstraintSet_Element
    ::= ('constraint_set' ConstraintSet_Attribs+)
        Constraint_Element*
ConstraintSet_Attribs
    ::= Name_Attrib      // Required
    ::= LocTag_Attrib    // Optional
Constraint_Element
    ::= ('constraint' Constraint_Attribs+)
        GeneralExpr      // Boolean expression
Constraint_Attribs
    ::= Name_Attrib      // Required
    ::= LocTag_Attrib    // Optional
```

ConstraintSet_Element specifies criteria for restricting how values may be assigned to fields. Inference engine 112 may evaluate the constraints before assigning a value to a target field. The constraints may be associated with fields either by means of the field's declaration (using Field-Dcl_Element) or by a static instance field modifier (using StaticInstDef_Element). Each constraint's GeneralExpr may represent a Boolean expression. This expression references an intrinsic identifier (candidate_value) as a symbolic reference to the field's proposed new value. When evaluating the expression, inference engine 112 may substitute the intrinsic identifier for any symbolic references. The expression's value indicates whether the candidate value satisfies the constraint. If the expression value is TRUE, inference engine 112 may permit the value assignment to proceed. Otherwise, inference engine 112 may take an action dependent on the field declaration (or field modifier) specifications.

The expression may invoke methods and access any and all objects within its scope level. In one embodiment, the expression may not attempt to read fields in an unknown state or cause any side effects. In this embodiment, upon detecting any of these operations, inference engine 112 may immediately abort inferencing with an error message.

This element can define multiple constraints, and each of these constraints may have a unique name within the constraint set. This element may also be specified at several different levels in a rulebase 114. For example, it can be specified at the rulebase level, the domain level, and the ruleset level. Inference engine 112 may evaluate the same constraint on behalf of several different fields, such as fields of the same datatype.

A sample rulebase 114 could define two Constraint-Set_Elements at the rulebase level as follows:

```
<constraint_set name="ThingConstraints">
    <constraint name="CheckAgeConstraints">
        <![CDATA[
            @candidate_value >= 0 and @candidate_value <= max_age
        ]]>
    </constraint>
</constraint_set>
<constraint_set name="PersonConstraints">
    <constraint name="CheckSympConstraints">
        <![CDATA[
            @candidate_value <= ValidSymptoms
        ]]>
    </constraint>
</constraint_set>
```

7. ExternalLib_Element

This element allows users to supplement the Rule Definition Language functionality with that supplied by one or more "external" libraries, such as libraries coded in Java or C++. These users could then distribute the external libraries along with the rulebases 114. The ExternalLib_Element provides a gateway to the external libraries. From the standpoint of a rulebase 114, an external library could appear as a "black box" offering methods with input parameters, output parameters, and return values. A rulebase 114 could invoke the methods in the external library as it would methods defined in the rulebase 114 itself. Inference engine 112 could be responsible for mapping the invocations to target environments. The definition of an ExternalLib_Element may require specification of language-specific, platform-specific, or environment-specific settings. As a result, inference engine 112 may or may not need to include some target-specific code.

8. Class_Element

This element defines classes of fields, methods, and static instances. It has a format of:

```
Class_Element
    ::= ('class' Class_Attribs+)
        Class_Item*
Class_Attribs
    ::= Name_Attrib        // Required
    ::= LocTag_Attrib      // Optional
Class_Item
    ::= Parent_Element
    ::= FieldDcl_Element
    ::= ClassMethodDef_Element
    ::= StaticInstDef_Element
Parent_Element
    ::= ('parent' [LocTag_Attrib])
        IdentifierSpec     // Parent Class
```

This element may be specified at several different levels in a rulebase 114. For example, it can be specified at the rulebase level, the domain level, and the ruleset level. Some or all sub-elements may specify a Name_Attrib. Except for method overloading, these names may be unique at the class level but may override names at higher levels and be overridden at lower levels. Also, except for method overloading, if a class defines same-named objects, rulebase builder 110 may merge those objects into a single rulebase object during the merge process. The Class_Element can optionally specify a parent Class_Element, so classes can be organized into an inheritance hierarchy. In one embodiment, a class may have at most one parent class. In a particular embodiment, if a class has a parent, the parent and child classes reside at the same rulebase level (global, domain, ruleset). In this embodiment, a domain-level class would be derived from another domain-level class and could not be derived from a global-level class.

In a particular embodiment, fields and methods are at an instance-level rather than at a class-level, and fields and methods are at a public rather than a private or protected access level. Also, in a particular embodiment, leaf but not parent classes can be instantiated. There may or may not be support for class containment.

A sample rulebase 114 could define several Class_Elements at the rulebase level, such as:

```
<class name="Duck">
    <parent>
        <identifier name="Thing"/>
    </parent>
    <field name="IsOwnedBy">
        <datatype coll_type="none" type="inst_ref">
            <identifier name="Person"/>
        </datatype>
    </field>
</class>
```

8.1 FieldDcl_Element

This element of Class_Element defines a class data object and has a format of:

```
FieldDcl_Element
    ::= ('field' FieldDcl_Attribs+)
        DataType_Element
        [ConstrainedBy_Element]
FieldDcl_Attribs
    ::= Name_Attrib              // Required
    ::= ResolutionType_Attrib    // Optional
    ::= LocTag_Attrib            // Optional
ConstrainedBy_Element
    ::= ('constrained_by' [LocTag_Attrib])
        ConstrainerList_Element
        [ConstraintViolation_Element]
ConstrainerList_Element
    ::= ('constrainer_list' [LocTag_Attrib])
        IdentifierSpec*          // Applicable Constraints
ConstraintViolation_Element
    ::= ('constraint_violation' [LocTag_Attrib])
        ConstraintViolation_Option
ConstraintViolation_Option
    ::= ConstraintAbort_Element
    ::= ConstraintResume_Element
ConstraintAbort_Element
    ::= ('constraint_abort' ConstraintAbort_Attribs*)
ConstraintAbort_Attribs
    ::= LocTag_Attrib            // Optional
    ::= AbortMsg_Attrib          // Optional
ConstraintResume_Element
    ::= ('constraint_resume' ConstraintResume_Attribs*)
ConstraintResume_Attribs
    ::= LocTag_Attrib            // Optional
    ::= ResumeVal_Attrib         // Optional
```

The FieldDcl_Element can include field resolution types, which are fields that can optionally specify a "resolution type." The resolution type applies to the behavior of inference engine 112 when it processes decision tree rules and can be specified as either "first_valued" (the default) or "final_valued." This setting determines if inference engine 112 should assume that a field's first value is its resolution value, or if inference engine 112 should expect that a field might be assigned intermediate values on its way to its resolution value. For example, an Age field would typically be a "first_valued" field, whereas a SetOfResults field might be a "final-valued" field.

The FieldDcl_Element can also optionally specify that field value assignments should be constrained. Before assigning a value to the field, inference engine 112 may evaluate zero or more constraints in the order specified by ConstrainerList_Element. If any of the constraints evaluate to a Boolean FALSE value, inference engine 112 may perform a violation action depending on the ConstraintViolation_Element. If the ConstraintViolation_Element specifies a ConstraintAbort_Element, inference engine 112 may abort inferencing. If that element specifies an AbortMsg_Attrib, the attribute's value may be the error message text. Otherwise, the error message may reflect default text. If the ConstraintViolation_Element specifies a ConstraintResume_Element, inference engine 112 may resume inferencing. If that element specifies a ResumeVal_Attrib, inference engine 112 may replace the field's current value with the attribute's value. Otherwise, the field may retain its current value. If there is no ConstraintViolation_Element, inference engine 112 may abort inferencing with a default error message. Constraints specified at the FieldDcl_Element level may apply to all instances of the field's class. A user may also specify instance-specific constraints.

A sample field declaration from a sample rulebase 114 could be:

```
<field name="Symptoms">
    <datatype coll_type="set" type="string"/>
    <constrained_by>
        <constrainer_list>
            <identifier name="CheckSympConstraints"/>
        </constrainer_list>
        <constraint_violation>
            <constraint_abort abort_msg="Invalid symptoms specified"/>
        </constraint_violation>
    </constrained_by>
</field>
```

8.2 ClassMethodDef_Element

This element of Class_Element defines a class method object and has a format of:

```
ClassMethodDef_Element
    ::= ('method' ClassMethodDef_Attribs+)
        [DataType_Element]      // Method ReturnType
        [ClassMethodParams]
        [ClassMethodBody_Element]
ClassMethodDef_Attribs
    ::= Name_Attrib             // Required
    ::= LocTag_Attrib           // Optional
ClassMethodParams
    ::= ClassParam_Element
    ::= ClassParamList_Element
ClassParam_Element
    ::= ('param' ClassParamAttribs+)
        DataType_Element
ClassParamAttribs
    ::= Name_Attrib             // Required
    ::= ParamIOType_Attrib      // Optional
    ::= LocTag_Attrib           // Optional
ClassParamList_Element
    ::= ('method_params' [LocTag_Attrib])
        ClassParam_Element*
ClassMethodBody_Element
    ::= ('method_body' [LocTag_Attrib])
        Statement*
```

A method could optionally accept any number of arguments of any datatype, and the method may classify each parameter as either an input ("in") parameter or output ("out") parameter. In one embodiment, parameters may be either input parameters or output parameters by default. In a particular embodiment, a parameter may not be both an input parameter and an output parameter. The Rule Definition Language may support method overloading, so a class may define multiple methods of the same name so long as their parameter lists are distinguishable. This distinction may not take into account ClassParamAttribs (such as the ParamIOType_Attrib) or number precisions. A method can optionally return one or more values of any datatype. If a method returns a value, server 102 may classify it as a function method. Otherwise, server 102 may classify it as a procedure method. Server 102 imposes restrictions on function methods that may not be imposed on procedure methods. This is because function methods are expressions, and expressions can have no side effects. Server 102 therefore may disallow function methods from supporting output parameters, assigning values to fields, invoking procedure methods, or creating or deleting dynamic instances.

If a ClassMethodBody_Element is not specified, server 102 may assume that another rulebase 114 is going to define the method implementation and that the other rulebase 114 will be merged with the current rulebase 114 before inferencing.

A sample method definition from a sample rulebase 114 could be:

```
<method name="Has1stSymptomButNot2ndOne">
    <datatype coll_type="none" type="boolean"/>
    <method_params>
        <param name="symp1" iotype="in">
            <datatype coll_type="none" type="string"/>
        </param>
        <param name="symp2" iotype="in">
            <datatype coll_type="none" type="string"/>
        </param>
    </method_params>
    <method_body>
        <![CDATA[
            return Symptoms.@Set_DoesIncludeVal(symp1)
            and not Symptoms.@Set_DoesIncludeVal(symp2)
        ]]>
    </method_body>
</method>
```

8.3 StaticInstDef_Element

This element of Class_Element defines a class static instance object and has a format of:

```
StaticInstDef_Element
    ::= ('instance' StaticInst_Attribs+)
        [FieldModifiers_Element]
StaticInst_Attribs
    ::= Name_Attrib             // Required
    ::= LocTag_Attrib           // Optional
```

-continued

```
FieldModifiers_Element
    ::= ('field_modifiers' [LocTag_Attrib])
        FieldModifier_Element*
FieldModifier_Element
    ::= ('field_modifier' FieldModifier_Attribs+)
        [ConstrainedBy_Element]
        [LastChanceValue_Element]
FieldModifier_Attribs
    ::= Name_Attrib        // Required
    ::= LocTag_Attrib      // Optional
LastChanceValue_Element
    ::= ('lastchance_value' [LocTag_Attrib])
        LastChanceValue
LastChanceValue
    ::= LiteralConstant_Element
    ::= UnaryExpr          // with LiteralConstant_Element
    ::= SetConstant_Element
    ::= IdentifierSpec     // Instance name
```

Inference engine 112 may create a static instance when it loads the instance's class, and it may delete the instance when it unloads the instance's class. In one embodiment, rulebase logic may not be able to explicitly create or delete static instances. This element may optionally specify a FieldModifiers_Element that specifies instance-specific field characteristics, such as last-chance values and constraints. The Name_Attrib for the FieldModifiers_Element indicates the affected instance field. This name may identify a field declared or inherited by the instance's class.

The LastChanceValue_Element specifies a last chance value for the field. For an instance-reference datatype, the last-chance value may be an identifier for another static instance or a set of such instances. For a field of another datatype, the value may be a literal constant, a Set constant, or a unary operator on a literal constant. In the latter case, the literal constant may be a number or Boolean constant. Inference engine 112 could apply last-chance values in certain well-defined situations concerning decision-tree rules, so the static instance definition of last-chance values may not in itself guarantee that inference engine 112 will ever apply them.

The constraint sub-element specifies that field value assignments should be constrained. Further information about constraints may be found above in the description of ConstrainedBy_Element in the FieldDcl_Element section. Constraints specified at the StaticInstDef_Element level may apply only to that instance. For example, a user could specify different constraints for a Father.Age than for a Mother.Age. The user may also specify class-level constraints that apply to all instances of a class. If for a given field the user has specified both levels of constraints, inference engine 112 may apply the class-level constraints before the instance-specific constraints.

A sample StaticInstDef_Element definition from a sample rulebase 114 could be:

```
<instance name="CurrentPatient">
    <field_modifiers>
        <field_modifier name="age">
            <lastchance_value>
                <literal_constant value="55"/>
            </lastchance_value>
        </field_modifier>
    </field_modifiers>
</instance>
```

9. Domain_Element

This element defines rulebase-level domain resources and has a format of:

```
Domain_Element
    ::= ('domain' Domain_Attribs+)
        Domain_Items*
Domain_Attribs
    ::= Name_Attrib         // Required
    ::= AppShared_Attrib    // Optional
    ::= LocTag_Attrib       // Optional
Domain_Items
    ::= DomainGoal_Element
    ::= DomainAppSharedFlds_Element
    ::= InitMethodDef_Element
    ::= Assoc_Element
    ::= ConstraintSet_Element
    ::= Class_Element
    ::= Ruleset_Element
```

This element may optionally specify that the domain may be loaded by a client application 122 through the use of the AppShared_Attrib field. Otherwise, the domain is loadable from rulebase logic using a dmn_push( ) intrinsic method. A rulebase 114 may share at least one domain with client applications 122, but it could share multiple domains with client applications 122.

Most sub-elements may specify a Name_Attrib. These names may be unique at the domain level but may override names at higher levels and be overridden at lower levels. If a domain defines same-named objects at a given level, rulebase builder 110 may merge those objects into a single rulebase object during the merge process.

Several of the domain sub-elements, such as InitMethodDef_Element, Assoc_Element, ConstraintSet_Element, and Class_Element, may be the same as rulebase-level sub-elements previously described. Other sub-elements, such as DomainGoal_Element, DomainAppSharedFlds_Element, and Ruleset_Element, are specific to domains and described below.

9.1 DomainGoal_Element

This element of Domain_Element specifies a goal field for the domain and has a format of:

```
DomainGoal_Element
    ::= ('domain_goal' [LocTag_Attrib])
        IdentifierSpec    // Backward-chaining goal (Field)
```

If the Domain_Element specifies a DomainGoal_Element, inference engine 112 may backward-chain the domain's rules in order to resolve the goal field. Otherwise, inference engine 112 may forward-chain the domain's rules.

A sample DomainGoal_Element from a sample rulebase 114 could be:

```
<domain name="PerformConclusionAnalysis" appshared="true">
    <domain_goal>
        <identifier name="OverallConclusion"/>
    </domain_goal>
    ...
</domain>
```

9.2 DomainAppSharedFlds_Element

This element of Domain_Element species fields to be shared with client applications 122 and has a format of:

```
DomainAppSharedFlds_Element
    ::= ('appshared_fields' [LocTag_Attrib])
        [DomainPreConditionList_Element]
        [DomainPostConditionList_Element]
DomainPreConditionList_Element
    ::= ('precondition_list' [LocTag_Attrib])
        ConditionListItem*
DomainPostConditionList_Element
    ::= ('postcondition_list' [LocTag_Attrib])
        ConditionListItem*
ConditionListItem       // Restricted to global fields
    ::= IdentifierSpec
    ::= FieldRef_Element
```

If a domain includes a DomainAppSharedFlds_Element sub-element, the domain itself may be automatically shared with client applications 122. The DomainAppSharedFlds_Element specifies two sub-elements: one for inferencing preconditions and another for inferencing postconditions. Each sub-element specifies zero or more rulebase-level fields. In one embodiment, the list may specify rulebase-level but not domain-level fields. If the same field is specified for both lists, the field may be assumed to be a precondition field.

The DomainPreConditionList_Element identifies fields both readable and write-able by a client application 122. The DomainPostConditionList_Element identifies fields that are read-only to a client application 122. Inference engine 112 may reject attempts by client applications 122 to incorrectly access fields. In one embodiment, different rulebase domains may specify different DomainAppSharedFlds_Elements because their input and output fields may differ.

A sample DomainAppSharedFlds_Element from a sample rulebase 114 could be:

```
<domain name="PerformConclusionAnalysis" appshared="true">
    ...
    <appshared_fields>
        <precondition_list>
            <identifier name="Fact1"/>
            <identifier name="Fact2"/>
            <identifier name="Fact3"/>
            <identifier name="Fact4"/>
        </precondition_list>
        <postcondition_list>
            <identifier name="OverallConclusion"/>
        </postcondition_list>
    </appshared_fields>
    ...
</domain>
```

The above example illustrates the definition of four precondition fields and one postcondition field. For each field, only a single identifier has been specified because there is only a single class instance defined for those fields (so there is no referential ambiguity). In general, a shared field may be specific to a single static instance so that, for example, a domain may share Father.Age but not Mother.Age. If the domain needs to share the field for multiple instances, the DomainAppSharedFlds_Element may specify multiple fields, one for each instance, such as by:

```
<precondition_list>
    <identifier_path>
        <identifier name="Father"/>
        <identifier name="Age"/>
    </identifier_path>
    <identifier_path>
        <identifier name="Mother"/>
        <identifier name="Age"/>
    </identifier_path>
</precondition_list>
```

The domain could also choose to share a field for all instances of a class. To do so, the DomainAppSharedFlds_Element specifies the fields using FieldRef_Element, such as by:

```
<precondition_list>
    <field_ref name="Age">
        <identifier name="Person"/>
    </field_ref>
</precondition_list>
```

This example specifies that the Age field should be shared for all instances of Person. This may be useful when used with dynamic instances, where it may not be practical or possible to itemize all the instances for a given field.

The FieldRef_Element can specify a parent class as well as a leaf class, such as:

```
<precondition_list>
    <field_ref name="Age">
        <identifier name="Bird"/>
    </field_ref>
</precondition_list>
```

This form is shorthand for all the leaf classes derived from that parent class, such as:

```
<precondition_list>
    <field_ref name="Age">
        <identifier name="Duck"/>
    </field_ref>
    <field_ref name="Age">
        <identifier name="Vulture"/>
    </field_ref>
    <field_ref name="Age">
        <identifier name="Robin"/>
    </field_ref>
</precondition_list>
```

9.3 Ruleset_Element

This element of Domain_Element defines ruleset-level resources and has a format of:

```
Ruleset_Element
    ::= ('ruleset' Ruleset_Attribs+)
        Ruleset_Item*
Ruleset_Attribs
    ::= Name_Attrib          // Required
    ::= Post_Attrib          // Optional
```

```
            ::= AppShared_Attrib      // Optional
            ::= LocTag_Attrib         // Optional
    Ruleset_Item
            ::= InitMethodDef_Element
            ::= Assoc_Element
            ::= ConstraintSet_Element
            ::= Class_Element
            ::= Rule_Element
```

This element may, using a Post_Attrib field, optionally specify that inference engine 112 should conditionally post the ruleset's rules to the domain's rule agenda as controlled by a client application 122 or rulebase logic. By default, inference engine 112 may unconditionally post the rules to the agenda when the ruleset is loaded. This element may also, using an AppShared_Attrib field, optionally specify that the ruleset is accessible to a client application 122. Otherwise, the ruleset is only accessible to rulebase logic.

A domain may share multiple rulesets with client applications 122. If a domain shares any rulesets, the domain itself may also be automatically shared with client applications 122. If a ruleset is shared with an application, the Post_Attrib may be set to "conditional." Otherwise, server 102 may reject the element with a syntax error. If a ruleset is not shared with a client application 122, the Post_Attrib may be set to either "conditional" or "unconditional".

All sub-elements may specify a Name_Attrib. These names may be unique at the ruleset level but may override names at higher levels and be overridden at lower levels. If a ruleset defines same-named objects at a given level, rulebase builder 110 may merge those objects into a single rulebase object during the merge process.

Several of the ruleset sub-elements, such as InitMethodDef_Element, Assoc_Element, ConstraintSet_Element, and Class_Element, are the same as rulebase-level sub-elements described above. Rule_Element may be specific to rulesets and is described below.

A sample Ruleset_Element in a sample rulebase 114 could be:

```
<domain name="PerformConclusionAnalysis" appshared="true">
    ...
    <ruleset name="ConclusionAnalysis">
        ...
    </ruleset>
    ...
</domain>
```

10. Rule_Element

This element defines a rule and has a format of:

```
Rule_Element
    ::= ('rule' Rule_Attribs+)
        RuleBody
Rule_Attribs
    ::= Name_Attrib           // Required
    ::= Priority_Attrib       // Optional
    ::= Enabled_Attrib        // Optional
    ::= LocTag_Attrib         // Optional
RuleBody
    ::= DecisionTree_Element
    ::= PatternMatching_Element
```

This element may optionally specify, using a Priority_Attrib field, a priority level. Inference engine 112 may sequence rules in the domain agenda by priority order, such as from highest value to lowest value or lowest value to highest value. If the element does not specify a priority level, inference engine 112 may assign a default priority of zero or other suitable value.

This element may also optionally specify whether the rule should be enabled for inferencing via the Enabled_Attrib attribute. If enabled, the rule participates in inferencing. Otherwise, inference engine 112 ignores the rule. In one embodiment, the rule is enabled by default.

The Rule Definition Language natively supports two types of rules, decision-tree rules and pattern-matching rules. The different types may be intermixed within the same ruleset. Rule editors and converters, such as rule editors 132 and transformers 133, may choose to support additional types of rules. For example, the Infix-to-XML tool could also support IF-THEN rules. Because IF-THEN rules may represent simple specializations of decision-tree rules, the Infix-to-XML tool can generate decision tree rules from IF-THEN rules. The same could be true for decision-table rules because, like IF-THEN rules, they could represent specializations of decision-tree rules.

Some sample Rule_Elements from a sample rulebase 114 could be:

```
<domain name="PerformConclusionAnalysis" appshared="true">
    ...
    <ruleset name="ConclusionAnalysis">
        <rule name="Overall_status">
            ...
        </rule>
        <rule name="Conclusion1_status">
            ...
        </rule>
        <rule name="Conclusion2_status">
            ...
        </rule>
    </ruleset>
</domain>
```

10.1 DecisionTree_Element

This element of Rule_Element defines the body of a decision-tree rule.

10.1.1 Structural Elements

A decision-tree includes one or more decisions having the form:

```
DecisionTree_Element
    ::= ('dec_tree_body' [LocTag_Attrib])
        Decision_Element+
```

10.1.1.1 Decisions

Each decision is named by an identifier (Name_Attrib) and includes the sub-elements:

```
Decision_Element
    ::= ('decision' Decision_Attribs+)
        GeneralExpr
        DecTestGroup_Element*
        [DecOtherwise_Element]
        [DecUnknown_Element]
```

```
Decision_Attribs
    ::= Name_Attrib        // Required
    ::= LocTag_Attrib      // Optional
```

Although decisions within different rules may share the same decision names, decisions within a given rule may have unique names. A decision may define a base expression (GeneralExpr) of any datatype. This expression may reference fields and invoke methods. A decision may also define one or more test groups (DecTestGroup_Element). It may further optionally define an otherwise clause (DecOtherwise_Element) and/or an unknown clause (DecUnknown_Element).

10.1.1.2 Decision Test Groups

Each test group specifies one or more case expressions and an action clause, and it has the form:

```
DecTestGroup_Element
    ::= ('dec_test_group' [LocTag_Attrib])
        DecCaseExpr+
        DecAction
```

Inference engine 112 compares the values of the case expressions (DecCaseExpr) against the value of the decision's base expression. If inference engine 112 finds at least one "equal" comparison, inference engine 112 performs the actions specified by the group's action clause (DecAction).

10.1.1.3 Decision Otherwise Clauses

The otherwise clause specifies a default action clause for the current decision and has the form:

```
DecOtherwise_Element
    ::= ('dec_otherwise' [LocTag_Attrib])
        DecAction
```

Inference engine 112 performs the actions specified by this clause's action clause (DecAction) if either there are no decision test groups or else none of them result in a "true" comparison.

10.1.1.4 Decision Unknown Clauses The unknown clause, like the otherwise clause, is a special-case action clause for the current decision and has the form:

```
DecUnknown_Element
    ::= ('dec_unknown' [LocTag_Attrib])
        DecAction
```

Inference engine 112 performs the actions specified by this clause's action clause (DecAction) if inference engine 112 cannot evaluate the decision's base expression due to an unknown-field reference.

10.1.1.5 Decision Action Clauses

An action clause can specify one of two types of actions and has the form:

```
DecAction
    ::= DecStatements_Element
    ::= DecRef_Element        // Nested Decision
```

```
DecStatements_Element
    ::= ('dec_statements' [LocTag_Attrib])
        Statement*
DecRef_Element
    ::= ('dec_ref' DecRef_Attribs+)
DecRef_Attribs
    ::= Name_Attrib        // Decision name - Required
    ::= LocTag_Attrib      // Optional
```

A statement-action clause (DecStatements_Element) specifies zero or more statements to be performed. Upon performing these actions, inference engine 112 terminates the rule in either a "fired" or "pended" state (if clause specifies some statements) or else a "failed" state (if clause specifies no statements).

A decision-action clause (DecRef_Element) names another decision within the current decision-tree rule. Inference engine 112 pursues the named decision as a sub-decision of the current decision. For a given rule, multiple decision action clauses (whether in the same decision or in different decisions) may all reference the same decision as a sub-decision.

10.1.1.6 Test Group Case Expressions

Each test-group case expression specifies a partial comparison and has the form:

```
DecCaseExpr
    ::= PartComp_EQ_Element      // = GeneralExpr
    ::= PartComp_NE_Element      // <> GeneralExpr
    ::= PartComp_LT_Element      // < GeneralExpr
    ::= PartComp_LTEQ_Element    // <= GeneralExpr
    ::= PartComp_GT_Element      // > GeneralExpr
    ::= PartComp_GTEQ_Element    // >= GeneralExpr
    ::= PartComp_Range_Element   // in range: (GeneralExpr1 ..
                                              GeneralExpr2)
```

The partial comparisons (PartComp_xxx_Elements) are described later. In one embodiment, these expressions do not need to be constant expressions. For example, they may freely reference fields and invoke methods. These expressions may also be type-compatible with the decision's base expression.

10.1.2 Nulls in Dynamic Identifier Path

In one embodiment, a dynamic identifier path could include a null value. For example, in the statement:

Duck1.OwnedBy.SpouseOf.Name="fred"

SpouseOf may have a null value. If a null value is detected during base-expression evaluation, inference engine 112 may fail the rule (unless it specifies an otherwise clause). If a null value is detected during test-case evaluation, inference engine 112 may fail the test case but resume with other test cases. If a null value is detected while performing an action, inference engine 112 may abort inferencing with an error.

Inference engine 112 may also consider action statements. For example, in these statements:

```
isTrue = Duck1.OwnedBy.SpouseOf.Name == "fred"
            // SpouseOf is null
isTrue = Duck1.owner.age > 5 and Duck1.spouse.age < 5
            // Owner and/or Spouse are null
``` rather than aborting, inference engine 112 may evaluate the relational sub-expressions as false. Likewise, for base-expression premises, such as:

eval Duck1.owner.age<5 or Duck1.spouse.age<5//Owner is null inference engine 112 may fail the individual comparison. However, if Owner is null, Spouse is not null, and Spouse is sufficiently young, inference engine 112 may still evaluate the base-expression as true.

10.1.3 Example Rules and Behaviors

A decision-tree decision may be similar to the switch statement found within C, C++, and Java. The decision's base expression may correspond to the switch expression, the test group case expressions may correspond to the switch's case statements, and the decision's otherwise clause may correspond to the switch's default case.

Here is an infix-code example of a very simple decision-tree rule reflecting a single decision:

```
<rule name="Fact1_is_true">
<![CDATA[
    decision main
    eval Fact2
    then
        case =false:
            do Fact1 = true end
        end
]]>
</rule>
```

This example is the equivalent of a more-traditional IF-rule. The rule sets Fact1 to TRUE if Fact2 is FALSE.

Here is another example reflecting multiple decisions:

```
<rule name="Determine_Fact4_status">
<![CDATA[
    decision main
    eval age
    then
        case <21.5:
            decision sub1
        case >=30..<=32:
        case >=41..<=55.5:
            decision sub2
        case >32..<41:
            do end
        otherwise:
            do Fact4 = false end
        unknown:
            do Fact4 = true end
        end
    decision sub1
    eval Fact2
    then
        case =true:
            do Fact4 = false end
        otherwise:
            do Fact4 = true end
        end
    decision sub2
    eval Fact3
    then
        case =false:
            do Fact4 = true end
        otherwise:
            do Fact4 = false end
        end
]]>
</rule>
```

This rule evaluates an age and conditionally performs actions based on the result. In some cases (such as an age of 15), the action is to process another decision (giving the rule its distinctive tree-like behavior). In other cases (such as an age of 35), there are no actions to perform.

In this example, a decision test group can "stack" cases so as to share actions (such as for ages 35 and 45). The use of an unknown clause catches situations where the age is unknown, and the use of an otherwise clause catches situations not covered by decision test groups.

10.1.4 Additional Behavior 10.1.4.1 During Rulebase Compilation

In one embodiment, rulebase builder 110 may assure that, for a given decision-tree rule, all decisions are uniquely named. In this embodiment, rulebase builder 110 may also assure that exactly one of the rule's decisions is not referenced as a sub-decision by any other decision. Rulebase builder 110 may distinguish this decision as the rule's root decision. A rule may specify decisions in any order without regard to how decisions may reference one another as sub-decisions. Multiple decision-action clauses may specify the same decision as a sub-decision. Rulebase builder 110 may disallow self-referencing decisions and "cyclic" references amongst decisions.

10.1.4.2 During Inferencing

In one embodiment, inference engine 112 begins rule processing in the root decision. In this embodiment, inference engine 112 may then, according to the results there, proceed to at most one of that decision's nested decisions. Decisions may be nested to an arbitrary number of levels, but at each level the behavior of inference engine 112 may be similar.

For a given decision, inference engine 112 first evaluates the decision's base expression. If that fails due to an unknown-field reference, inference engine 112 performs the action for the unknown clause (if one is specified). If there is no such clause, inference engine 112 immediately terminates rule processing in a pended state.

If inference engine 112 successfully evaluates the decision's base expression, inference engine 112 next applies that expression's value against any test-group case expressions. Inference engine 112 visits test groups in the order specified by the decision. Within each test group, inference engine 112 visits the case expressions in the order specified by the test group.

Upon detecting a true case, inference engine 112 performs that owning group's actions. If none of the cases in any of the test groups apply, inference engine 112 either performs the otherwise-clause's actions (if defined) or else terminates rule processing in a failed state.

A statement-action clause may be empty or non-empty. If empty, inference engine 112 terminates rule processing in a failed state. Otherwise, inference engine 112 terminates rule processing in a fired or pended state.

10.1.4.3 Rule Pending for Case Expressions

Inference engine 112 may view a test group's case expressions as alternative qualifications for a common action. If any of the case expressions result in a true case, inference engine 112 performs the group's action.

If case expression evaluation fails due to unknown-field reference, inference engine 112 evaluates other of the group's case expressions for a true case. If one is not found, inference engine 112 terminates the rule in a pended state.

As a result of this handling, a test group with multiple test cases may not be semantically equivalent to multiple test groups each with a single test case. For example, given the test group:

```
case < minimum
case > maximum
case > dangerous_range_start .. < dangerous_range_end
   do
      DoSomething( )
   end
``` inference engine 112 fires the rule if the base expression's value falls within a dangerous range, even though the minimum and maximum values are unknown. However, given the following seemingly-equivalent test groups:

```
case < minimum
   do
      DoSomething( )
   end
case > maximum
   do
      DoSomething( )
   end
case > dangerous_range_start .. < dangerous_range_end
   do
      DoSomething( )
   end
``` inference engine 112 immediately terminates the rule in a pended state if the minimum value is unknown, even though the maximum and/or range values are known.

10.1.4.4 Rule Pending for Statement Actions

While performing a rule action, if inference engine 112 detects a reference to an unknown field, inference engine 112 immediately terminates the rule in a pended state. Upon re-starting the rule, iinference engine 112 resumes execution within the action that previously caused rule pending.

10.1.5 Miscellaneous Considerations

Inference engine 112 can both forward-chain or backward-chain decision-tree rules. In one embodiment, although a decision-tree rule can create dynamic instances (via the inst_make intrinsic method), it may not otherwise access dynamic instances. In this embodiment, it can only reference fields and methods for static instances.

10.2 PatternMatching_Element

This element of Rule_Element defines a pattern-matching rule and has a format of:

```
PatternMatching_Element
   ::= ('pm_rule' PM_Attribs*)
   PMBindVars
   PMPremise_Element
   PMActions_Element
   [PMOrderBy_Element]
PM_Attribs
   ::= PMOptions_Attrib   // Optional (see values below)
   ::= LocTag_Attrib      // Optional
// for PMOptions_Attrib:
PMOption
   ::= 'mostrecent'
   ::= 'singlefire'
```

This rule can specify one or more options as fields. These options affect the ordering of instance bindings (mostrecent) and whether inference engine 112 fires the rule only once (for the first binding) or multiple times (for all bindings). By default, inference engine 112 may order bindings in a first in-first out fashion (least-recent) and fire the rule for all bindings.

When PM_Attribs specifies multiple options, the options may be comma-delimited, such as by:

options="mostrecent, singlefire"

The options may also be specified in any order.

The PatternMatching_Element may include three sub-elements for bind-variable declarations (PMBindVars), rule logic (PMPremise_Element, PMActions_Element), and an optional sorting specification (PMOrderBy_Element).

An infix-code example of a pattern-matching rule from a sample rulebase 114 could be:

```
<rule name="Itemize_persons_without_any_siblings">
   <![CDATA[
   for
      any person p
   if
      // person never had any siblings
      p.IsSiblingOf.@fld_isunknown( )
      // person currently has no siblings
      or p.IsSiblingOf = set( )
   then
      var msg is string = "No sibling for: " & p.@inst_getname( )
      @engn_tracemsg(msg)
   end
   // Sort items in ascending sequence by age;
   //   For equal ages, sort by recency (most-recent first)
   options mostrecent
   orderby p.getage( )
   ]]>
</rule>
```

This rule runs through all instances of Person and itemizes the ones without any siblings. The results are ordered by age. Where ages are the same, more-recent bindings precede less-recent bindings.

Pattern-matching rules may be more dynamic and automatically react to instance creations, modifications, and deletions performed in other rules. For example, a single rule that feeds off of itself, and thereby calculates all sibling-ship relationships, could be:

```
<rule name="Make_sibling_if_there_are_shared_siblings">
   <![CDATA[
   for
      any person p1,
      any person p2
   if
      // different persons
      p1 <> p2
      // persons not already siblings
      and not p1.IsSiblingOf.@set_doesincludeval(p2)
      // persons share siblings
      and p1.IsSiblingOf.@set_doesintersect(p2.IsSiblingOf)
   then
      // make persons siblings
      p1.IsSiblingOf.@set_addval(p2)
   end
   ]]>
</rule>
```

If a dynamic identifier path includes a null value, inference engine 112 may perform the same actions described above with respect to the decision tree rules.

10.2.1 PMBindVars Construct

This construct declares the bind variables for a pattern-matching rule and has a format of:

```
PMBindVars
    ::= PMBindVarDcl_Element
    ::= PMBindVarList_Element
PMBindVarDcl_Element
    ::= ('bindvar_dcl' PMBindVarDcl_Attribs+)
        IdentifierSpec        // bindvar class
PMBindVarDcl_Attribs
    ::= Name_Attrib        // Required
    ::= LocTag_Attrib      // Optional
PMBindVarList_Element
    ::= ('bindlist' [LocTag_Attrib])
        PMBindVarDcl_Element*
```

This construct can declare one or more bind variables. Each declaration specifies a variable name (as a PMBindVarDcl_Attribs Name_Attrib) and a class name. Different bind variables may be associated with the same or different classes. For the infix-code declarations:

any person p,
any duck d the generated Rule Definition Language code could be:

```
<bindlist>
    <bindvar_dcl name="p" loc_tag="Line#2">
        <identifier name="person"/>
    </bindvar_dcl>
    <bindvar_dcl name="d" loc_tag="Line#3">
        <identifier name="duck"/>
    </bindvar_dcl>
</bindlist>
```

As described above, the loc_tag field represents a field that inference engine 112 may include in error and trace messages. The loc_tag field need not be processed by inference engine 112 when performing inferencing operations. In addition, the loc_tag field could apply to hierarchically lower elements in the Rule Definition Language, unless the lower elements override the loc_tag value. As a result, the loc_tag field could be used to attach source-input line numbers to XML elements.

10.2.2 PMPremise_Element

This element defines the rule's premise:

```
PMPremise_Element
    ::= ('pm_premise' [LocTag_Attrib])
        GeneralExpr
```

The GeneralExpr may be a Boolean expression that references all of the bind variables declared for this rule. Otherwise, server 102 may reject the rule with a syntax error.

10.2.3 PMActions_Element

This element defines the rule's actions:

```
PMActions_Element
    ::= ('pm_actions' [LocTag_Attrib])
        Statement*
```

The rule actions may reference some field values via bind variables, but server 102 may not insist on such references.

10.2.4 PMOrderBy_Element

This element specifies criteria for sorting instance bindings and has a format of:

```
PMOrderBy_Element
    ::= ('orderby' [LocTag_Attrib])
        GeneralExpr*        // Number or String
```

This element specifies zero or more Number or String expressions as sort criteria. Inference engine 112 may first sort bindings by the first expression, then sort matching bindings by the second expression, and so on. If after all those comparisons bindings still match, inference engine 112 may resolve ordering according to the mostrecent option. The sorting may be done in ascending order, descending order, or other suitable ordering. If descending order is desired for Number expressions, a user could negate the expression, such as by:

orderby -p.getage( ).

10.2.5 Miscellaneous Considerations

In one embodiment, inference engine 112 can forward-chain but not backward-chain pattern-matching rules. In this embodiment, inference engine 112 could ignore any pattern-matching rules during backward-chaining. Pattern-matching rules can also work with both static and dynamic instances or a mix of the two types. The rules may be able to freely modify static instances, and they can freely create, modify, and delete dynamic instances. When calculating pattern-matching instance bindings, inference engine 112 could ignore inst_template intrinsic instances. The bind variables can be associated with super-classes of objects. For example, a user might specify a Bird bind variable, and inference engine 112 could polymorphically pattern-match over instances of Duck, Robin, and Hawk.

11. Statement Construct

This construct defines the Rule Definition Language's elements for logic statements and has a format of:

```
Statement
    ::= VarDclStmt_Element
    ::= AssignmentStmt_Element
    ::= MethodCall_Element
    ::= ReturnStmt_Element
```

11.1 VarDclStmt_Element

This element of Statement declares local variables and has a format of:

```
VarDclStmt_Element
    ::= ('var_dcl' VarDcl_Attribs+)
        DataType_Element
        GeneralExpr           // Initialization Value
    VarDcl_Attribs
        ::= Name_Attrib       // Required
        ::= LocTag_Attrib     // Optional
```

This statement can be specified by both rule and method logic. It may be positioned anywhere within that logic, but its positioning could affect its scope visibility. The local variable may be of any datatype, including Set and Association instances. The statement may specify an initialization value for the local variable. A GeneralExpr defines a type-compatible initialization value. The expression does not need to be a constant expression.

An infix-code example from a sample rulebase 114 could be:
   var result is boolean=true//be optimistic and the corresponding Rule Definition Language code could be:

```
<var_dcl name="result" loc_tag="Line#2">
    <datatype coll_type="none" type="boolean"/>
    <literal_constant value="true"/>
</var_dcl>
```

11.2 AssignmentStmt_Element

This element of Statement defines an assignment statement and has a format of:

```
AssignmentStmt_Element
    ::= ('assign_stmt' [LocTag_Attrib])
        IdentifierSpec       // Destination (Field)
        GeneralExpr          // Source
```

This element can be specified by both rule and method logic. Inference engine 112 evaluates the GeneralExpr and assigns its value to the type-compatible specified destination object. The destination object may be a field or local variable. If a field, inference engine 112 may first invoke constraint checking before completing the assignment.

When the operands are of type Number, inference engine 112 compares operand precisions. If the GeneralExpr precision is less than that of the destination object, inference engine 112 may zero-extend the GeneralExpr value to match the destination precision and then perform the assignment. Otherwise, inference engine 112 rounds the GeneralExpr value as necessary to match the destination precision.

An infix-code example from a sample rulebase 114 could be:
   Fact1=true and the corresponding Rule Definition Language code could be:

```
<assign_stmt loc_tag="Line#3">
    <identifier name="Fact1"/>
    <literal_constant value="true"/>
</assign_stmt>
```

11.3 MethodCall_Element

This element of Statement defines a method-invocation statement and has a format of:

```
MethodCall_Element
    ::= ('method_call' [LocTag_Attrib])
        IdentifierSpec       // Method
        [MethodArgList_Element]
MethodArgList_Element
    ::= ('arg_list' [LocTag_Attrib])
        GeneralExpr*
```

This element can be specified by both rule and method logic. Inference engine 112 could invoke the specified method with any specified arguments. This element may be applied both as a standalone statement and as a term in an expression (if the invoked method returns a value). The invocation may involve zero or more argument expressions. The number of arguments could be identical to the number of parameters expected by the target method, and each argument may be type-compatible with its corresponding method parameter. If the method parameter is an output parameter, the argument may be an identifier for either a field or local variable.

When an argument and parameter are of type Number, inference engine 112 compares their precisions. If the source-object (argument for an input parameter; parameter for an output parameter) precision is less than that of the destination object (parameter for an input parameter; argument for an output parameter), inference engine 112 zero-extends the source value to match the destination precision and then passes the value. Otherwise, inference engine 112 rounds the source value as necessary to match the destination precision. Similar considerations may apply to method return values of type Number. Inference engine 112 may adjust or round the return value prior to assigning it to the destination object.

An infix-code example from a pattern-matching rule in a sample rulebase 114 could be:

```
// associate person and duck
p.AssignDuck(d)
``` and the corresponding Rule Definition Language code could be:

```
<method_call loc_tag="Line#13">
    <identifier_path>
        <identifier name="p"/>
        <identifier name="AssignDuck"/>
    </identifier_path>
    <arg_list>
        <identifier name="d"/>
    </arg_list>
</method_call>
```

11.4 ReturnStmt_Element

This element defines a method return statement and has a format of:

```
ReturnStmt_Element
    ::= ('return_stmt' [LocTag_Attrib])
        [GeneralExpr]
```

In one embodiment, this statement can be specified only by method logic and not rule logic. If specified within rule logic, server 102 could reject the statement with a syntax error. When executing this statement, inference engine 112 could terminate method execution and return control to code that invoked the method. If the statement specifies a GeneralExpr, the current method could be defined as returning a value, and the declared return datatype may be type-compatible with the statement's GeneralExpr. As described for the MethodCall_Element, inference engine 112 may adjust or round return values of type Number.

An infix-code example from a sample rulebase 114 could be:

return Symptoms.@Set_DoesIncludeVal(symp1)
and not Symptoms.@Set_DoesIncludeVal(symp2)

and the corresponding Rule Definition Language code could be:

```
return_stmt loc_tag="Line#1">
  <and_op loc_tag="Line#2">
    <method_call>
      <identifier intrinsic="true" name="set_doesincludeval"/>
      <arg_list>
        <identifier name="Symptoms"/>
        <identifier name="symp1"/>
      </arg_list>
    </method_call>
    <not_op>
      <method_call>
        <identifier intrinsic="true" name="set_doesincludeval"/>
        <arg_list>
          <identifier name="Symptoms"/>
          <identifier name="symp2"/>
        </arg_list>
      <method_call>
    </not_op>
  </and_op>
</return_stmt>
```

12. GeneralExpr Construct

The GeneralExpr constructs define expressions as referenced from Rule Definition Language logic and have a format of:

```
GeneralExpr
    ::= SimpleTerm
    ::= RelationalTerm
        // Unary Operators
    ::= UnaryPlusExpr_Element
    ::= UnaryMinusExpr_Element
    ::= UnaryNotExpr_Element
        // Binary Operators
    ::= ORed_Element
    ::= ANDed_Element
    ::= Addition_Element
    ::= Subtraction_Element
    ::= Concatenation_Element
    ::= Multiplication_Element
    ::= Division_Element
```

A GeneralExpr supports the expected set of terms and operators. As previously described, expression evaluation may not generate any side effects. As such, any methods invoked by an expression may not generate any side effects. These methods, called function methods, are further described in the ClassMethodDef_Element section above.

In one embodiment, the grammar makes no attempt to distinguish datatype-compatible operations from incompatible operations. For example, the grammar could suggest that one could subtract a Boolean value from a String value. In this embodiment, type-compatibility enforcement is performed by server 102, which performs both type checking and constant folding.

A sample infix-code statement that manages to include a sampling of most types of terms and operators could be:

```
var IsHappy is Boolean =
    Is Wealthy
    or (
        age >0..<=200
        and not IsTooTall
        and QualityIndex(
            (income + savings − debts)/12,
            firstname & " " & lastname,
            some_random_number)
        > +100
    )
```

The corresponding Rule Definition Language code for this statement could be:

```
<var_dcl loc_tag="Line#1" name="IsHappy">
  <datatype coll_type="none" type="Boolean"/>
  <or_op loc_tag="Line#3">
    <identifier name="IsWealthy"/>
    <and_op loc_tag="Line#6">
      <and_op loc_tag="Line#5">
        <range_op>
          <identifier name="age"/>
          <part_gt_op>
            <literal_constant value="0"/>
          </part_gt_op>
          <part_lteq_op>
            <literal_constant value="200"/>
          </part_lteq_op>
        </range_op>
        <not_op>
          <identifier name="IsTooTall"/>
        </not_op>
      </and_op>
      <gt_op>
        <method_call>
          <identifier name="QualityIndex"/>
          <arg_list>
            <div_op>
              <subt_op>
                <add_op>
                  <identifier name="income"/>
                  <identifier name="savings"/>
                </add_op>
                <identifier name="debts"/>
              </subt_op>
              <literal_constant value="12"/>
            </div_op>
            <concat_op>
              <concat_op>
                <identifier name="firstname"/>
                <literal_constant value="" ""/>
              </concat_op>
              <identifier name="lastname"/>
            </concat_op>
            <identifier name="some_random_number"/>
          </arg_list>
        </method_call>
        <uplus_op>
          <literal_constant value="100"/>
        </uplus_op>
      </gt_op>
    </and_op>
  </or_op>
</var_dcl>
```

12.1 SimpleTerm Construct

The SimpleTerm of GeneralExpr could have a format of:

```
SimpleTerm
    ::= LiteralConstant_Element
    ::= SetConstant_Element
    ::= IdentifierSpec            // Object name
    ::= MethodCall_Element
```

The LiteralConstant_Element and SetConstant_Element are described here. IdentifierSpec is described later in this document, and MethodCall_Element has been described above.

12.1.1 LiteralConstant_Element

The LiteralConstant_Element has a format of:

```
LiteralConstant_Element
    ::= ('literal_constant' LiteralConstant_Attribs+)
LiteralConstant_Attribs
    ::= Value_Attrib         // Required
    ::= LocTag_Attrib        // Optional
```

The Value_Attrib indicates the value of the constant as a string of characters. Server 102 may examine this value (in a case-insensitive manner) in order to determine the constant's datatype. If the value is "TRUE" or "FALSE", server 102 recognizes the constant as a Boolean constant. If the value is "NULL", server 102 recognizes the constant as an Association instance constant (indicating the absence of an Association instance). If the first character of the value is a double-quote character, server 102 recognizes the constant as a String constant and verifies that the last character of the value is also a double-quote character. Otherwise, server 102 assumes that the constant is a Number constant and parses it accordingly. Inference engine 112 determines the constant's precision by examining the number of digits to the right of the decimal point. If the constant is expressed in scientific notation, the precision also takes into account the exponent value.

An infix-code example of a literal constant could be:

method1(false, null, "abc", "", 123.456)

and the corresponding Rule Definition Language code could be:

```
<method_call loc_tag="Line#1">
    <identifier name="method1"/>
    <arg_list>
        <literal_constant value="false"/>
        <literal_constant value="null"/>
        <literal_constant value=""abc""/>
        <literal_constant value=""""/>
        <literal_constant value="123.456"/>
    </arg_list>
</method_call>
```

12.1.2 SetConstant_Element

The SetConstant_Element has a format of:

```
SetConstant_Element
    ::= ('set_constant' [LocTag_Attrib])
    SetMember*
```

```
SetMember
    ::= LiteralConstant_Element
    ::= IdentifierSpec           // Instance name
    ::= UnaryExpr                // with LiteralConstant_Element only
```

A Set contains zero or more members. In one embodiment, all members of a set should be of the same datatype. The datatype of the members (if any) is the datatype of the Set constant. A member can be a literal constant, an IdentifierSpec (for Sets of Association instances), or a unary operator on a literal constant. In the case of a unary operator on a literal constant, the literal constant could be either a Number or Boolean constant. For Set constant of Numbers, the Set itself may not have a precision, although its members do. Likewise, a Set constant of instances may not be bound to any particular Association.

Infix-code examples of set constants could be:

```
set1 = set(123)
set2 = set("abc", "def")
set3 = set(duck1, duck2)
set4 = set(-123, 0)
set5 = set( )                   // Empty set
``` and the corresponding Rule Definition Language code could be:

```
<assign_stmt loc_tag="Line#1">
    <identifier name="set1"/>
    <set_constant>
        <literal_constant value="123"/>
    </set_constant>
</assign_stmt>
<assign_stmt loc_tag="Line#2">
    <identifier name="set2"/>
    <set_constant>
        <literal_constant value=""abc""/>
        <literal_constant value=""def""/>
    </set_constant>
</assign_stmt>
<assign_stmt loc_tag="Line#3">
    <identifier name="set3"/>
    <set_constant>
        <identifier name="duck1"/>
        <identifier name="duck2"/>
    </set_constant>
</assign_stmt>
<assign_stmt loc_tag="Line#4">
    <identifier name="set4"/>
    <set_constant>
        <uminus_op>
            <literal_constant value="123"/>
        </uminus_op>
        <literal_constant value="0"/>
    </set_constant>
</assign_stmt>
<assign_stmt loc_tag="Line#5">
    <identifier name="set5"/>
    <set_constant/>
</assign_stmt>
```

12.2 RelationalTerm Construct

The RelationalTerm defines value comparisons and has a format of:

```
RelationalTerm
    ::= FullComp_EQ_Element
    ::= FullComp_NE_Element
    ::= FullComp_LT_Element
    ::= FullComp_LTEQ_Element
    ::= FullComp_GT_Element
    ::= FullComp_GTEQ_Element
    ::= FullComp_Range_Element
```

Value comparisons could include full comparisons and partial comparisons described above.

12.2.1 Full-Comparison Constructs

Full comparisons may include binary operations or ternary operations involving a range of values. An example binary operation could be:

IsLessThan=fld1<123 while an example ternary operation could be:

```
IsInRange = fld1 >=100..<200
// above statement is semantically equivalent to following statement
//    (but is more efficient):
IsInRange = fld1 >= 100 and fld1 < 200
```

In either case, the expression returns a Boolean value indicating the comparison results.

The Rule Definition Language code corresponding to the above three infix statements could be:

```
<assign_stmt loc_tag="Line#1">
    <identifier name="IsLessThan"/>
    <lt_op>
        <identifier name="fld1"/>
        <literal_constant value="123"/>
    </lt_op>
</assign_stmt>
<assign_stmt loc_tag="Line#2">
    <identifier name="IsInRange"/>
    <range_op>
        <identifier name="fld1"/>
        <part_gteq_op>
            <literal_constant value="100"/>
        </part_gteq_op>
        <part_lt_op>
            <literal_constant value="200"/>
        </part_lt_op>
    </range_op>
</assign_stmt>
<assign_stmt loc_tag="Line#5">
    <identifier name="IsInRange"/>
    <and_op loc_tag="Line#5">
        <gteq_op>
            <identifier name="fld1"/>
            <literal_constant value="100"/>
        </gteq_op>
        <lt_op>
            <identifier name="fld1"/>
            <literal_constant value="200"/>
        </lt_op>
    </and_op>
</assign_stmt>
```

The full comparison elements could have a format of:

```
FullComp_EQ_Element              // GeneralExpr = GeneralExpr
    ::= ('eq_op' Comp_Attribs*)
        GeneralExpr
        GeneralExpr
FullComp_NE_Element              // GeneralExpr <> GeneralExpr
    ::= ('neq_op' Comp_Attribs*)
        GeneralExpr
        GeneralExpr
FullComp_LT_Element              // GeneralExpr < GeneralExpr
    ::= ('lt_op' Comp_Attribs*)
        GeneralExpr
        GeneralExpr
FullComp_LTEQ_Element            // GeneralExpr <= GeneralExpr
    ::= ('lteq_op' Comp_Attribs*)
        GeneralExpr
        GeneralExpr
FullComp_GT_Element              // GeneralExpr > GeneralExpr
    ::= ('gt_op' Comp_Attribs*)
        GeneralExpr
        GeneralExpr
FullComp_GTEQ_Element            // GeneralExpr >= GeneralExpr
    ::= ('gteq_op' Comp_Attribs*)
        GeneralExpr
        GeneralExpr
FullComp_Range_Element
                    // GeneralExpr in range: (GeneralExpr1 .. GeneralExpr2)
    ::= ('range_op' [LocTag_Attrib])
        GeneralExpr
        RangeStartComp
        RangeStopComp
RangeStartComp
    ::= PartComp_GT_Element
    ::= PartComp_GTEQ_Element
RangeStopComp
    ::= PartComp_LT_Element
    ::= PartComp_LTEQ_Element
```

For all of these elements, the GeneralExprs could all be of the same datatype. However, some operators support only certain datatypes. For example, comparisons of equality and inequality support all datatypes and Sets of values. Unequal Sets may or may not intersect. Comparisons of magnitude could support only Number and String expressions but could also be applied to Sets. For Sets, the results indicate subset relationships. When comparing Number values, inference engine 112 first zero-extends any lesser-precision operand to the other operand's precision and then performs the comparison.

For all of the elements, one can specify Comp_Attribs in the format:

```
Comp_Attribs
    ::= CaseSensitivity_Attrib    // Optional
    ::= LocTag_Attrib             // Optional
```

The CaseSensitivity_Attrib can be specified to indicate case-sensitive String comparisons. By default, String comparisons could be case-insensitive or case-sensitive. For comparisons for other datatypes, this setting could be ignored.

12.2.2 Partial-Comparison Constructs

Range comparisons rely on partial comparison constructs, or constructs that specify only the "right-hand side" of a full comparison. Partial comparison constructs have a format of:

```
PartComp_EQ_Element                    // = GeneralExpr
    ::= ('part_eq_op' Comp_Attribs*)
    GeneralExpr
PartComp_NE_Element                    // <> GeneralExpr
    ::= ('part_neq_op' Comp_Attribs*)
    GeneralExpr
PartComp_LT_Element                    // < GeneralExpr
    ::= ('part_lt_op' Comp_Attribs*)
    GeneralExpr
PartComp_LTEQ_Element                  // <= GeneralExpr
    ::= ('part_lteq_op' Comp_Attribs*)
    GeneralExpr
PartComp_GT_Element                    // > GeneralExpr
    ::= ('part_gt_op' Comp_Attribs*)
    GeneralExpr
PartComp_GTEQ_Element                  // >= GeneralExpr
    ::= ('part_gteq_op' Comp_Attribs*)
    GeneralExpr
PartComp_Range_Element
                // in range: (GeneralExpr1 .. GeneralExpr2)
    ::= ('part_range_op' [LocTag_Attrib])
    RangeStartComp
    RangeStopComp
```

These constructs, which could also used by decision-tree elements, specify one GeneralExpr (or two for ranges). The same datatype and case-sensitivity considerations apply to them as for full comparisons.

12.3 Unary Operator Elements

The unary operators of GeneralExpr include UnaryPlusExpr_Element, UnaryMinusExpr_Element, and UnaryNotExpr_Element.

12.3.1 UnaryPlusExpr_Element

The UnaryPlusExpr_Element of GeneralExpr has a format of:

```
UnaryPlusExpr_Element
    ::= ('uplus_op' [LocTag_Attrib])
    GeneralExpr
```

This operation essentially returns the value of GeneralExpr. It is included for "expressability" purposes, such as by:

if this_value >=−100 . . . <=+100 then . . . end

The GeneralExpr could be a Number expression, and this operation returns a Number value.

12.3.2 UnaryMinusExpr_Element

The UnaryMinusExpr_Element has a format of:

```
UnaryMinusExpr_Element
    ::= ('uminus_op' [LocTag_Attrib])
    GeneralExpr
```

This operation reverses the arithmetic sign of the GeneralExpr value. Positive values become negative values and vice-versa. The GeneralExpr could be a Number expression, and this operation returns a Number value.

12.3.3 UnaryNotExpr_Element

The UnaryNotExpr_Element has a format of:

```
UnaryNotExpr_Element
    ::= ('not_op' [LocTag_Attrib])
    GeneralExpr
```

This operation reverses the Boolean value of GeneralExpr. TRUE values become FALSE and vice-versa. The GeneralExpr could be a Boolean expression, and this operation returns a Boolean value.

12.4 Binary Operator Elements

The binary operators include ORed_Element, ANDed_Element, Addition_Element, Subtraction_Element, Concatenation_Element, Multiplication_Element, and Division_Element.

12.4.1 ORed_Element

The ORed_Element supports OR operations and has a format of:

```
ORed_Element
    ::= ('or_op' [LocTag_Attrib])
    GeneralExpr
    GeneralExpr
```

This operation performs a logical OR operation on the sub-elements. The result is TRUE if either sub-element is TRUE. Otherwise, the result is FALSE. The GeneralExprs could both be Boolean expressions, and this operation returns a Boolean value.

At runtime, inference engine 112 may evaluate only one of the GeneralExprs. For example, for the infix-code expression:

fld1<100 or fld2>=200 if fld1 has a value of 50, inference engine 112 need not bother testing fld2 since the overall outcome is known to be TRUE. However, if fld1 is unknown, inference engine 112 may test fld2 so that inference engine 112 can avoid pending the rule if fld2 has a sufficiently large value, such as 250. Similarly, inference engine 112 could also determine whether any of the identifier paths with intermediate instance-reference fields have a null value. For example, for the infix code expression:

Father.pDog.age<5 or Child.pFriend.age>10

Father may not have any dog (pDog=null). However, inference engine 112 may evaluate the expression as true if Child's friend is sufficiently old.

While ORed_Element is described as a binary operator, it could also accommodate an arbitrary number of operands. For example, ORed_Element could handle a "list" of one or more operands. If a rule is pended because of one or more operands in the ORed_Element, inference engine 112 could restart inferenceing with those operands that previously pended (and only those operands).

12.4.2 ANDed_Element

The ANDed_Element supports AND operations and has a format of:

```
ANDed_Element
    ::= ('and_op' [LocTag_Attrib])
    GeneralExpr
    GeneralExpr
```

This operation performs a logical AND operation on the sub-elements. The result is TRUE if both sub-elements are TRUE. Otherwise, the result is FALSE. The GeneralExprs could both be Boolean expressions, and this operation returns a Boolean value. At runtime, inference engine 112 may evaluate only one of the GeneralExprs. For example, for the infix-code expression:

fld1>=100 and fld2<200 if fld1 has a value of 50, inference engine 112 need not bother testing fld2 since the overall outcome is known to be FALSE. However, if fld1 is unknown, inference engine 112 may test fld2 so that inference engine 112 can avoid pending the rule if fld2 has a sufficiently large value, such as 250. Similarly, inference engine 112 could also determine whether any of the identifier paths with intermediate instance-reference fields have a null value. For example, for the infix code expression:

Father.pDog.age<5 and Child.pFriend.age>10

Father may not have any dog (pDog=null). However, inference engine 112 may evaluate the expression as false if Child's friend is not sufficiently old.

While ANDed_Element is described as a binary operator, it could also accommodate an arbitrary number of operands. For example, ANDed_Element could handle a "list" of one or more operands. If a rule is pended because of one or more operands in the ANDed_Element, inference engine 112 could restart inferenceing with those operands that previously pended (and only those operands).

12.4.3 Addition_Element

The Addition_Element supports addition operations and has a format of:

```
Addition_Element
    ::= ('add_op' [LocTag_Attrib])
        GeneralExpr
        GeneralExpr
```

This operation performs an arithmetic addition of the sub-elements. The operation returns the result of adding the second sub-element to the first sub-element. The GeneralExprs could both be Number expressions, and this operation returns a Number value. When adding objects, an object of lesser precision may be zero-extended to the other object's precision before the arithmetic operation. The result may reflect the greater precision.

12.4.4 Subtraction_Element

The Subtraction_Element supports addition operations and has a format of:

```
Subtraction_Element
    ::= ('subt_op' [LocTag_Attrib])
        GeneralExpr
        GeneralExpr
```

This operation performs an arithmetic subtraction of the sub-elements. The operation returns the result of subtracting the second sub-element from the first sub-element. The GeneralExprs could both be Number expressions, and this operation returns a Number value. When subtracting objects, an object of lesser precision may be zero-extended to the other object's precision before the arithmetic operation. The result may reflect the greater precision.

12.4.5 Concatenation_Element

The Concatenation_Element supports concatenation operations and has a format of:

```
Concatenation_Element
    ::= ('concat_op' [LocTag_Attrib])
        GeneralExpr
        GeneralExpr
```

This operation appends one String value to another String value. The operation returns the result of appending the second sub-element to the first sub-element. The GeneralExprs can be of any datatype, and either or both expressions can be Set expressions. Inference engine 112 may automatically convert non-String expressions to a String value before performing the append operation. There could be no options for controlling the formatting of non-String values. This operation returns a String value.

12.4.6 Multiplication_Element

The Multiplication_Element supports addition operations and has a format of:

```
Multiplication_Element
    ::= ('mult_op' [LocTag_Attrib])
        GeneralExpr
        GeneralExpr
```

This operation performs an arithmetic multiplication of the sub-elements. The operation returns the result of multiplying the first sub-element by the second sub-element. The GeneralExprs could both be Number expressions, and this operation returns a Number value. When multiplying objects, there may be no precision adjustment, and the product may reflect a precision that is the sum of the operand precisions.

12.4.7 Division_Element

The Division_Element supports addition operations and has a format of:

```
Division_Element
    ::= ('div_op' [LocTag_Attrib])
        GeneralExpr
        GeneralExpr
```

This operation performs an arithmetic division of the sub-elements. The operation returns the result of dividing the first sub-element by the second sub-element. Divisions by zero could terminate inferencing with an error. The GeneralExprs could both be Number expressions, and this operation returns a Number value. When dividing objects, there may be no precision adjustment, and the quotient may reflect the precision of the dividend value and be rounded as necessary.

13. Datatype_Element

This specification makes frequent references to Datatype_Elements. Datatype_Elements have a format of:

```
DataType_Element
    ::= DataTypeNumber_Element
    ::= DataTypeBoolean_Element
    ::= DataTypeString_Element
    ::= DataTypeInstRef_Element
```

```
//----------------------------------------------------------
DataTypeNumber_Element
    ::= ('datatype' NumberType_Attribs+)
NumberType_Attribs
    ::= DataType_Attrib      // "number" (Required)
    ::= Collection_Attrib    // Optional
    ::= Precision_Attrib     // Optional
    ::= LocTag_Attrib        // Optional
//----------------------------------------------------------
DataTypeBoolean_Element
    ::= ('datatype' BooleanType_Attribs+)
BooleanType_Attribs
    ::= DataType_Attrib      // "boolean" (Required)
    ::= Collection_Attrib    // Optional
    ::= LocTag_Attrib        // Optional
//----------------------------------------------------------
DataTypeString_Element
    ::= ('datatype' StringType_Attribs+)
StringType_Attribs
    ::= DataType_Attrib      // "string" (Required)
    ::= Collection_Attrib    // Optional
    ::= LocTag_Attrib        // Optional
//----------------------------------------------------------
DataTypeInstRef_Element
    ::= ('datatype' InstRefType_Attribs+)
        IdentifierSpec       // Class for instance
InstRefType_Attribs
    ::= DataType_Attrib      // "inst_ref" (Required)
    ::= Collection_Attrib    // Optional
    ::= LocTag_Attrib        // Optional
```

The Rule Definition Language supports the four "atomic" datatypes shown above. There could also be a variation of Datatype_Element for each atomic datatype.

The DataType_Attrib and Collection_Attrib attributes are common to all datatypes. DataType_Attrib indicates the related datatype. Collection_Attrib indicates whether this datatype is for a collection of values, such as a set, or for a simple atomic value.

For DataTypeNumber_Element, a user can optionally specify a "precision," which is expressed in terms of decimal digits to the right of the decimal point. If not specified, server 102 assumes that the value is an integer of zero-precision.

For DataTypeAssocInst_Element, a user could specify two sub-elements. These identify, respectively, the datatype's Association role and Association name. For example, for an Ownership Association involving classes Person and Duck, the Duck class might define a field (IsOwnedBy) declared as an Association instance for role Person in an Ownership association, such as by:

```
<field name="IsOwnedBy">
    <datatype coll_type="none" type="assoc_instance">
        <identifier name="Person"/>
        <identifier name="Ownership"/>
    </datatype>
</field>
```

For DataTypeInstRef_Element, a user specifies a sub-element that identifies the class associated with the instance reference. For example, a Duck class may define an IsOwnedBy field declared as an instance to a Person class by:

```
<field name="IsOwnedBy">
    <datatype coll_type="none" type="inst_ref">
        <identifier name="Person"/>
    </datatype>
</field>.
```

14. Identifiers

In one embodiment, identifier names could be case-insensitive. In a particular embodiment, the Rule Definition Language disallows identifier names from including double quotes, periods, commas, colons, or parentheses (open or close). Server 102 could impose additional restrictions, such as by reserving words or imposing some ordering restrictions.

14.1 IdentifierSpec—Identifier_Element, IdentifierPath_Element

IdentifierSpec elements have a format of:

```
IdentifierSpec
    ::= Identifier_Element
    ::= IdentifierPath_Element
Identifier_Element
    ::=('identifier' Identifier_Attribs+)
Identifier_Attribs
    ::= Name_Attrib       // Required
    ::= Intrinsic_Attrib  // Optional
    ::= LocTag_Attrib     // Optional
IdentifierPath_Element
    ::= ('identifier_path' [LocTag_Attrib])
        Identifier_Element+
```

An identifier specification could include either a single identifier or a "path" of multiple identifiers. For example, infix language supports paths using the "." operator, such as:

Class1.Instance1.Fld1=3

14.2 Intrinsic Identifiers

For each Identifier_Element, a user can optionally specify that the identifier is an intrinsic identifier (Intrinsic_Attrib), or an identifier built-in to the Rule Definition Language. Server 102 could examine these identifiers and compare them against its list of intrinsic names. There could be a match, such as a case-insensitive match. Otherwise, server 102 could reject the usage as a syntax error.

The infix language could require that each intrinsic identifier be specified with an "@" prefix. Also, the infix language could support alternative forms of intrinsic usage. For example, the following pairs of statements could be semantically equivalent and generate identical Rule Definition Language code:

```
@inst_reset(duck.@inst_template)
duck.@inst_template.@inst_reset( )
@dmn_push(DomainX)
DomainX.@dmn_push( )
if @fld_isunknown(instance1.fld1) then ... end
if instance1.fld1.@fld_isunknown( ) then ... end
if @set_doesincludeval(set1, 123) then ... end
if set1.@set_doesincludeval(123) then ... end
```

In addition, server 102 may choose to expose intrinsic identifiers with different names than those defined by this document. For example, server 102 may choose to expose inst_template more simply as "template" and make the latter name a reserved word in its language.

14.3 Identifier Resolution

The Rule Definition Language associates identifiers with rulebase objects, such as classes, domains, instances, and fields. Server 102 then resolves name-references to those objects.

14.3.1 Identifier Scoping

A user could define objects in a hierarchical fashion, such as:

```
rulebase-global objects
    class-specific objects
        method-specific local variables
    domain-specific objects
        class-specific objects
            method-specific local variables
        ruleset-specific objects
            class-specific objects
                method-specific local variables
                rule-specific local variables
```

An object's position in this hierarchy determines its scope (visibility) to object references. An object at the rulebase-level is visible throughout the rulebase from objects at both the rulebase level and at lower levels. An object at a domain level is visible throughout its domain from objects at both the domain level and at lower levels, but these objects may not be visible outside their domain. An object at the ruleset level is visible throughout the ruleset from objects at both the ruleset level and at lower levels, but such objects may not be visible outside the ruleset. Objects at lower levels "hide" same-named objects at higher levels. Thus, a local variable named Age may hide a class field named Age.

14.3.2 Identifier Qualification

A user does not generally need to fully object references. The user may only need to specify enough qualifiers to disambiguate references. Thus, if the identifier Age uniquely identifies a field in an instance Father of a class Person, the user can simply specify:

age.

If there are multiple static instances of Person, the user could further qualify the identifier as:

father.age.

If multiple in-scope classes define Father objects, the user could more-fully qualify the identifier as:

person.father.age.

If Age is defined multiple places within a code block's scope, the code block can reference each of the objects by specifying appropriate qualifiers.

14.4 Static and Dynamic IdentifierSpec Elements

14.4.1 Static Specifications

A static IdentifierSpec is one whose value can be resolved prior to inferencing, such as:

age
father.age
person.father.age
domain1.ruleset1.duck.donald.age.

In one embodiment, an IdentifierSpec can be specified as static anywhere within a rulebase where IdentifierSpecs are allowed. In a particular embodiment, the path may not consist of more than five identifiers, and the length of the path affects its interpretation. For example, a field path with five identifiers may be assumed to be in the format:

<domain_name>.<ruleset_name>.<class_name>.<instance_name>.<field_name>, whereas a field path of three identifiers is assumed to be in the format:

<class_name>.<instance_name>.<field_name>.

14.4.2 Dynamic Specifications

A dynamic IdentifierSpec is one whose value is resolved during inferencing, such as:

```
// The age of the spouse for the Person instance named Father
    person.father.spouse.age
// The age of the owner for the Duck instance named Donald
    domain1.ruleset1.duck.donald.owner.age
```

In one embodiment, an IdentifierSpec can be specified as dynamic within rule or method logic. In a particular embodiment, these specifications can be arbitrarily long, such as:

//The age of the spouse of the manager of Employee1's manager's spouse
employee1.manager.spouse.manager.spouse.age=32

The "tail" of the path specifies two or more field names. In one embodiment, all but the last field names identify fields declared as instance-reference fields. In the above example, the identifiers Manager and Spouse name instance-reference fields.

14.4.2.1 Inferencing Behaviors

As inference engine 112 evaluates the various fields in a dynamic specification, inference engine 112 may encounter unknown or null field values.

14.4.2.1.1 Handling for Unknown Field Values

If inference engine 112 detects an unknown value, inference engine 112 pends the currently executing rule.

14.4.2.1.2 Handling for Null Field Values

If inference engine 112 detects an intermediate field with a null value, the outcome may depend on the current context. If the current context is a comparison, such as:

employee1.manager.age<32//where
    employee1.manager=NULL (no manager)

inference engine 112 may force the result of the comparison to be false. If inference engine 112 detects a null value outside of a comparison context, inference engine 112 terminates inferencing with an error exception. In this embodiment, if Employee1 does not have a manager (Employee1.Manager=null), inference engine 112 evaluates all of the following comparisons as false:

employee1.manager.age<32
employee1.manager.age >=32
employee1.manager.age < >32
employee1.manager.age=32

15. Rulebase Merging

Rulebase merging is a blending of elements and fields from participating rulebases 114 or sub-rulebases. In some cases, the merging involves same_named objects within the same rulebase. Rulebase builder 110 merges rulebases elements by comparing object names at the rulebase-level, constraint-set-level, class-level, domain-level, and ruleset-level.

Where there is no overlap (no same_named elements) at a given level, the result is simply the aggregate of the merge objects at that level. So if one rulebase 114 only defines a rulebase-level class named Class1 and another rulebase 114 only defines a rulebase-level class named Class2, the merge result will reflect both Class1 and Class2.

Where there is an overlap, the result will depend on the elements and fields merged. In some cases, there will be a blending of elements and fields. In other cases, there is only a check for consistency between rulebases 114. In any case, the following guidelines could apply. First, the merge results reflect only elements and fields recognized by rulebase builder 110 and might not include namespace-prefixed or unrecognized elements/fields. Second, there could no attempt to merge rulebase logic. For a method, this means that only one rulebase element can define implementation logic for the method. For a rule, this means that only one rulebase element can specify implementation logic for the rule. For a constraint, this means that only one rulebase element can specify a constraint Boolean expression. Third, for a given element, the merge reflects only the first LocTag_Attrib found. So if the first rulebase element specifies a LocTag_Attrib, the merge results reflect that field. Otherwise, the results will reflect the LocTag_Attrib (if any) for the second rulebase element. The following sections provide additional details of how rulebases elements can be merged.

15.1 Merging of IdentifierSpec Elements

When merging these elements, one element's specification should be identical to or else a right-hand sub-path of the other. For example, one element might specify Person.Father.Name, and the other element can specify Person.Father.Name, Father.Name, or Name. If the specifications are not identical, the merge results may reflect the most-specific (longest) specification.

15.2 Merging of DataType_Elements

When merging these elements, each element's attributes and sub-elements should be consistent with those of the other element. For DataTypeNumber_Elements, if the Precision_Attrib differs, the merge result may reflect the greater of the two precisions.

15.3 Merging of Rulebase Elements

The merge result reflects the first element's Name_Attrib.

15.4 Merging of InitMethodDef_Elements (at any level)

The merge result could retain multiple InitMethodDef_Elements. So if each rulebase element defines one InitMethodDef_Element at a given level, the result will be two InitMethodDef_Elements at that level. Each element retains its own fields and sub-elements, and the merged elements should have different names. If merged elements have identical names, at most one of the elements may specify an InitMethodBody (method implementation).

15.5 Merging of Same-Named Assoc_Elements (at any level)

IdentifierSpec elements should be consistent with one another.

15.6 Merging of Same-Named ConstraintSet_Elements (at any level)

Rulebase builder 110 could combine Constraint_Elements. For same_named Constraint_Elements, only one element may specify a GeneralExpr.

15.7 Merging of Same-Named Class_Elements (at any level)

If multiple elements specify a Parent_Element, these specifications should be consistent with one another. If either element specifies a Parent_Element, the merge results reflect the parent.

For same_named FieldDcl_Elements, the ResolutionType_Attribs and DataType_Elements should be identical. If one element specifies "final valued" but the other does not, the element will be "first valued." Rulebase builder 110 could combine lists of ConstrainerList_Elements. If both elements specify ConstraintViolation_Elements, rulebase builder 110 may choose the most restrictive one (an abort element over a resume element).

For same_named ClassMethodDef_Elements, the method signatures (except for parameter name) should be consistent and at most one element may specify a ClassMethodBody_Element (method implementation).

For same_named StaticInstDef_Elements, rulebase builder 110 may combine any lists of LastChanceValue_Elements. For elements with same_named identifiers, rulebase builder 110 may retain only the first LastChanceValue found. Rulebase builder 110 handles constraints as for FieldDcl_Elements.

15.8 Merging of Same-Named Domain_Elements

If either element is shared with client applications 122, the result will be shared. Otherwise, the result will not be shared. If both elements specify a DomainGoal_Element, the goals should have consistent values. If either element specifies a goal, the merge results reflect the goal.

If either element specifies a DomainAppSharedFlds_Element, the result may reflect a DomainAppSharedFlds_Element. If both specify one, the sub-elements may be merged, but the same identifier should not end up as both a DomainPreConditionList_Element and a DomainPostConditionList_Element.

For same_named Ruleset_Elements, if one element specifies the Post_Attrib as "conditional" but the other does not, the element will be "unconditional". If either element is shared with applications, the result will be shared. Otherwise, the result will not be shared. Rulebase builder 110 combines the Rule_Element sub-elements but may disallow same_named Rule_Elements.

16. Intrinsic Identifiers

The Rule Definition Language refers to intrinsic identifiers. The following are examples of intrinsic identifiers given in infix language. In these examples, the infix language requires that each intrinsic identifier be specified with an "@" prefix.

16.1 Symbolic References 16.1.1 Scope Global

This identifier is a symbolic reference to the rulebase scope level. For example, it may be useful in distinguishing a rulebase-level Class1 from a domain-level Class1. This identifier may be specified as the first identifier within an identifier path, such as by:

@scope_global.class1.instance1.fld1=3.

16.1.2 scope_currclass

This identifier is a symbolic reference to the current class for an executing method. For example, it may be useful for distinguishing an instance xyz from a local variable xyz. This identifier may be specified within method logic, but not rule logic, as the first identifier within an identifier path, such as by:

@scope_currclass.xyz.fld1=3

16.1.3 scope_currinstance

This identifier is a symbolic reference to the current instance for an executing method. For example, it may be useful for distinguishing a field xyz from a local variable xyz. This identifier may be specified within method logic, but not rule logic, as the first identifier within an identifier path, such as by:

@scope_currinstance.xyz=3

16.1.4 candidate_value

This identifier is a symbolic reference to the proposed new value for a field. This identifier may be specified within constraint Boolean expressions, such as by:

@candidate_value >=0 or @candidate_value <=max_age

16.2 Intrinsic Objects

16.2.1 inst_template

This identifier is a reference to an intrinsic instance associated with all classes. It serves as a model for dynamic-instance creation. A rule or method initializes the template's fields to reflect the desired fields of the new dynamic instance. Template instances are a special form of instance with restricted use in that they are write-only instances. Rulebase logic can only set values for template fields, but not read template fields or invoke methods via the template instance. Likewise, template instances may have no inferencing significance, such as for pattern matching. One example use is:

```
// Create a Duck
@inst_reset(duck.@inst_template)      // Reset fields to UNKNOWN
                                      //        status
// Initialize template fields
duck.@inst_template.age = 4
...             // init additional fields
// Create new instance
@inst_make(duck)
```

16.3 Engine-Level Methods

16.3.1 engn_startchain

This identifier is an intrinsic method that initiates (or restarts) inferencing for the current domain context. One example is:

rcInfer=@engn_startchain( )

If inference engine 112 is already inferencing over the current domain, inference engine 112 may abort this operation with an error. The method return code indicates an engn_stopchain( ) return code (if any). If inferencing terminates normally (without engn_stopchain execution), the return code is zero.

16.3.2 engn_stopchain

This identifier is an intrinsic method that immediately aborts inferencing for the current domain context. If inference engine 112 is not currently inferencing over the current domain, inference engine 112 may abort this operation with an error. This identifier also specifies a numeric value that will be returned as the inferencing return code. By convention, this value may be non-zero because inference engine 112 returns zero when inferencing terminates normally. In any case, inferencing may terminate immediately without completing the current rule action. If that action had invoked methods and one of them invoked engn_stopchain( ), that method and all dynamically ascendant methods immediately terminate as well. One example use is:

@engn_stopchain(−123)

16.3.3 engn_tracemsg

This identifier is an intrinsic method that sends a textual message to an application's MessageHandler or MessageArray objects (if any). If the client application 122 has not defined any of these object, inference engine 112 may ignore invocations of engn_tracemsg( ). One example use is:

@engn_tracemsg("In Rule1; father age="& father.age)

16.4 Domain-Level Methods

16.4.1 dmn_push

This identifier is an intrinsic method that loads a specified sub-inferencing domain. If the specified domain is already loaded (pushed), inference engine 112 may abort this operation with an error. One example use is:

@dmn_push(DomainX)

16.4.2 dmn_pop

This identifier is an intrinsic method that unloads the current sub-inferencing domain. If there is no domain currently loaded, inference engine 112 may abort this operation with an error. One example use is:

@dmn_pop( )

16.5 Instance-Level Methods

16.5.1 inst_make

This identifier is an intrinsic method that creates a dynamic instance from an instance template. It creates an instance based on the current field values for the template instance. Rulebase logic can create multiple, similar instances by initializing the template instance once with field values shared by all the instances and then invoking inst_make( ) multiple times, each time modifying the template field values for instance-specific differences.

16.5.2 inst_reset

This identifier is an intrinsic method that resets all of a specified instance's fields to an unknown state. One example use is:

@inst_reset(class1.instance1)

16.5.3 inst_delete

This identifier is an intrinsic method that deletes a specified dynamic instance. In one embodiment, any kind of rule can create dynamic instances, but only pattern-matching rules can delete them. One example use is:

```
for
    any duck d
if
    // duck is an old duck
    d.getage( ) >= 100
then
    @inst_delete(d)
end
```

16.5.4 inst_getname

This identifier is an intrinsic method that returns the name of a specified instance. For static instances, the returned name is a fully-qualified name with "." delimiters, such as:

"Domain1.Ruleset1.Person.Father"

For dynamic instances, the instance identifier reflects an index value, such as:

"Domain1.Ruleset1.Person(23)"

One example use is:

strName=@inst_getname(person1.spouse)

16.6 Field-Level Methods (All Fields)

16.6.1 fld_isknown

This identifier is an intrinsic method that tests a specified field's knowability status. If the field is currently in a KNOWN state, the method returns a Boolean TRUE value. Otherwise, the currently-active rule will pend until the field achieves a known state. One example use is:

if@fld_isknown(instance1.fld1) then . . . end

16.6.2 fld_isunknown

This identifier is an intrinsic method that tests a specified field's knowability status. If the field is currently in a KNOWN state, the method returns a Boolean FALSE value. Otherwise, the method returns a Boolean TRUE value. One example use is:

if @fld_isunknown(instance1.fld1) then . . . end

16.6.3 fld_reset

This identifier is an intrinsic method that resets a specified field to an UNKNOWN state. One example use is:

@fld_reset(class1.instance1.fld1)

16.7 Field-Level Methods (Specific to Sets)

16.7.1 set_addval

This identifier is an intrinsic method that adds a specified value to a Set. If the Set already contains the value, this operation has no effect. The specified value may be type-compatible with the Set. One example use is:

@set_addval(set1, 123)

16.7.2 set_doesincludeval

This identifier is an intrinsic method that tests whether a Set already contains a specified value. If the Set does contain the value, the method returns a Boolean TRUE value. Otherwise, it returns a Boolean FALSE value. The specified value may be type-compatible with the Set. One example use is:

if@set_doesincludeval(set1, 123) then . . . end 16.7.3 set_removeval

This identifier is an intrinsic method that removes a specified value from a Set. As a result, the Set remains unchanged, becomes a subset of itself, or becomes the empty Set. The specified value may be type-compatible with the Set. One example use is:

@set_removeval(set1, 123)

16.7.4 set_mergeset

This identifier is an intrinsic method that merges a specified Set with a base Set. If the specified Set is empty, this operation has no effect. The specified Set may be type-compatible with the base Set. One example use is:

@set_mergeset(set1, set2)//merge set2 into set1

16.7.5 set_excludeset

This identifier is an intrinsic method that removes a specified Set's values from a base Set. As a result, the base Set remains unchanged, becomes a subset of itself, or becomes the empty Set. The specified Set may be type-compatible with the base Set. One example use is:

@set_excludeset(set1, set(123, 456))//remove values from set1

16.7.6 set_intersect

This identifier is an intrinsic method that intersects a specified Set with a base Set. As a result, the base Set remains unchanged, becomes a subset of itself, or becomes the empty Set. The specified Set may be type-compatible with the base Set. One example use is:

@set_intersect(set1, set(123, 456))//possibly modifies set1

16.7.7 set_doesintersect

This identifier is an intrinsic method that tests whether a specified Set intersects with a base Set. If the Sets share any values, the method returns a Boolean TRUE value. Otherwise, it returns a Boolean FALSE value. The specified Set may be type-compatible with the base Set. One example use is:

if @set_doesintersect(set1, set2) then . . . end 16.7.8 set_getsize

This identifier is an intrinsic method that returns a Number value indicating the number of elements in a Set. If the Set is empty, the method returns zero. One example use is:

var cElements is number=@set_getsize(set1)

16.8 Field-Level Methods (Specific to Strings)

16.8.1 string_getlength

This identifier is an intrinsic method that returns a Number value indicating the length of a String. If the String is empty, the method returns zero. One example use is:

var cChars is number=@string_getlength(string1)

16.9 Ruleset-Level Methods 16.9.1 ruleset_postrules

This identifier is an intrinsic method that posts the rules for the specified ruleset to the agenda for the current domain context. The specified ruleset may have a Post_Attrib value of "conditional". One example use is:

@ruleset_postrules(domain1.ruleset1)

While the present disclosure has been described in terms of preferred embodiments and generally associated methods, alterations and permutations of the preferred embodiments and method will be apparent to those skilled in the art. Accordingly, the above description of preferred exemplary embodiments does not define or constrain the present disclosure. Other changes, substitutions, and alterations are also possible without departing from the spirit and scope of the present disclosure, as defined by the following claims.

What is claimed is:

1. A method for building a rulebase, the method executed by one or more processors configured to perform a plurality of operations, the operations comprising:

communicating, to a rulebase builder, a plurality of rulebase components including one or more of rules, rulesets, or rulebases; and receiving, at a client application, a consolidated rulebase from the rulebase builder, wherein the rulebase builder merges the rulebase components to create the consolidated rulebase and comprises one of:

a stateless rulebase builder that receives a control object, wherein the control object includes values identifying one or more functions performed by the rulebase builder to create the consolidated rulebase, or a stateful rulebase builder that retains session information related to a communication session between the rulebase builder and the client application.

2. The method of claim 1, wherein communicating one of the plurality of rulebase components to the rulebase builder comprises communicating at least one of a binary rulebase component, an uncompiled rulebase component, and a location of a rulebase component to the rulebase builder.

3. The method of claim 2, wherein the location of the rulebase component comprises a Uniform Resource Locator (URL).

4. The method of claim 1, wherein the one or more functions identified by the values of the control object include whether the rulebase builder generates at least one of a load map, an application interface document, and a binary consolidated rulebase, the load map identifying a plurality of objects defined in the consolidated rulebase and relationships between each object and rules in the consolidated rulebase affecting each object, the application interface document identifying one or more preconditions and one or more postconditions for each domain associated with the consolidated rulebase.

5. The method of claim 1, wherein the stateful rulebase builder exchanges additional information with the client application; and invokes at least one function in the rulebase builder, the at least one function generates at least one of a load map, an application interface document, and a binary consolidated rulebase, the load map identifying a plurality of objects defined in the consolidated rulebase and relationships between each object and rules in the consolidated rulebase affecting each object, the application interface document identifying one or more preconditions and one or more postconditions for each domain associated with the consolidated rulebase.

* * * * *